US011695821B2

(12) United States Patent
Sabella et al.

(10) Patent No.: US 11,695,821 B2
(45) Date of Patent: *Jul. 4, 2023

(54) APPLICATION COMPUTATION OFFLOADING FOR MOBILE EDGE COMPUTING

(71) Applicant: Intel Corporation, Santa Clara, CA (US)

(72) Inventors: Dario Sabella, Munich (DE); Miltiadis Filippou, Munich (DE); Kilian Roth, Munich (DE); Ingolf Karls, Feldkirchen (DE); Yang Yang, Mannheim (DE); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,961

(22) Filed: Jun. 15, 2021

(65) Prior Publication Data
US 2022/0078226 A1 Mar. 10, 2022

Related U.S. Application Data

(63) Continuation of application No. 16/554,824, filed on Aug. 29, 2019, now Pat. No. 11,050,813, which is a
(Continued)

(51) Int. Cl.
*H04L 29/08* (2006.01)
*H04L 67/04* (2022.01)
(Continued)

(52) U.S. Cl.
CPC .............. *H04L 67/04* (2013.01); *G06F 9/505* (2013.01); *G06F 9/5027* (2013.01);
(Continued)

(58) Field of Classification Search
USPC ......................................................... 709/226
See application file for complete search history.

(56) References Cited

U.S. PATENT DOCUMENTS 8,194,926 B1 6/2012 Keysers et al.
8,381,301 B1* 2/2013 Wilson ................. H04L 43/026
370/312
(Continued)

OTHER PUBLICATIONS

"U.S. Appl. No. 15/855,652, Notice of Allowance dated Jun. 5, 2019", 8 pgs.
(Continued)

*Primary Examiner* — Jude Jean Gilles
(74) *Attorney, Agent, or Firm* — Schwegman Lundberg & Woessner, P.A.

(57) ABSTRACT

Systems, apparatuses, methods, and computer-readable media, are provided for offloading computationally intensive tasks from one computer device to another computer device taking into account, inter alia, energy consumption and latency budgets for both computation and communication. Embodiments may also exploit multiple radio access technologies (RATs) in order to find opportunities to offload computational tasks by taking into account, for example, network/RAT functionalities, processing, offloading coding/encoding mechanisms, and/or differentiating traffic between different RATs. Other embodiments may be described and/or claimed.

20 Claims, 18 Drawing Sheets

Related U.S. Application Data continuation of application No. 15/855,652, filed on Dec. 27, 2017, now Pat. No. 10,440,096.

(60) Provisional application No. 62/593,169, filed on Nov. 30, 2017, provisional application No. 62/439,759, filed on Dec. 28, 2016.

(51) Int. Cl.

| | | |
|---|---|---|
| *H04W 52/02* | (2009.01) | |
| *H04L 67/10* | (2022.01) | |
| *G06F 9/50* | (2006.01) | |
| *H04W 28/02* | (2009.01) | |
| *H04L 47/80* | (2022.01) | |
| *H04L 47/762* | (2022.01) | |
| *H04W 4/18* | (2009.01) | |

(52) U.S. Cl.
CPC .......... *G06F 9/5072* (2013.01); *H04L 47/762* (2013.01); *H04L 47/803* (2013.01); *H04L 67/10* (2013.01); *H04W 28/0205* (2013.01); *H04W 52/0264* (2013.01); *G06F 2209/509* (2013.01); *Y02D 30/70* (2020.08)

(56) References Cited

U.S. PATENT DOCUMENTS

| | | | |
|---|---|---|---|
| 9,426,690 | B2 | 8/2016 | Damola |
| 9,451,504 | B2 | 9/2016 | Anthony, Jr. et al. |
| 9,934,507 | B2 | 4/2018 | Cohen et al. |
| 10,037,231 | B1 | 7/2018 | Jakhetiya et al. |
| 10,057,034 | B2 | 8/2018 | Yanover et al. |
| 10,440,096 | B2 * | 10/2019 | Sabella ............. H04W 28/0205 |
| 10,827,033 | B1 | 11/2020 | Balasubramanian et al. |
| 11,050,813 | B2 * | 6/2021 | Sabella ................ H04L 47/803 |
| 2003/0154239 | A1 | 8/2003 | Davis et al. |
| 2004/0148391 | A1 * | 7/2004 | Lake, Sr. ............. H04L 47/728 709/224 |
| 2005/0273668 | A1 | 12/2005 | Manning |
| 2007/0112575 | A1 * | 5/2007 | Savoor .................. H04N 21/23 705/7.34 |
| 2007/0133441 | A1 * | 6/2007 | Kang .................... H04W 28/18 370/282 |
| 2008/0010631 | A1 | 1/2008 | Harvey et al. |
| 2011/0280216 | A1 | 11/2011 | Li et al. |
| 2012/0240062 | A1 | 9/2012 | Passmore et al. |
| 2013/0242763 | A1 * | 9/2013 | Li ......................... H04W 24/02 370/252 |
| 2014/0073323 | A1 * | 3/2014 | Lee ....................... H04W 76/15 455/435.1 |
| 2014/0310381 | A1 * | 10/2014 | Koo ..................... H04W 88/06 709/217 |
| 2014/0363163 | A1 | 12/2014 | Morper et al. |
| 2015/0170321 | A1 * | 6/2015 | Yang ....................... H04L 67/01 345/522 |
| 2015/0333986 | A1 * | 11/2015 | Pang .................... H04L 43/062 370/252 |
| 2016/0294701 | A1 | 10/2016 | Batrouni et al. |
| 2016/0344844 | A1 * | 11/2016 | Lin ........................ H04L 67/34 |
| 2017/0013495 | A1 | 1/2017 | Chae et al. |
| 2017/0064037 | A1 * | 3/2017 | Das ......................... H04W 4/18 |
| 2017/0064066 | A1 | 3/2017 | Das et al. |
| 2017/0079059 | A1 | 3/2017 | Li et al. |
| 2017/0164237 | A1 * | 6/2017 | Mahmoodi ....... H04W 52/0251 |
| 2018/0020062 | A1 * | 1/2018 | Li .......................... H04W 4/70 |
| 2018/0183855 | A1 | 6/2018 | Sabella et al. |
| 2019/0141121 | A1 | 5/2019 | Bernat et al. |
| 2019/0306766 | A1 * | 10/2019 | Ketyko ................ H04L 41/147 |
| 2020/0076875 | A1 | 3/2020 | Sabella et al. |

OTHER PUBLICATIONS

"U.S. Appl. No. 16/554,824, Non Final Office Action dated Jun. 15, 2020", 6 pgs.

"U.S. Appl. No. 16/554,824, Notice of Allowance dated Feb. 24, 2021", 8 pgs.

"U.S. Appl. No. 16/554,824, Preliminary Amendment filed Nov. 12, 2019", 15 pgs.

"U.S. Appl. No. 16/554,824, Response filed Oct. 15, 2020 to Non Final Office Action dated Jun. 15, 2020", 3 pgs.

"Mobile Edge Computing (MEC); Technical Requirements", ETI GS MEC 002, V1.1.1, France, (Mar. 2016), 40 pgs.

"Mobile-Edge Computing—Introductory Technical White Paper", (Sep. 2014), 36 pgs.

Abdelwahab, Sherif, et al., "REPLISOM: Disciplined Tiny Memory Replication for Massive IoT Devices in LTE Edge Cloud", IEEE Internet of Things Journal, vol. 3, No. 3, (Jun. 2016), 12 pgs.

Alkhateeb, Ahmad, et al., "Compressed Sensing Based Multi-User Millimeter Wave Systems:How Many Measurements are Needed?", IEEE,, (2015), 5 pgs.

Barbarossa, Sergio, et al., "Communicating While Computing", IEEE Signal Processing Magazine., (Nov. 2014), 11 pgs.

Beck, Michael Till, et al., "ME-VoLTE: Network Functions for Energy-Efficient Video Transcoding at the Mobile Edge", 18th International Conference on Intelligence in Next Generation Networks, (2015), 7 pgs.

Bing, Li, et al., "An MEG and NFV Integrated Network Architecture", vol. 15, No. 2, ZTE Communications, (Apr. 2017), 7 pgs.

Brown, Gabriel, "Mobile Edge Computing Use Cases & Deployment Options", (Jul. 2016), 10 pgs.

Chaufournier, Lucas, et al., "Mobile Edge Clouds", UMASS Amherst, Laboratory of Advanced Software Systems, College of Information and Computer Sciences, 1 pgs.

Elbamby, Mohammed S, et al., "Proactive Edge Computing in Latency-Constrained Fog Networks", (Apr. 26, 2017), 6 pgs.

Li, Songze, et al., "Fundamental Tradeoff between Computation and Communication in Distributed Computing", IEEE International Symposium on Information Theory., (2016), 5 pgs.

Liang, Ben, "Mobile Edge Computing", University of Toronto, Canada., (2016), 18 pgs.

Mach, Pavel, et al., "Mobile Edge Computing: A Survey on Architecture and Computation Offloading", IEEE Communications Surveys and Tutorials, (Mar. 13, 2017), 28 pgs.

Marzi, Zhinus, et al., "Compressive Channel Estimation and Tracking for Large Arrays in mm-Wave Picocells", IEEE Journal of Selected Topics in Signal Processing, vol. 10, No. 3, (Apr. 2016), 14 pgs.

Oueis, Jessica, et al., "Distributed Mobile Cloud Computing: A Multi-user Clustering Solution", IEEE CC 2016 SAC Cloud Communications and Networking, (2016), 6 pgs.

Oueis, Jessica, et al., "The Fog Balancing: Load Distribution for Small Cell Cloud Computing", IEEE, (2015), 6 pgs.

Ren, Shaoqing, et al., "Faster r-cnn: Towards real-time object detection with region proposal networks", arXiv:1506.01497v3 [cs.CV], (2016), 14 pgs.

Sardellitti, Stefania, "Joint Optimization of Radio and Computational Resources for Multicell Mobile-Edge Computing", IEEE Transactions on Signal and Information Processing Over Networks, vol. 1, No. 2, (Jun. 2015), 15 pgs.

Tran, Tuyan X, et al., "Collaborative Mobile Edge Computing in 5G Networks: New Paradigms, Scenarios, and Challenges", IEEE Communications Magazine, Special Issue on Fog Computing and Networking, (Apr. 11, 2017,), 7 pgs.

Wang, Shuo, et al., "A Survey on Mobile Edge Networks: Convergence of Computing, Caching and Communications", IEEE, vol. 5., (Jun. 7, 2017), 23 pgs.

Yan, Han, et al., "Compressive Sensing Based Initial Beamforming Training for Massive MIMO Millimeter-Wave Systems", (2016), 5 pgs.

Zhang, Ke, "Energy-Efficient Offloading for Mobile Edge Computing in 5G Heterogeneous Networks", IEEE, vol. 4, (Oct. 6, 2012), 12 pgs.

\* cited by examiner

MAMP Network Reference Architecture

Example of MX-assisted MPTCP Call Flow

APPLICATION COMPUTATION OFFLOADING FOR MOBILE EDGE COMPUTING

The present application is a continuation of U.S. application Ser. No. 16/554,824 filed Aug. 29, 2019, which is a continuation of U.S. application Ser. No. 15/855,652, filed Dec. 27, 2017, which claims priority under 35 U.S.C. § 119 to U.S. Provisional Application No. 62/439,759 filed on Dec. 28, 2016 and U.S. Provisional Application No. 62/593,169 filed on Nov. 30, 2017, the contents of each of which are hereby incorporated by reference in their entireties.

FIELD

Various embodiments generally may relate to the fields of computing and wireless communications, and in particular, may relate to mobile edge computing (MEC) systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The evolution of communication systems poses increasing challenges from an energy consumption perspective. Computational tasks performed by mobile devices may increase as the complexity of such communication systems increases. Additionally, the evolution of communication systems also leads to increased application complexity, which may also cause computational requirements to increase. However, mobile device battery technology has not been able to evolve at the same pace as application complexity. One solution to such issues involved application computation offloading using Mobile Edge Computing (MEC) technology.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
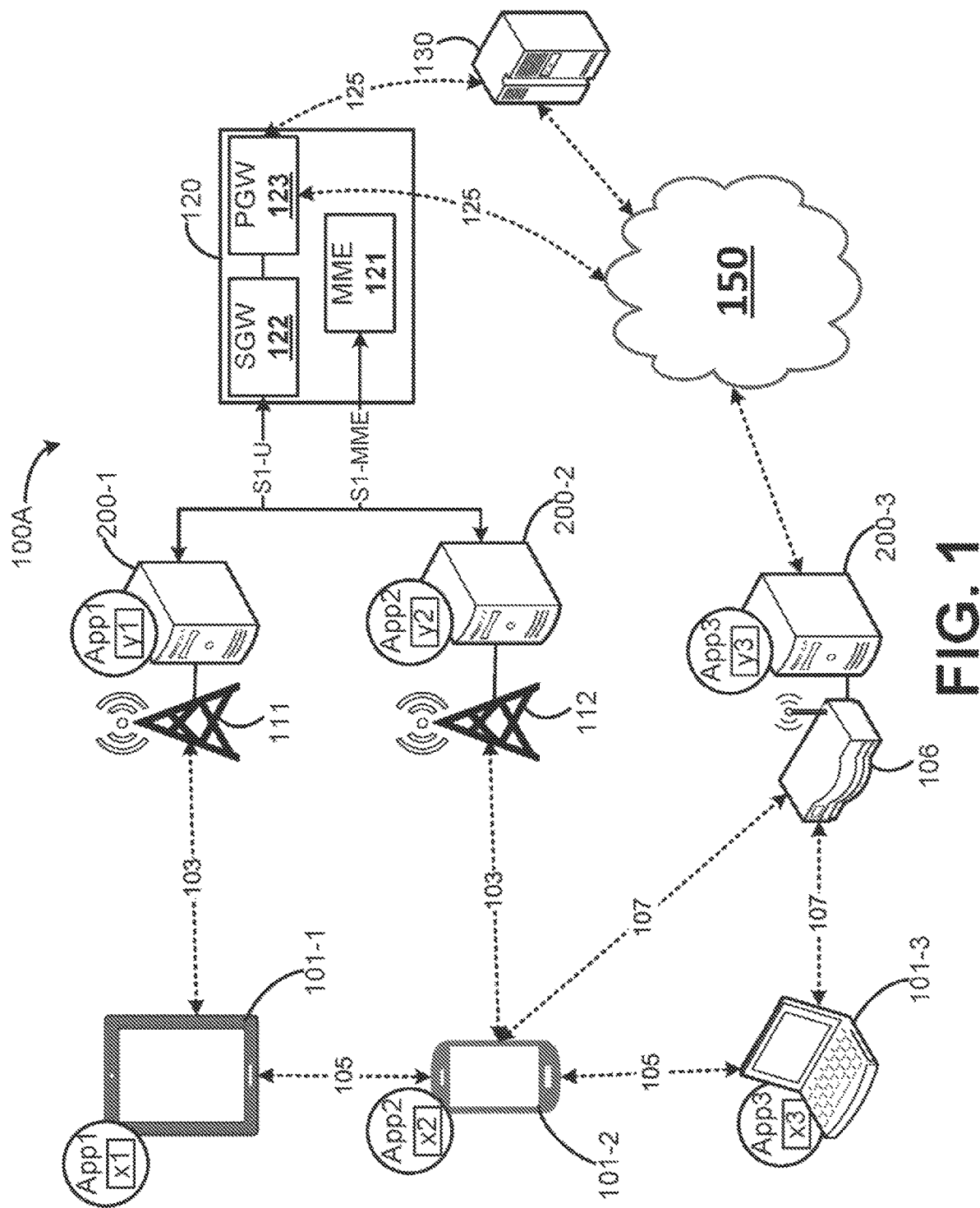
FIG. 1 depicts an example of application computation off-loading using Mobile Edge Computing (MEC) in accordance with various embodiments.

The evolution of communication systems poses increasing challenges from an energy consumption perspective. The computational tasks performed by user equipment, from an energy consumption point of view, may increase as the complexity of such communication systems increases. For example, when a terminal is connected with multiple Radio Access Technologies (RATs), such as a Wi-Fi access point, Long Term Evolution (LTE), Fifth Generation (5G) New Radio (NR), etc., an increasing complexity of the physical layers (PHY) and/or medium access control layers (MAC) may require the terminal to perform computationally intensive tasks. This complexity may increase in scenarios where the terminal utilizes carrier aggregation (CA) above 5 carriers including Licensed Assisted Access (LAA), Licensed Shared Access (LSA), LTE-WiFI Aggregation (LWA), LTE-WiFi Radio Level Integration with Internet Protocol Security (IPsec) Tunneling (LWIP), etc. Additionally, the evolution of communication systems also leads to increased application complexity, which may also cause computation needs to increase. However, user equipment battery technology has not been able to evolve at the same pace as application complexity.

Application computation offloading is one of the use cases enabled by MEC technology. MEC is a network architecture that allows cloud computing capabilities and computing services to be performed at the edge of a cellular network. MEC provides mechanisms that allow applications to be run and to perform related processing tasks closer to cellular network subscribers (also referred to as "edge users" and the like). In this way, network congestion may be reduced and applications may have better performance. MEC technology is designed to be implemented at the cellular base stations, and may enable flexible and rapid deployment of new applications and services for subscribers. Combining elements of information technology and telecommunications networking, MEC also allows cellular operators to open their radio access network (RAN) to authorized third-parties, such as application developers and content providers.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Further, various operations are described as multiple discrete operations, in turn, in a manner that is most helpful in understanding the illustrative embodiments: however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged, re-ordered, separated into additional operations, combined, or omitted altogether, unless explicitly stated otherwise. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. A process may be implemented as program code, which may be stored by computer-readable storage media, and when the program code is executed by one or more processors of a computer device/system, causes the computer device/system to perform the various operations of the process. Although the operations of a process may be described as being performed by one or more particular elements or devices discussed herein, other similar computing devices/systems (or components thereof) may operate such a process in a multitude of implementations, arrangements, and/or environments unless explicitly stated otherwise.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code. Additionally, an "application instance" may be a realized software program executed in mobile edge host, which can provide service(s) to serve consumer(s).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. The term "RSU" may refer to any transportation infrastructure entity implemented in an gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. As used herein, the term "network resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a mobile edge application.

Examples System Overview

FIG. 1 illustrates an architecture of a system 100A in accordance with various embodiments. In system 100A, mobile edge hosts (MEHs) 200 (including MEH 200-1, MEH 200-2, and MEH 200-3) may execute compute-intensive functionalities of applications (e.g., including App1, App2, and App3), namely application part(s) y (e.g., application part y1 of App1, application part y2 of App2, and application part y3 of App3) improving user experience. The MEHs 200 may execute the tasks of application parts y since MEHs 200 may have high performance capabilities as compared to user equipment (UE) 101 (e.g., including UE 101-1, UE 101-2, and UE 101-3). Additionally, less computationally intensive functionalities, namely application part(s) x (e.g., application part x1 of App1, application part x2 of App2, and application part x3 of App3) of the applications, may be executed by the UE 101. By providing rich computation resources on the MEHs 200, application computation can be off-loaded to the mobile edge hosts to be accelerated even if a user uses relatively low performance devices, and user experience can be satisfied regardless of the type of UE 101. In this way, consumers can use low complexity UEs 101 by off-loading computing capacity to the MEH 200 by transferring compute-intensive processes from a UE 101 to an MEH 200 to accelerate applications and/or to make rich applications available on various types of UE 101.

In embodiments, a new instance of a specific application (or application function y) may be started on an appropriate MEH 200 in response to a request from a user (e.g., a UE 101). This may be done to fulfill latency and/or resource requirements of an application. In response to requests from various users, connectivity may need to be established between their UEs 101 and a specific instance of an already running application. An application might have a set of requirements (e.g., latency, processing resources, storage resources, network resources, location, network capability, security condition etc.) that need to be fulfilled by the MEH 200, and a MEC system may select the MEH 200 that fulfills all of the requirements. When all users connected to a specific instance of an application have disconnected, the application instance may be terminated.

One example of application computation offloading is the Edge Accelerated Browser (EAB). In EAB, parts of the browsing functions/functionality, such as web contents evaluation, rendering, and optimized transmission, are offloaded to an MEH 200, while the UE 101 renders reconstituted browser graphics on its display. This may involve obtaining renderable data from the backend server 130. In this way, a UE 101 may transfer compute-intensive processes to an MEH 200 to accelerate execution of application 101, which may be a rich application that was otherwise not available on the UE 101.

According to various embodiments, UEs 101 may offload computationally demanding tasks by taking into account energy consumption of both computation and communication requirements. Embodiments also exploit multiple radio access technologies (RATs) in order to find opportunities to offload computational tasks (e.g., network functionalities, processing, and offloading coding/encodings, or differentiating traffic between NRT RATs to RT-RATs). Various embodiments herein take into account the communication demand of the applications to be offloaded and the different communication resources available, and exploit the opportunities for joint optimizations when performing application offloading at higher network layers down to radio resource control (RRC) layer, and/or the like. The embodiments herein provide mechanisms, such as RAT interworking, for trading different available RAT resources, depending on required application offloading communication capacity, channel state, backhaul state, and application parameters, and by taking into account energy consumption of computation, communication, and other like parameters/criteria. In embodiments, the RAT interworking may be done according to required application latencies, as well as data and control layer throughputs taking MAC and PHY layer resources into account.

According to various embodiments, a task offloading opportunity may depend on a tradeoff between computation (e.g., time and energy, or computational resources) for task execution and energy spent to communicating data (e.g., the input/output of the offloaded task, or network resources). The affordability of this offloading tradeoff may depend on the specific application considered. Example use cases of application computation offloading using MEC may include, inter alia, offloading computationally hungry applications, or portions thereof; offloading intermediate data processing applications, or portions thereof; and offloading moderate data processing applications, or portions thereof.

Computation-hungry applications may be applications that are characterized by relatively huge data processing requirements and also by huge data transfer requirements. Examples of computation-hungry applications may include graphics processing/rendering and/or video processing applications, high-speed (low latency) browser applications, artificial/augmented reality applications, low latency cloud based gaming applications, three-dimensional (3D) gaming, and the like.

Intermediate data processing applications may be applications that are characterized by relatively large data processing and/or large data transfer requirements that are less stringent than computation-hungry applications. Examples of intermediate data processing applications may include sensor data cleansing (e.g., pre-processing, normalization), video analysis, value-added services such as translation, log analytics, and the like.

Moderate data processing applications may be characterized by having smaller data processing and/or data transfer requirements than intermediate data processing applications. Examples of moderate data processing applications may include antivirus applications. At the end, tasks may be conveniently offloaded to a server, with energy benefits for the terminal.

The system 100A is shown to include a user equipment (UE) 101-1, UE 101-2, and UE 101-3 (collectively referred to as "UE 101" or "UEs 101"). The UE 101-1 is illustrated as a smartphone and UE 101-2 is illustrated as a table computer (e.g., handheld touchscreen mobile computing device connectable to one or more cellular networks), but may also comprise any mobile or non-mobile computing device, such as Personal Data Assistants (PDAs), pagers, laptop computers (e.g., UE 101-3), desktop computers, wireless handsets, a vehicle-embedded system or a vehicle-to-everything (V2X) device, or any computing device including a wireless communications interface.

In some embodiments, any of the UEs 101 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, e.g., communicatively couple, with a radio access network (RAN), which may be, for example, an Evolved Universal Mobile Telecommunications System (UMTS) Terrestrial Radio Access Network (E-UTRAN), a NextGen RAN (NG RAN), an 5G/NR RAN, or some other type of RAN. In the example of FIG. 1, the UEs 101-1 and 101-2 may utilize respective connections 103, each of which comprises a physical communications interface or layer; in this example, the connections 103 are illustrated as an air interface to enable communicative coupling, and can be consistent with cellular communication protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In embodiments, the UEs 101 may further directly exchange communication data via an interface 105. In some implementations the interface 105 may be a WiFi based link or a personal area network (PAN) based link (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols). In other implementations, the interface 105 may be an LTE Proximity Services (ProSe) link. The ProSe interface 105 may alternatively be referred to as a sidelink interface, and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101) communicate with each other directly over the PC5/SL interface 105 and can take place when the UEs 101 are served by Access Nodes (ANs) 111/112 or when one or more UEs are outside a coverage area of a RAN. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 101, ANs 111/112, application servers 130, and pedestrian UEs 101, may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101 may be implemented/employed as Vehicle Embedded Communications Systems (VECS) or the like.

The UEs 101-2 and 101-3 are shown to be configured to access an access point (AP) 106 via respective connections 107. The connections 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system.

The ANs 111 and 112 that enable the links 103. These access nodes (ANs) can be referred to as base stations (BSs), NodeBs, evolved NodeBs (eNBs), next Generation NodeBs (gNB), RAN nodes, relay nodes, Road Side Units (RSUs), and so forth, and can comprise ground stations (e.g., terrestrial access points) or satellite stations providing coverage within a geographic area (e.g., a cell). The ANs 111 and 112 may be part of the same or different RANs or Radio Access Technologies (RATs). As an example, a RAN may include one or more RAN nodes for providing macrocells, e.g., macro AN 111, and one or more RAN nodes for providing femtocells or picocells (e.g., cells having smaller coverage areas, smaller user capacity, or higher bandwidth compared to macrocells), e.g., low power (LP) AN 112. Although the term "access node" or "AN" is used to refer to cellular base stations, the terms "access node" or "AN" may be used interchangeably with the terms "access point" or "AP." Any of the ANs 111 and 112 can terminate the air interface protocol and can be the first point of contact for the UEs 101. In some embodiments, any of the ANs 1 and 112 can fulfill various logical functions for their respective RANs including, but not limited to, radio network controller (RNC) functions such as radio bearer management, uplink and downlink dynamic radio resource management and data packet scheduling, mobility management, and the like. In accordance with various embodiments, the UEs 101 may be configured to communicate with the ANs 111 and 112 according to LTE, NR, or some other suitable cellular communications protocol.

The MEC hosts 200-1, 200-2, 200-3 (collectively referred to as "MEC hosts 200", "MEC host 200", "MEH 200", or the like) may be virtual or physical devices that host various MEC applications and provide MEC services to the MEC applications. Where the MEHs 200 are implemented as virtual machines (VMs) or the like, the physical devices that implement or operate the MEHs 200 may be referred to as "edge servers." The edge servers may include virtualization infrastructure that provides virtualized environments and virtualized resources (e.g., "virtualized infrastructure") for the MEHs 200. The MEC applications may run as VMs on top of the virtualized infrastructure.

As shown by FIG. 1, each of the AN 111, AN 112, and AP 106 are co-located with MEC hosts 200-1, 200-2, and 200-3, respectively. These implementations may be small-cell clouds (SCCs) where a MEC host 200 is co-located with a small cell (e.g., pico-cell, femto-cell, etc.), or may be mobile micro clouds (MCCs) where a MEC host 200 is co-located with a macro-cell (e.g., an eNB, gNB, etc.). The MEHs 200 may be deployed in a multitude of arrangements other than as shown by FIG. 1. In a first example, the MEHs 200 may be co-located or operated by RNCs, which may be the case for legacy network deployments, such as 3G networks. In a second example, the MEHs 200 may be deployed at cell aggregation sites or at multi-RAT aggregation points that can be located either within an enterprise or used in public coverage areas. In a third example, the MEHs 200 may be deployed at the edge of Core Network (CN) 120. These implementations may be used in follow-me clouds (FMC), where cloud services running at distributed data centers follow the UEs 101 as they roam throughout the network.

The ANs 111 and 112 are shown to be communicatively coupled to a CN 120—via an S1 interface. In embodiments, the CN 120 may be an evolved packet core (EPC) network, a NextGen Packet Core (NPC) network, a 5G core (5GC), or some other type of CN. In this embodiment, the S1 interface may split into two parts: an S1 user plane (S1-U) interface, which carries traffic data between the ANs 111 and 112 and the serving gateway (S-GW) 122, and an S1-mobility management entity (MME) interface, which is a signaling interface between the ANs 111 and 112 and MMEs 121. The elements of CN 120 are discussed in more detail infra with respect to FIG. 2. The CN 120 may be associated with a network operator who owns or controls equipment and other elements necessary to provide network-related services, such as the ANs 111 and 112, one or more servers and/or network function virtualization infrastructure (NFVI) for implementing the various elements of the CN 120 and various elements of the MEC system. In some embodiments, Network Functions Virtualization (NFV) is utilized to virtualize any or all of the above described network node functions via executable instructions stored in one or more computer readable storage mediums.

According to various embodiments, task offloading may be "opportunistic", wherein a UE 101 may offload tasks using a relatively strong link and/or relatively high computational capacity, such as when a UE 101 is close to device with computational capacity that is available. For some identified services or tasks, a UE 101 may evaluate the offloading opportunity (e.g., the "tradeoff") with respect to nearby devices, in which case the UE 101 may offload tasks to nearby devices. The link between the UE 101 and a target device may be the internet, a communication channel with AN 111/112, a direct link with another UE 101, and/or the like. In such embodiments, the computational load of RAT-interworking techniques and/or MAC/PHY layer resources may be taken into account when evaluating the offloading opportunities.

In a first example and with reference to FIG. 1, the UE 101-2 may be connected to AN 112 via link 103, which may be a low quality channel. In this example, the UE 101-2 may offload one or more computational tasks to MEH 200-3 co-located with, or implemented by, AP 106 (also referred to as an "edge server" or "MEC server"), which has a relatively stronger link than the AN 112. In this example, the UE 101-2 may offload tasks to the AP 106 using a WiFi link 107.

In a second example and with reference to FIG. 1, the UE 101-2 may be connected to AN 112 via link 103, which may be a low quality channel. In this example, the UE 101-2 may evaluate and request a relatively close or proximate device 101-3 (e.g., a laptop, desktop personal computer, a small (e.g., home) server, etc.), with better computation capabilities and with better communication link than the link with the AN 112. In this example, the UE 101-2 may offload one or more computational tasks to the proximate device 101-3 using a direct link (e.g., Device-to-Device (D2D) or ProSe, WiFi direct link, Bluetooth/BLE, etc.) or a direct, line of sight (LOS) link with a local small cell.

According to various embodiments, when determining whether to offload computational tasks, a UE 101 may evaluate various criteria, such as: the presence of different RATs (e.g., a WiFi AP, an LTE base station (eNB), an NR base station (gNB), etc.) and their characteristics, including channel state conditions, backhaul state conditions, overload conditions, etc.; application parameters such as computational needs, input/output characteristics, and volume of exchanged data with the edge server; and pre-assessment of latency and energy consumption for the different offloading opportunities, which in some cases may include evaluating both computation and communication resources needed for different offloading opportunities.

Based on the inputs/criteria discussed previously, offloading tradeoffs may be evaluated and an optimal or best offloading opportunity may be determined based on the tradeoffs. First embodiments may include a decentralized approach, where a UE 101 may evaluate tradeoffs and find an optimal offloading opportunity. In the first embodiments, a UE 101 may send a request directly to one or more of ANs 111, 112, 106 (locally) to offload certain tasks. As an example, the optimal offloading opportunity may be in the form of, "offload the tasks X, Y, Z to edge servers co-located with RAT #1, RAT #2, or RAT #3". Second embodiments may include a centralized management approach, where a UE 101 may request a MEC system to assign one or more suitable MEHs 200 for running/executing the requested tasks. In some cases, a hybrid approach may be used where the centralized management approach is used when considering tasks at the application level, and the decentralized management approach is used for offloading of PHY and signal processing tasks to local APs. The present embodiments introduce a framework for the exploitation of multiple RATs in order to find opportunities to offload computational tasks. This may increase the importance of using different computer devices and/or network elements, including personal computers (PCs), tablets, servers, ANs/APs, etc. for hosting MEC platforms and related application offloading instances.

Figure 2:
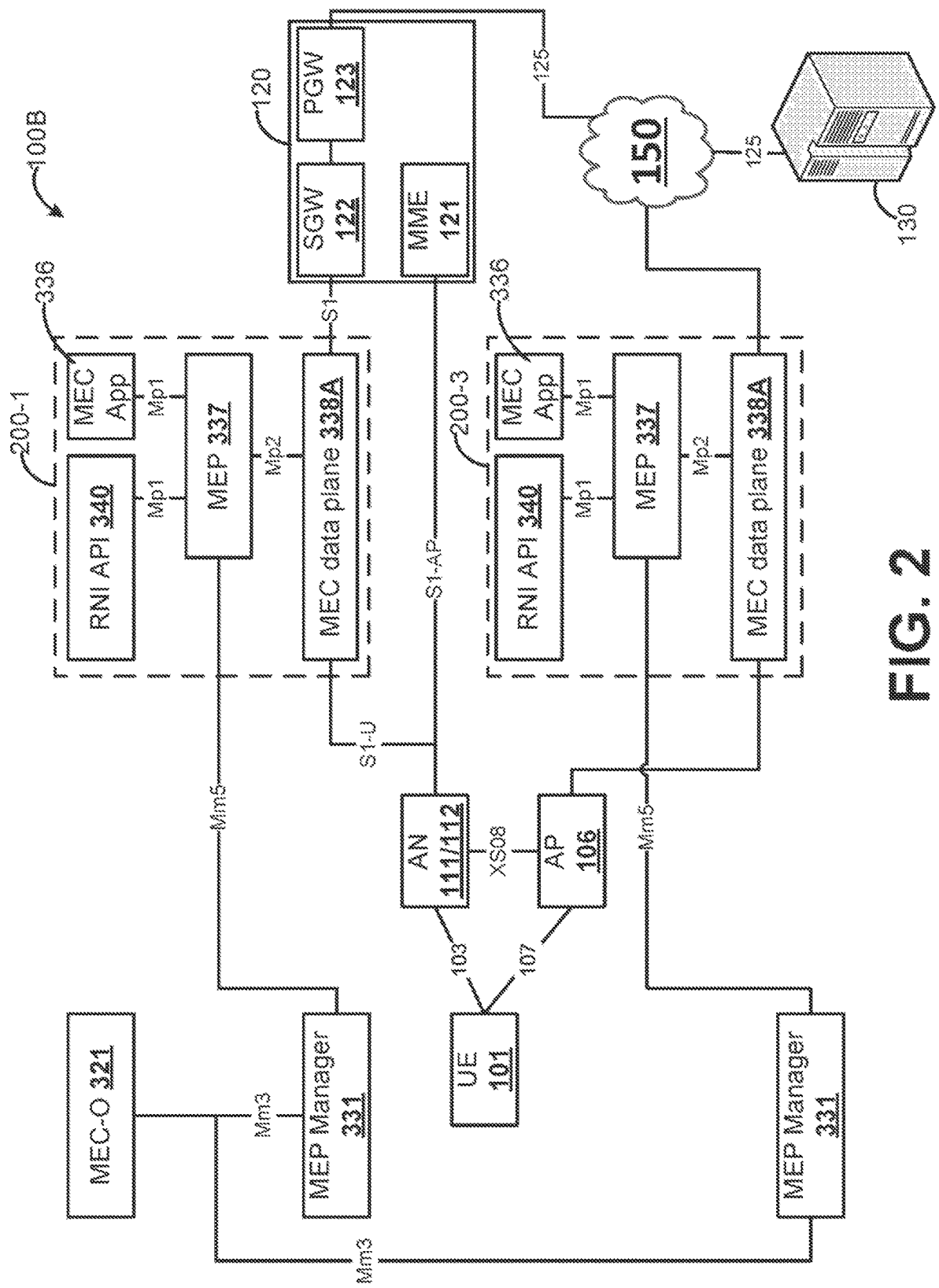
FIG. 2 depicts an example system in which various example embodiments may be practiced.

FIG. 2 depicts an example system 100B in which various example embodiments may be practiced. System 100B may include multiple UEs 101, multiple APs belonging to different RATs, such as WiFi AP 106 and ANs 111/112 (although APs/ANs of other RATs may also be included), multiple MEHs 200, multiple MEC platform managers 331, and a MEC orchestrator (MEC-O) 321. Each MEH 200 includes one or more MEC applications 336, a MEC platform 337, a MEC data plane 338A entity, and a Radio Network Information (RNI) Application Programming Interface (API) 340.

Furthermore, system 100B shows CN 120 comprising the MMEs 121, the SGW 122, and a Packet Data Network (PDN) Gateway (PGW) 123. The MMEs 121 may be similar in function to the control plane of legacy Serving General Packet Radio Service (GPRS) Support Nodes (SGSN). The MMEs 121 may manage mobility aspects in access such as gateway selection and tracking area list management. Although not shown, the CN 120 may also include one or more home subscriber servers (HSS) comprising a database for network users, including subscription-related information to support the network entities' handling of communication sessions. The PGW 123 may route data packets between the CN 120 and external networks, such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). The PGW 123 is shown to be communicatively coupled to an application server 130 and a network 150 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 via the CN 120.

Network 150 may comprise computers, network connections among the computers, and software routines to enable communication between the computers over network connections. In this regard, the network 150 may comprise one or more network elements that may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, base stations, picocells or small cell base stations, and/or any other like network elements. Connection to the network 150 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 150 may require that the computers execute software routines which enable, for example, the seven layers of the open systems interconnection (OSI) model of computer networking or equivalent in a wireless network. Network 150 may be used to enable relatively long-range communication and may represent, for example, the Internet, a local area network (LAN), a wireless LAN (WLAN), a wide area network (WAN), and the like including proprietary and/or enterprise networks, or combinations thereof.

In this example, a UE 101 may connect with the AN 111/112 over a radio link 103 as described previously, and may connect with the AP 106 using WiFi radio link 107. The AN 111/112 may be connected with a MEC data plane 338A over the S1-U interface, which may use General Packet Radio Service (GPRS) Tunneling Protocol for the user plane (GTP-U). The MEC data plane 338A may be connected with the serving gateway (SGW) 122 in CN 120 over an S1-U interface. Additionally, the AN 111/112 may be connected with a Mobility Management Entity (MME) 321 in the core network via an S1-application protocol (AP) control plane interface (which may be the same or similar to the S1-MME interface discussed previously). The MME 121, SGW 122, and PGW 123 may interact with one another and with other devices/elements as discussed herein to provide connectivity to application server 130 via the network 150. The AP 106 may be connected with a MEC data plane 338A of another MEH 200, and this MEC data plane 338A may be connected to a wider network, such as the internet. The other entities depicted by FIG. 2 may be the same or similar as those discussed with regard to FIGS. 3-4.

The RNI API 340 may allow a service consumer to obtain Radio Network Information Service (RNIS). The service consumers (e.g., MEC applications 336 and MEC platforms 337) may communicate with the RNIS over RNI API 340 to obtain contextual information from a corresponding radio access network. RNI may be provided to the UE 101 by the MEC application(s) (MEA or MEC apps) 336 and/or the MEC platform 337 via the access node (e.g., AN 111/112 or AP 106). The RNI API 340 may support both query and subscription (e.g., a pub/sub) based mechanisms that are used over a Representational State Transfer (RESTful) API or over a message broker of the MEC platform 337 (not shown by FIG. 3). A MEA 336 may query information on a message broker via a transport information query procedure, wherein the transport information may be pre-provisioned to the MEA 336 via a suitable configuration mechanism. The various messages communicated via the RNI API 340 may be in Extensive Markup Language (XML), JavaScript Object Notation (JSON), Protocol Buffers (Protobuf), or some other suitable format.

RNI may be used by MEC application(s) 336 and MEC platform 337 to optimize the existing services and to provide new types of services that are based on up to date information on radio conditions. As an example, a MEA 336 may use RNI to optimize current services such as video throughput guidance. In throughput guidance, a radio analytics MEA 336 may use MEC services to provide a backend video server (e.g., application server 345) with a near real-time indication on the throughput estimated to be available at the radio downlink interface in a next time instant. The throughput guidance radio analytics application 336 computes throughput guidance based on the required radio network information it obtains from a mobile edge service running on the MEH 200. RNI may be also used by the MEP 337 to optimize the mobility procedures required to support service continuity, such as when a certain MEA 336 requests a single piece of information using a simple request-response model (e.g., using RESTful mechanisms) while other MEC applications 336 subscribe to multiple different notifications regarding information changes (e.g., using a pub/sub mechanism and/or message broker mechanisms).

In various first embodiments, an application implemented by the UE 101 (e.g., the application offloader 732 discussed infra) may access RNI via a MEC app 360 and/or the MEC platform 337 and the RNI API 340 for the purposes of task offloading evaluation. In various second embodiments, an application implemented by a MEC entity (e.g., the MEC-O 321) may access RNI via a MEC app 360/MEC platform 337 and the RNI API 340 for the purposes of task offloading evaluation. For the purpose of task offloading optimization, each UE 101 (e.g., in the first embodiments) or MEC entity (e.g., in the second embodiments) may collect the following information: (1) characteristics of the different APs and RATs (including channel state and backhaul state); (2) application parameters (computational needs, input/output characteristics and volume of exchanged data with the edge server); and/or (3) pre-assessment of energy consumption and latency for the different offloading opportunities (e.g., of both computation and communication tasks). Based on these inputs, the UE 101 or the MEC system may evaluate tradeoffs and find the best solution, by sending a request to offload certain tasks to edge servers co-located with different radio access technologies (RATs).

Example Framework, Device, and Infrastructure Implementations

Figure 3:
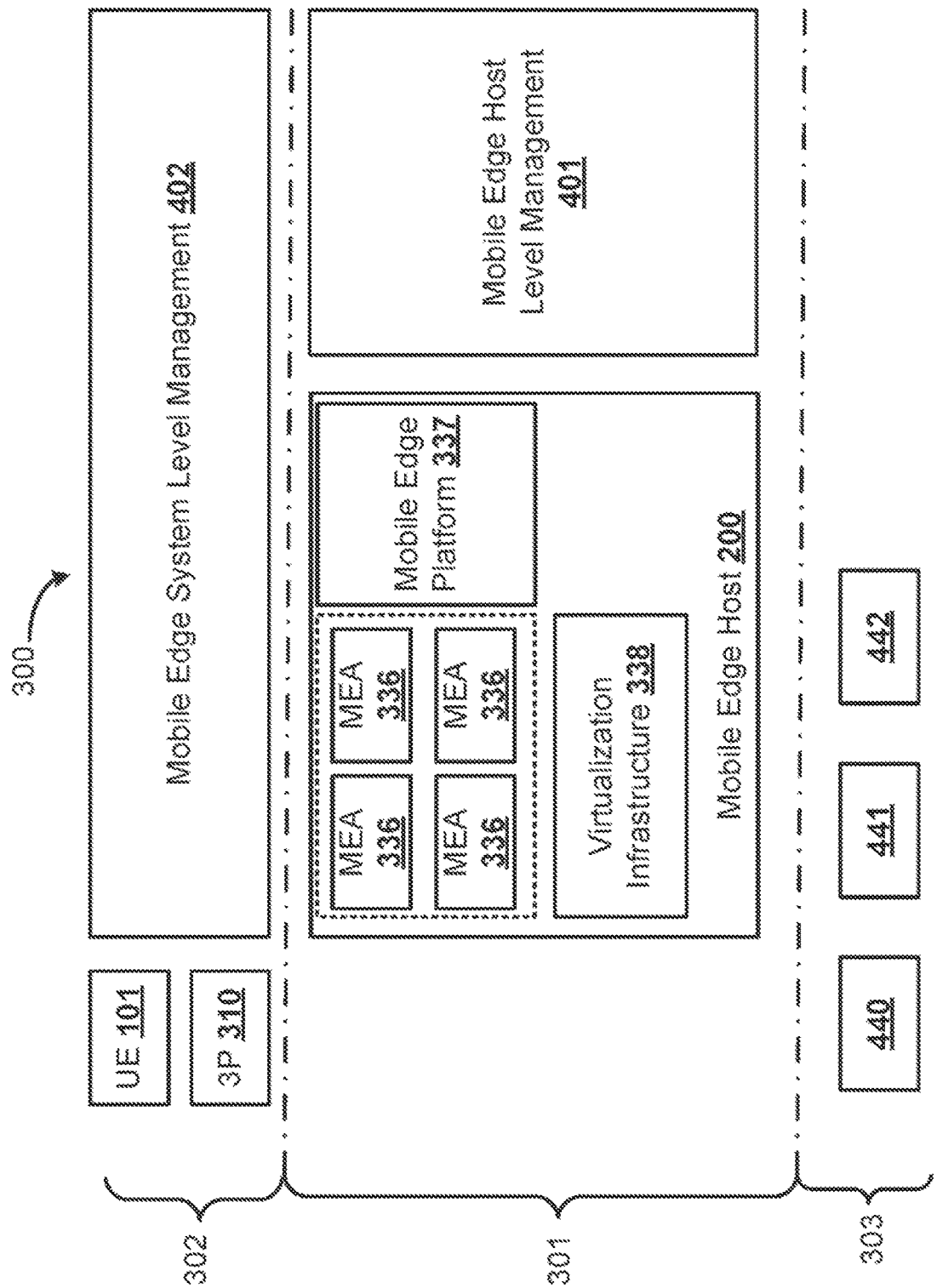
FIG. 3 depicts an example Mobile Edge Computing (MEC) framework in accordance with some embodiments.

FIG. 3 illustrates an example mobile edge framework 300 in accordance with various embodiments. The mobile edge framework 300 is an example structure of a MEC environment. MEC enables implementation of mobile edge applications (MEAs) 336 as software-only entities that run on top of a Virtualization Infrastructure (VI) 338, which is located in or close to the network edge. The MEC framework 300 shows the general entities involved, and these entities can be grouped into system level 302, host level 301, and network level 303 entities.

The mobile edge system level 302 includes mobile edge system level management 402, UE 101 (which may be the same or similar to the other UEs or terminals discussed herein), and $3^{rd}$ Party (3P) entities 310. The network level 303 includes various external network level entities, such as a 3GPP network 440 (see e.g., FIG. 1), a local area network 441 (e.g., a LAN, WLAN, PAN, etc.), and an external network 442 (e.g., network 150). The mobile edge host level 301 includes mobile edge host level management 401 and mobile edge host (MEH) 200. The mobile edge host level management 401 may include various components that handle the management of the mobile edge specific functionality of a particular MEP 337, MEH 200, and the MEAs 336 to be run. The MEH 200 includes the mobile edge platform (MEP) 337, MEAs 336, and VI 338. These entities are discussed in more detail with regards to FIG. 4.

Figure 4:
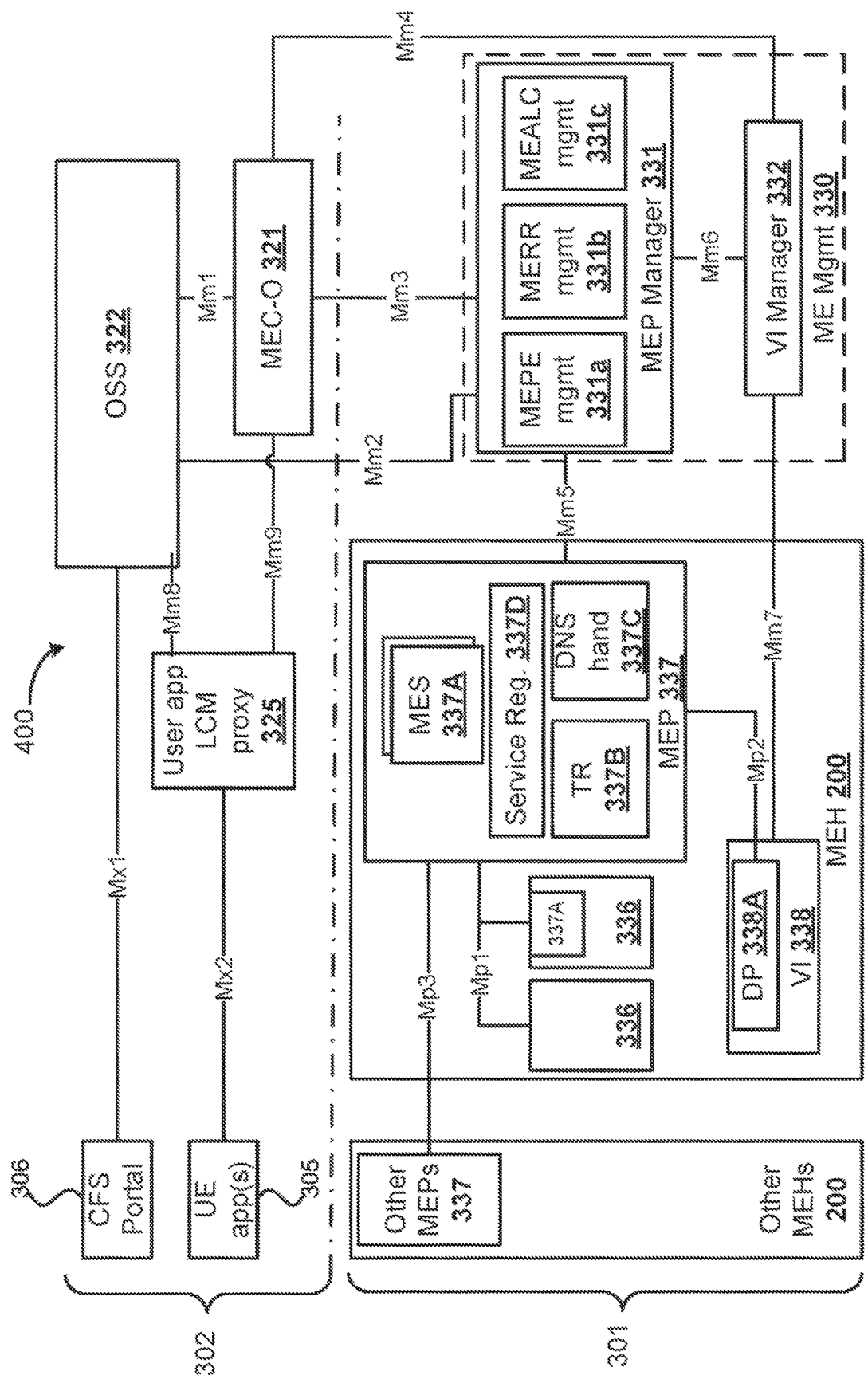
FIG. 4 depicts an example MEC system architecture in accordance with some embodiments.

FIG. 4 illustrates an example mobile edge system architecture in accordance with various embodiments. The mobile edge system 400 of FIG. 4 may include the mobile edge host level 301 and the mobile edge system level 302. The mobile edge host level 301 may include MEHs 200 and mobile edge (ME) management (mgmt) 330, which provide functionality to run mobile edge applications (MEAs) 336 within an operator network or a subset of an operator network.

The mobile edge system 400 includes three groups of reference points, including "Mp" reference points regarding the mobile edge platform functionality; "Mm" reference points, which are management reference points; and "Mx" reference points, which connect MEC entities to external entities. The interfaces/reference points in the mobile edge system 400 may include internet protocol (IP) based connections, and may be used to provide Representational State Transfer (REST or RESTful) services, and the messages conveyed using the reference points/interfaces may be in XML, HTML, JSON, or some other desired format. A suitable Authentication, Authorization, and Accounting (AAA) protocol, such as the radius or diameter protocols, may also be used for communicating over the reference points/interfaces in other embodiments.

The MEH 200 may be an entity that contains an MEP 337 and VI 338 which provides compute, storage, and network resources, for the purpose of running MEAs 336. The VI 338 includes a data plane (DP) 338A that executes the traffic rules (TR) 337B received by the MEP 337, and routes the traffic among applications (e.g., MEAs 336), ME services (MESs) 337A, DNS server/proxy (see e.g., via DNS handling entity 337C), 3GPP network 440, local networks 441, and external networks 442 (see e.g., FIG. 3).

The MEP 337 within the MEH 200 may be a collection of essential functionality required to run MEAs 336 on a particular VI 338 and enable them to provide and consume MESs 337A. The MEP 337 can also provide various services and/or functions, such as offering an environment where the MEAs 336 can discover, advertise, consume and offer MESs 337A (discussed infra), including MESs 337A available via other platforms when supported. The MEP 337 may be able to allow authorized MEAs 336 to communicate with 3P 310 servers located in external networks. The MEP 337 may receive traffic rules from the MEP manager 331, applications, or services, and instruct the data plane accordingly (see e.g., Traffic Rules Control 337B). The MEP 337 may send instructions to the DP 338A within the VI 338 via the Mp2 reference point. The Mp2 reference point between the MEP 337 and the DP 338A of the VI 338 may be used to instruct the DP 338A on how to route traffic among applications, networks, services, etc. In some implementations, the MEP 337 may translate tokens representing UEs XP01 in the traffic rules into specific internet protocol (IP) addresses. The MEP 337 may also receive DNS records from the mobile edge platform manager 331 and configure a DNS proxy/server accordingly. The MEP 337 may host MESs 337A including the mobile edge services discussed infra, and provide access to persistent storage and time of day information. Furthermore, the MEP 337 may communicate with other MEPs 337 of other MEHs 200 via the Mp3 reference point.

The VI 338 may represent the totality of all hardware and software components which build up the environment in which MEAs 336 and/or MEP 337 are deployed, managed and executed. The VI 338 may span across several locations, and the network providing connectivity between these locations is regarded to be part of the VI 338. The physical hardware resources of the VI 338 may include computing, storage and network resources that provide processing, storage and connectivity to MEAs 336 and/or MEP 337 through a virtualization layer (e.g., a hypervisor, virtual machine monitor (VMM), or the like). The virtualization layer may abstract and/or logically partition the physical hardware resources of the MEH 200 as a hardware abstraction layer. The virtualization layer may also enable the software that implements the MEAs 336 and/or MEP 337 to use the underlying VI 338, and may provide virtualized resources to the MEAs 336 and/or MEP 337, so that the MEAs 336 and/or MEP 337 can be executed.

The MEAs 336 may be applications that can be instantiated on an MEH 200 within the mobile edge system 400 and can potentially provide or consume MESs 337A. MEAs 336 may run as virtual machines (VM) on top of the VI 338 provided by the MEH 200, and can interact with the MEP 337 to consume and provide the MESs 337A. The MEAs 336 are instantiated on the VI 338 of the MEH 200 based on configuration or requests validated by the ME management 330. In some embodiments, the MEAs 336 can also interact with the MEP 337 to perform certain support procedures related to the lifecycle of the MEAs 336, such as indicating availability, preparing relocation of user state, etc. The MEAs 336 may have a certain number of rules and requirements associated to them, such as required resources, maximum latency, required or useful services, etc. These requirements may be validated by the mobile edge system level management 330, and can be assigned to default values if missing. MESs 337A may be services provided and consumed either by the MEP 337 or MEAs 336. When provided by an application, an MES 337A can be registered in a list of services 337D to the MEP 337 over the Mp1 reference point. Additionally, the MEAs 336 can subscribe to one or more services 337A for which it is authorized over the Mp1 reference point.

The mobile edge system 400 may support a feature called UverApps. When the mobile edge system 400 supports the feature UserApps, the mobile edge management may support the instantiation of MEAs 336 on multiple MEHs 200 following a single instantiation request, and when required by the operator in response to a request by the user. The application instance may need to fulfil a number of potential constraints predefined for the application. Once instantiated, connectivity may be established between the UE 101 and the application instance. Potential constraints may include latency, location, compute resources, storage resources, network capability, security conditions, and the like.

When the mobile edge system 400 supports the feature UserApps, the system 400 may, in response to a request by a user, support the establishment of connectivity between a UE 101 and an instance of a specific MEA 336 fulfilling the requirements of the MEA 336 regarding the UE 101. If no instance of the MEA 336 fulfilling these requirements is currently running, the mobile edge system management may create a new instance of the application on a mobile edge host 200 that fulfils the requirements of the application. Once instantiated, connectivity shall be established between the UE 101 and the new MEA 336 instance. Requirements of the application can include latency, location, compute resources, storage resources, network capability, security conditions, and the like. When the mobile edge system 400 supports the feature UserApps, the system 400 may support the on-boarding of MEAs 336 during the execution of an instantiation request, may allow the establishment of connectivity between a UE 101 and a specific instance of an MEA 336, may support the capability to terminate the MEA 336 instance when no UE 101 is connected to it anymore, and may support the termination of the MEA 336 running on multiple MEHs 200 following a single termination request.

As shown by FIG. 4, the Mp1 reference point is between the MEP 337 and the MEAs 336. The Mp1 reference point may provide service registration 337D, service discovery, and communication support for various services, such as the MESs 337A. In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MESs 337A may include radio network information services, location services, and bandwidth management services. Radio network information services, when available, may provide authorized MEAs 336 with radio network related information, and expose appropriate up-to-date radio network information to the MEAs 336. The radio network information may include, inter alia, radio network conditions, measurement and statistics information related to the user plane, information (e.g., UE 101 context and radio access bearers) related to UEs served by the radio node(s) associated with the mobile edge host, changes on information related to UEs served by the radio node(s) associated with the mobile edge host, and/or the like. The radio network information may be provided at the relevant granularity (e.g., per UE, per cell, per period of time).

The location services, when available, may provide authorized ME apps with location-related information, and expose such information to the ME apps. The location information may include, inter alia, the location of specific UEs currently served by the radio node(s) associated with the mobile edge host, information about the location of all UEs currently served by the radio node(s) associated with the mobile edge host, information about the location of a certain category of UEs currently served by the radio node(s) associated with the mobile edge host, a list of UEs in a particular location, information about the location of all radio nodes currently associated with the mobile edge host, and/or the like. The location information may be in the form of a geolocation, a Global Navigation Satellite Service (GNSS) coordinate, a Cell identity (ID), and/or the like. The bandwidth manager services may allow allocation of bandwidth to certain traffic routed to and from MEAs 336, and specify static/dynamic up/down bandwidth resources, including bandwidth size and bandwidth priority. MEAs 336 may use the bandwidth management services to update/receive bandwidth information to/from the MEP 337.

Figure 5:
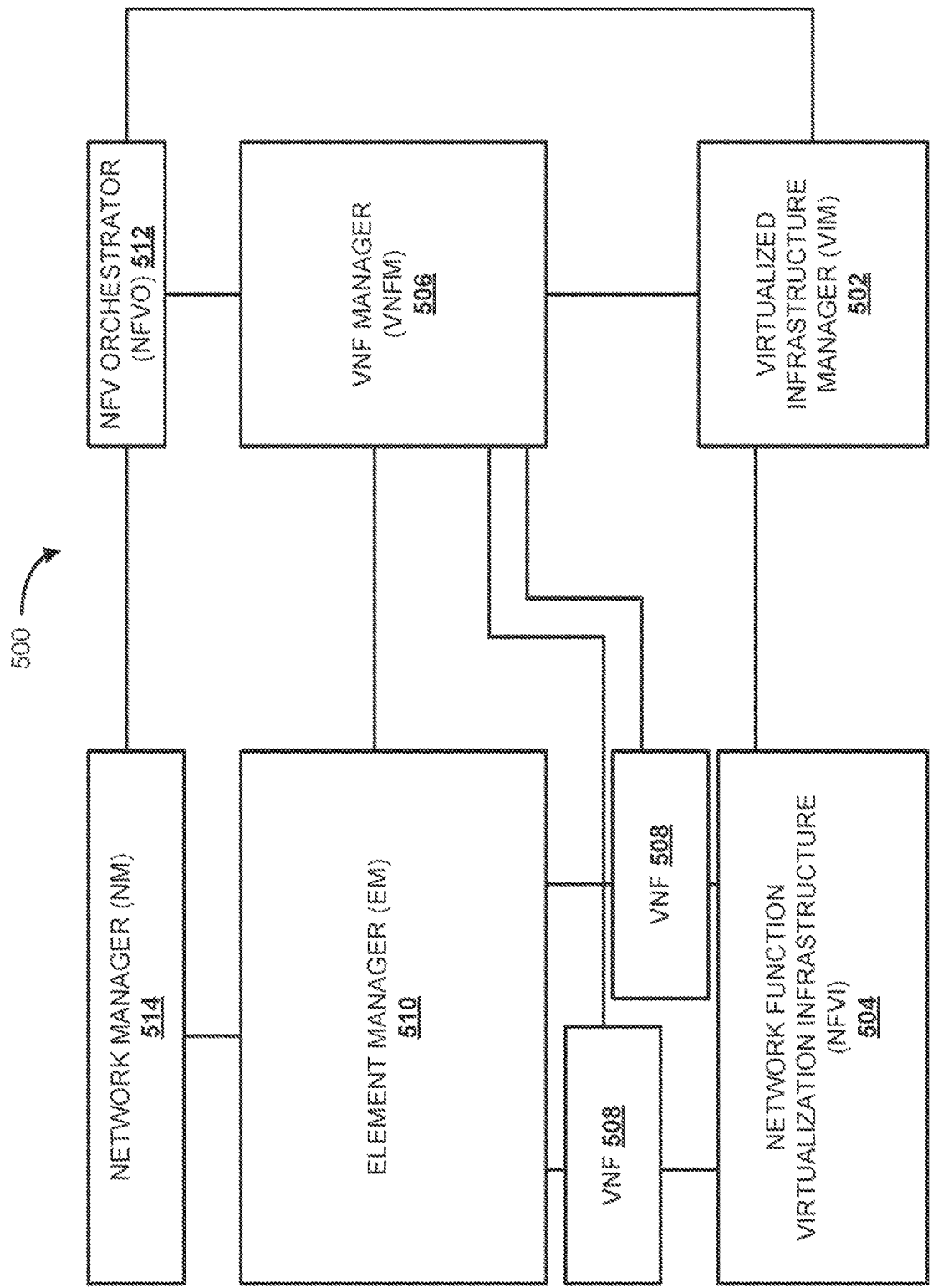
FIG. 5 depicts an example of an Network Function Virtualization (NFV) system in accordance with some embodiments.

Referring back to FIG. 4, mobile edge management comprises mobile edge system level management and the mobile edge host level management 330. The mobile edge host level management 330 comprises the MEP manager 331 and the VI manager 332, and handles the management of the mobile edge specific functionality of a particular MEH 200 and the applications running on it. In some implementations, some or all of the mobile edge management components may be implemented by one or more servers located in one or more data centers, and may use virtualization infrastructure that is connected with Network Functions Virtualization (NFV) infrastructure used to virtualize core network elements, or using the same hardware as the NFV infrastructure. An example NFV infrastructure is shown by FIG. 5.

The MEP manager 331 is responsible for managing the life cycle of applications including informing the mobile edge orchestrator (MEC-O) 321 of relevant application related events. The MEP manager 331 may also provide MEP element management functions (MEPE mgmt 331a) to the MEP 337, manage MEA rules and requirements (MERR mgmt 331b) including service authorizations, traffic rules, DNS configuration and resolving conflicts, and manage MEA 336 lifecycles (MEALC mgmt 331). The mobile edge platform manager 331 may also receive virtualized resources fault reports and performance measurements from the VI manager 332 for further processing. The Mm5 reference point between the mobile edge platform manager 331 and the MEP 337 is used to perform platform configuration, configuration of the MEPE mgmt 331a, the MERR mgmt 331b, the MEALC mgmt 331, management of application relocation, etc.

The VI manager 332 may be an entity that allocates, manages and releases virtualized (compute, storage and networking) resources of the VI 338, and prepares the VI 338 to run a software image. To do so, the VI manager 332 may communicate with the VI 338 over the Mm7 reference point between the VI manager 332 and the VI 338. Preparing the VI 338 may include configuring the VI 338, and receiving/storing the software image. When supported, the VI manager 332 may provide rapid provisioning of applications, such as described in "Openstack++ for Cloudlet Deployments", available at http://reports-archive.adm.cs.cmu.edu/anon/2015/CMU-CS-15-123.pdf.

The VI manager 332 may also collect and report performance and fault information about the virtualized resources, and perform application relocation when supported. For application relocation from/to external cloud environments, the VI manager 332 may interact with an external cloud manager to perform the application relocation, for example using the mechanism described in "Adaptive VM Handoff Across Cloudlets", and/or possibly through a proxy. Furthermore, the VI manager 332 may communicate with the mobile edge platform manager 331 via the Mm6 reference point, which may be used to manage virtualized resources, for example, to realize the application lifecycle management. Moreover, the VI manager 332 may communicate with the MEC-O 321 via the Mm4 reference point, which may be used to manage virtualized resources of the MEH 200, and to manage application images. Managing the virtualized resources may include tracking available resource capacity, etc.

The mobile edge system level management includes the MEC-O 321 as a core component, which has an overview of the complete mobile edge system 400. The MEC-O 321 may maintain an overall view of the mobile edge system 400 based on deployed mobile edge hosts 200, available resources, available MESs 337A, and topology. The Mm3 reference point between the MEC-O 321 and the mobile edge platform manager 330 may be used for the management of the application lifecycle, application rules and requirements and keeping track of available MESs 337A. The MEC-O 321 may communicate with the user application lifecycle management proxy (UALMP) 325 via the Mm9 reference point in order to manage MEAs 336 requested by UE application 305.

The MEC-O 321 may also be responsible for on-boarding of application packages, including checking the integrity and authenticity of the packages, validating application rules and requirements and if necessary adjusting them to comply with operator policies, keeping a record of on-boarded packages, and preparing the virtualization infrastructure manager(s) 332 to handle the applications. The MEC-O 321 may select appropriate MEH(s) 200 for application instantiation based on constraints, such as latency, available resources, and available services. The MEC-O 321 may also trigger application instantiation and termination, as well as trigger application relocation as needed and when supported.

The Operations Support System (OSS) 322 refers to the OSS of an operator that receives requests via the Customer Facing Service (CFS) portal 306 (and over the Mx1 reference point) and from UE applications 305 for instantiation or termination of MEAs 336, and decides on the granting of these requests. The CFS portal 306 (and the Mx1 interface) may be used by third-parties to request the mobile edge system 400 to run applications 306 in the mobile edge system 400. Granted requests may be forwarded to the MEC-O 321 for further processing. When supported, the OSS 322 also receives requests from UE applications 305 for relocating applications between external clouds and the mobile edge system 400. The Mm2 reference point between the OSS 322 and the mobile edge platform manager 330 is used for the mobile edge platform 330 configuration, fault and performance management. The Mm1 reference point between the MEC-O 321 and the OSS 322 is used for triggering the instantiation and the termination of mobile edge applications 336 in the mobile edge system 400.

The user application lifecycle management proxy ("user app LCM proxy") 325 may authorize requests from UE applications 305 in the UE 101 and interacts with the OSS 322 and the MEC-O 321 for further processing of these requests. The user app LCM proxy 325 may interact with the OSS 322 via the Mm8 reference point, and is used to handle UE applications 305 requests for running applications in the mobile edge system 400. A user application 305 may be an ME app 336 that is instantiated in the mobile edge system 400 in response to a request of a user via an application running in the UE 101 (e.g., UE application 305). The user app LCM proxy 325 allows UE applications 305 to request on-boarding, instantiation, termination of user applications and when supported, relocation of user applications in and out of the mobile edge system 400. It also allows informing the UE applications 305 about the state of the user applications 305. The user app LCM proxy 325 is only accessible from within the mobile network, and may only be available when supported by the mobile edge system 400. A UE application 305 may use the Mx2 reference point between the user app LCM proxy 325 and the UE application 305 to request the mobile edge system 400 to run an application in the mobile edge system 400, or to move an application in or out of the mobile edge system 400. The Mx2 reference point may only be accessible within the mobile network and may only be available when supported by the mobile edge system.

In order to run an MEA 336 in the mobile edge system 400, the MEC-O 321 may receive requests triggered by the OSS 322, a third-party 310, or a UE application 305. In response to receipt of such requests, the MEC-O 321 may select an MEH 200 to host the MEA 336 for computational offloading. These requests may include information about the application to be run, and possibly other information, such as the location where the application needs to be active, other application rules and requirements, as well as the location of the application image if it is not yet on-boarded in the MEC system 400.

In various embodiments, the MEC-O 321 may select an MEH 200 for computational offloading of UE application 305 tasks based on MEH parameters, network capabilities and conditions, and application requirements. The MEH parameters may indicate available resources of each MEH 200 that are considered to be candidates for computational offloading. The network capabilities and conditions may include information related to supported functionalities of the UEs 101, APs 106 and/or ANs 111/112; the RAT types of each AP 106 and/or AN 111/112; environmental information; fronthaul link conditions (e.g., links 103, 105, and/or 107 as shown by FIG. 1); and backhaul link conditions (e.g., S1-U/S1-MME links, link 125, and links between MEH 200-3 and network 150 as shown by FIG. 1). The capabilities and/or supported functionalities information may include information/data related to hardware configurations/platforms, antenna configurations, supported radio technologies or functionalities of a device (e.g., whether a UE 101 supports Bluetooth/BLE; whether an AN 111/112 supports LTE-WLAN aggregation (LWA) and/or LTE/WLAN Radio Level Integration with IPsec Tunnel (LWIP), etc.), and may include subscription information of particular UEs 101. The environmental information may include information/data related to geographic objects (e.g., mountains) and/or human-created objects (e.g., buildings, highways, etc.) in a given cell or coverage area, weather data for a given location, the location of various UEs 101, and the like.

The backhaul link conditions may include network performance information related to network traffic measurements (e.g., measurements of the amount and type of traffic flowing through or across one or more network nodes), as well as various performance measurements. The performance measurements may include information/data related to bandwidth, throughput or data rate, latency, jitter, error rate, a number of active UEs 101 and/or user sessions, packet delay, call and/or connection drops, loss rate, data volume measurements, round trip times (RTTs) and/or round-trip delay times (RTDs), etc. The fronthaul link conditions may include the aforementioned traffic and performance measurements, as well as information/data related to signal power measurements (e.g., reference signal received power (RSRP), received signal strength indicator (RSSI), etc.), signal quality measurements (e.g., reference signal received quality (RSRQ), energy per bit to noise power spectral density ratio (I/No), signal-to-noise ratio (SNR), signal-to-interference-plus-noise ratio (SINR), etc.), channel state information (CSI), channel or network access information (e.g., a number of radio resource control (RRC) connection/setup/reconfiguration attempts, a number of random access and/or random access channel (RACH) attempts, a number of radio link failures (RLFs), a number of handovers (HOs)/HO attempts/HO failures, etc.), and the like.

The application requirements may be rules and requirements associated to/with one or more MEAs 336, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; mobile edge services that are required and/or useful for the MEAs 336 to be able to run; mobile edge services that the MEAs 336 can take advantage of, if available; connectivity or mobility support/requirements (e.g., application state relocation, application instance relocation); required mobile edge features, such as VM relocation support or UE identity; required network connectivity (e.g., connectivity to applications within the mobile edge system, connectivity to local networks, or to the Internet); information on the operator's mobile edge system deployment or mobile network deployment (e.g., topology, cost); requirements on access to user traffic; requirements on persistent storage; traffic rules; DNS rules, etc.

The MEC-O 321 may consider the requirements and information listed above and information on the resources currently available in the MEC system 400 to select one or several MEHs 200 within the mobile edge system 400 to host MEAs 336 and/or for computational offloading. After one or more MEHs 200 are selected, the MEC-O 321 may request the selected MEH(s) 200 to instantiate the application(s) or application tasks. The actual algorithm used to select the MEHs 200 depends on the implementation, configuration, and/or operator deployment. In various embodiments, the selection algorithm may be based on the task offloading embodiments discussed herein, for example, by taking into account energy consumption of computation and communication requirements of an application (or application tasks) as well as network functionalities, processing, and offloading coding/encodings, or differentiating traffic between various RATs. Under certain circumstances (e.g., UE mobility events resulting in increased latency, load balancing decisions), and if supported, the MEC-O 321 may decide to select a new MEH 200 and initiate the transfer of an application instance or application-related state information from a source MEH 200 to a target MEH 200.

FIG. 5 illustrates components of an NFV system 500, according to various example embodiments. NFV system 500 may include architectures and infrastructures that are used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions. The system 500 is illustrated as including a virtualized infrastructure manager (VIM) 502, a network function virtualization infrastructure (NFVI) 504, a VNF manager (VNFM) 506, virtualized network functions (VNFs) 508, an element manager (EM) 510, an NFV Orchestrator (NFVO) 512, and a network manager (NM) 514.

The VIM 502 manages the resources of the NFVI 504. The NFVI 504 can include physical or virtual resources and applications (including hypervisors) used to execute the system 500. The VIM 502 may manage the life cycle of virtual resources with the NFVI 504 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 506 may manage the VNFs 508. The VNFs 508 may be used to execute EPC components/functions. The VNFM 506 may manage the life cycle of the VNFs 508 and track performance, fault and security of the virtual aspects of VNFs 508. The EM 510 may track the performance, fault and security of the functional aspects of VNFs 508. The tracking data from the VNFM 506 and the EM 510 may comprise, for example, performance measurement (PM) data used by the VIM 502 or the NFVI 504. Both the VNFM 506 and the EM 510 can scale up/down the quantity of VNFs of the system 500.

The NFVO 512 may coordinate, authorize, release and engage resources of the NFVI 504 in order to provide the requested service (e.g., to execute an EPC function, component, or slice). The NM 514 may provide a package of end-user functions with the responsibility for the management of a network, which may include network elements with VNFs, non-virtualized network functions, or both (management of the VNFs may occur via the EM 510).

Figure 6:
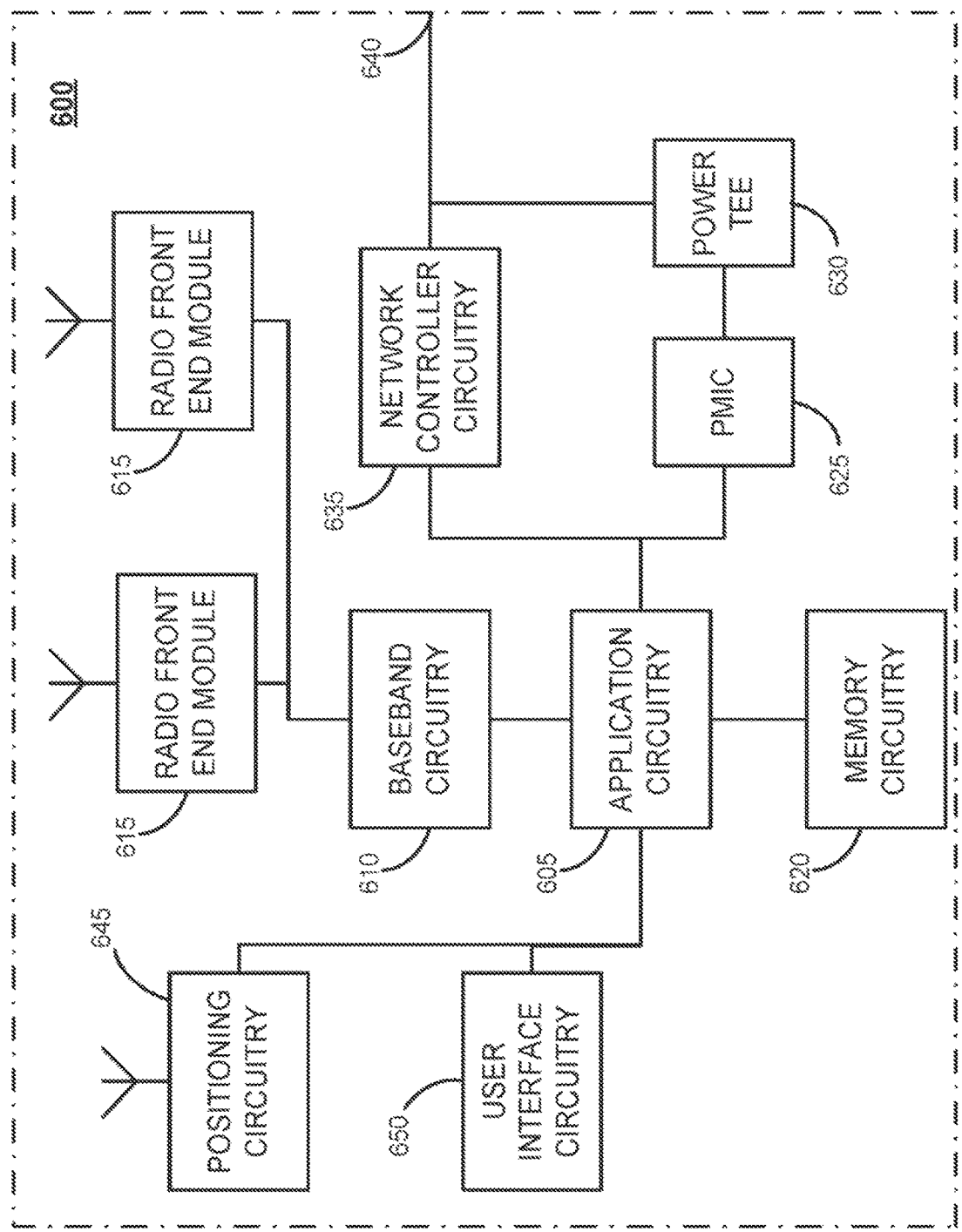
FIG. 6 depicts an example of infrastructure equipment in accordance with various embodiments.

FIG. 6 illustrates an example of infrastructure equipment 600 in accordance with various embodiments. The infrastructure equipment 600 may be implemented as a base station, radio head, RAN node, etc., such as the ANs 111 and 112, and/or AP 106 shown and described previously. The infrastructure equipment 600 may include one or more of application circuitry 605, baseband circuitry 610, one or more radio front end modules 615, memory 620, power management circuitry 625, power tee circuitry 630, network controller 635, network interface connector 640, satellite positioning circuitry 645, and user interface 650.

Application circuitry 605 may include one or more central processing unit (CPU) cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD/) MultiMediaCard (MMC) or similar, Universal Serial Bus (USB) interfaces, Mobile Industry Processor Interface (MIPI) interfaces and Joint Test Access Group (JTAG) test access ports. In some embodiments, user interface 650 may include one or more of physical or virtual buttons, such as a reset button, one or more indicators such as light emitting diodes (LEDs) and a display screen. As examples, the application circuitry 605 may include one or more Intel Pentium®, Core®, or Xeon® processor(s); Advanced Micro Devices (AMD) Ryzen® processor(s), Accelerated Processing Units (APUs), or Epyc® processors; and/or the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (for example, the radio front end modules 615).

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory circuitry 620 may be implemented as one or more of solder down packaged integrated circuits, socketed memory modules and plug-in memory cards. Although not shown by FIG. 6, in embodiments, the memory circuitry 620 may store program code or instructions for various modules, such as an application ofiloader and/or characteristics detector, which may be the same or similar to the ofiloader 732 and the characteristics detector 731 shown and described with regard to FIG. 7.

The power management integrated circuitry (PMIC) 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 using a physical connection, which may be electrical (commonly referred to as a "copper interconnect"), optical, or wireless.

The positioning circuitry 645, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 645 and/or positioning circuitry implemented by UEs 101, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 645 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 645 may provide data to application circuitry 605 which may include one or more of position data or time data. Application circuitry 605 may use the time data to synchronize operations with other radio base stations (e.g., RAN nodes 111, 112, XR11 or the like).

Figure 7:
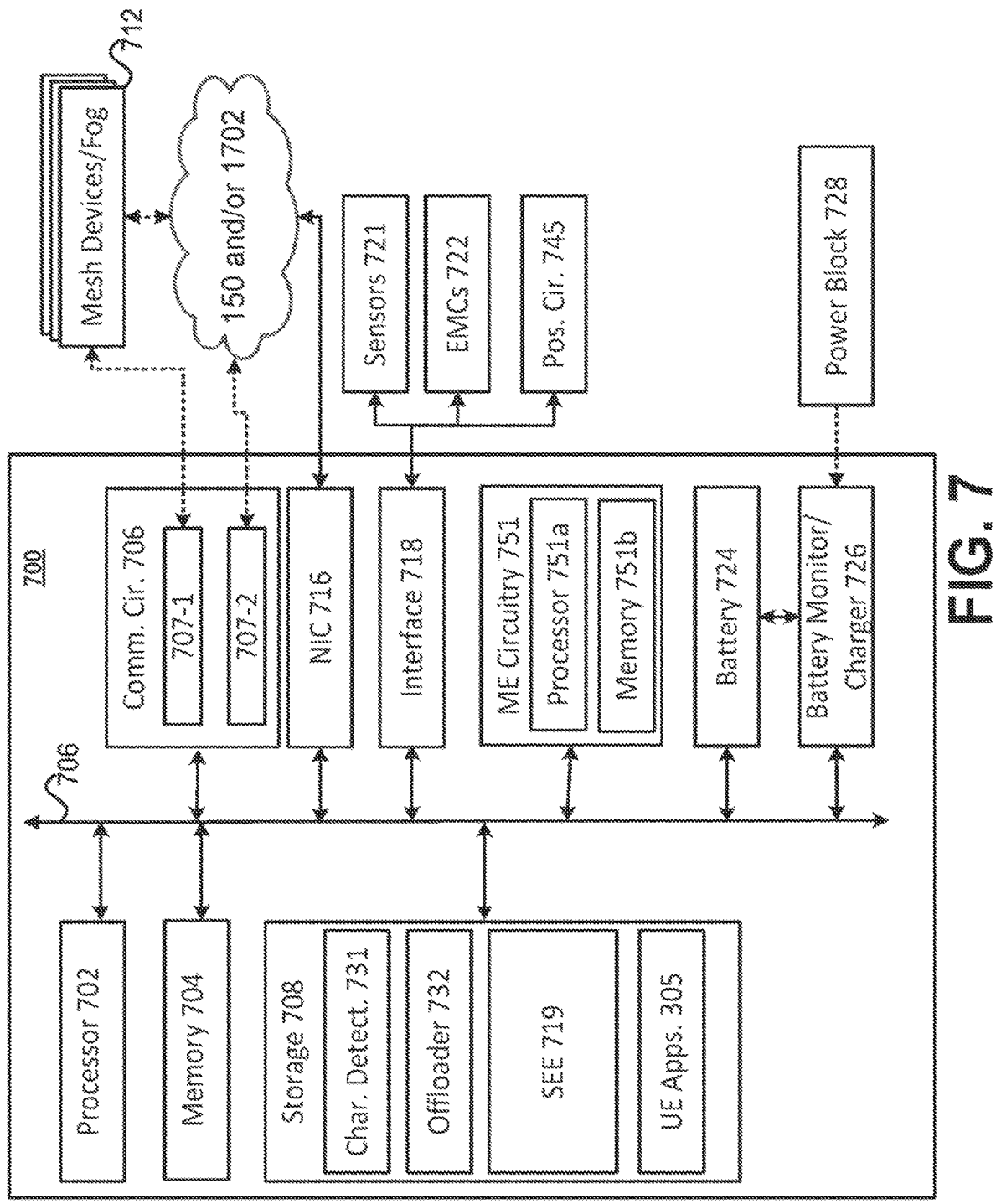
FIG. 7 depicts an example of a computer platform in accordance with various embodiments.

FIG. 7 illustrates an example of a computing platform 700 in accordance with various embodiments. In embodiments, the computer platform 700 may be suitable for use as UEs 101, ANs 111/112, AP 106, IoT device 1504; IoT devices 1714-1724; GW 1710; IoT devices 1804; server(s) 130, and/or any other element/device discussed herein with regard to FIGS. 3-18. FIG. 7 shows a block diagram of an example of components that may be present in the computer platform 700. The computer platform 700 may include any combinations of the components shown in the example. The components may be implemented as ICs, portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in different implementations.

The computer platform 700 may include a processor 702, which may be a microprocessor, a multi-core processor, a multithreaded processor, an ultra-low voltage processor, an embedded processor, or other known processing element. The processor 702 may be a part of a system on a chip (SoC) in which the processor 702 and other components are formed into a single integrated circuit, or a single package, such as the Edison™ or Galileo™ SoC boards from Intel. As an example, the processor 702 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

Additionally or alternatively, processor 702 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of processor 702 may comprise logic blocks or logic fabric including and other interconnected resources that may be programmed to perform various functions, such as the procedures, methods, functions, etc. of the various embodiments discussed herein. In such embodiments, the circuitry of processor 702 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The processor 702 may communicate with a system memory 704 over a bus 706. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 708 may also couple to the processor 702 via the bus 706. To enable a thinner and lighter system design the mass storage 708 may be implemented via a solid state disk drive (SSDD). Other devices that may be used for the mass storage 708 include flash memory cards, such as SD cards, microSD cards, xD picture cards, and the like, and USB flash drives. In low power implementations, the mass storage 708 may be on-die memory or registers associated with the processor 702. However, in some examples, the mass storage 708 may be implemented using a micro hard disk drive (HDD). Further, any number of new technologies may be used for the mass storage 708 in addition to, or instead of, the technologies described, such resistance change memories, phase change memories, holographic memories, or chemical memories, among others. For example, the computer platform 700 may incorporate the three-dimensional (3D) cross-point (XPOINT) memories from Intel® and Micron®.

The operating systems (OSs) may be a general purpose operating system or an operating system specifically written for and tailored to the computer platform 700. The OSs may include one or more libraries or APIs, which provide program code and/or software components for one or more applications to obtain and use the data from the secure execution environment (SEE) 715 and/or the ME circuitry 751. The Secure Execution Environment (SEE) 719, the Management Engine (ME) circuitry 751, or both the SEE 719 and ME circuitry 751 may be referred to as a trusted execution environment (TEE) and the like.

In embodiments, the memory 704 and/or storage 708 may be divided into one or more trusted memory regions for storing applications or software modules of the SEE 719. These trusted memory regions may be hardware enforceable containers called enclaves, secure enclaves, and the like. The enclaves may be one or more isolated regions of memory 704 and/or storage 708 that are encrypted within the memory 704 and/or storage 708, and only decrypted inside the processor 702. The secure enclaves may be used to store security critical code and/or data, such as secure applications (not shown) and/or an enclave OS (not shown). The memory 704 and/or storage 708 may be divided into multiple enclaves, wherein each enclave may include its own applications and/or data. From a physical point of view, enclave data is resident within registers, caches, and/or other logic blocks inside the application circuitry or host architecture (e.g., processor 702, memory 704, storage 708, etc.). Unauthorized access via untrusted software is prevented by processor logic. Whenever enclave data leaves the on-package caches to be written to memory 704 and/or storage 708, the data is automatically encrypted and integrity protected, which reduces the likelihood enclave data will be viewed, modified, or replayed. In some embodiments, the enclaves may be defined and managed by a virtual machine monitor (VMM) of a virtual machine running as a guest OS. Any suitable VMM may be used to define the secure enclaves. In various embodiments, the SEE 719 may be one or more secure enclaves defined using the Intel® SGX instructions. A detailed discussion of enclave establishment and operation (including communication between two or more enclaves, and between an enclave and remote devices) is discussed in the commonly assigned Int'l App. No. PCT/US2016/037634 and U.S. application Ser. No. 15/473,370, both of which are incorporated by reference in their entireties.

The components may communicate over the bus 706. The bus 706 may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus 706 may be a proprietary bus, for example, used in a SoC based system. Other bus systems may be included, such as an $I^2C$ interface, an SPI interface, point to point interfaces, and a power bus, among others.

The bus 706 may couple the processor 702 to the communication circuitry 706 for communications with other devices. In embodiments, the communication circuitry 706 may comprise one or more memory devices, one or more processors used to perform various operations to communicate in accordance with one or more wireless communications protocols (e.g., where each processor is dedicated implement a particular protocol stack of a corresponding wireless protocol), one or more audio digital signal processor(s) (DSP) including elements for compression/decompression and echo cancellation, and may include other suitable processing elements in other embodiments. The processors of the communication circuitry 706 may be the same or similar to the processor 702 discussed previously. In various embodiments, communication circuitry 706 may interface with the application circuitry of the computer platform 700 (e.g., processor(s) 702, memory 704, and storage 708) for generation and processing of the signals and for controlling operations of the transceivers 707-1, 707-2.

The communication circuitry 706 may process signals received from receive signal paths of radiofrequency (RF) circuitry and generate signals for transmit signal paths of the RF circuitry.

In some implementations, the communication circuitry 706 may include one or more baseband processors or control logic to process/generate the baseband signals for a corresponding radio access technology (e.g., a baseband processor for communication using LTE, a baseband processor for communicating using 5G/NR, a baseband processor for communicating using WiFi, a baseband processor for Bluetooth/BLE, etc.). In other implementations, some or all of the functionality of the aforementioned baseband processors may be included as modules stored in ob-board memory of the communication circuitry 706 and executed via a Central Processing Unit (CPU) of the communication circuitry 706. The communication circuitry 706 may also include interfaces to interface with the processor(s) 702 for generation and processing of the baseband signals and for controlling operations of the RF circuitry. The processor(s) 702 and processors of the communication circuitry 706, alone or in combination, may be used to execute elements of one or more instances of a protocol stack. For example, processors of the communication circuitry 706, alone or in combination, may execute Layer 3, Layer 2, or Layer 1 functionality, while processors of the application circuitry XT04 may utilize data (e.g., packet data) received from these layers and further execute Layer 4 functionality (e.g., transmission communication protocol (TCP) and user datagram protocol (UDP) layers). As used herein, "Layer 3" may comprise a non-access stratum (NAS) layer and radio resource control (RRC) layer; "Layer 2" may comprise a medium access control (MAC) layer, a radio link control (RLC) layer, and a packet data convergence protocol (PDCP) layer; and "Layer 1" may comprise a physical (PHY) layer of a UE 101, AP 106, and/or AN 111/112.

The communication circuitry 706 handle various radio control functions that enable communication with one or more radio networks according to one or more particular wireless communications protocols via the RF circuitry (e.g., devices 707-1 and 707-2). The radio control functions may include, but are not limited to, signal modulation/demodulation, encoding/decoding, radio frequency shifting, etc. In some embodiments, modulation/demodulation circuitry of the baseband circuitry XT04 may include Fast-Fourier Transform (FFT), precoding, or constellation mapping/demapping functionality. In some embodiments, encoding/decoding circuitry of the communication circuitry 706 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

The communication circuitry may include RF circuitry to enable communication with various wireless networks using modulated electromagnetic radiation through a non-solid medium. In various embodiments, the RF circuitry may include switches, filters, amplifiers, etc. to facilitate the communication with the various wireless networks (e.g., network 150, cloud 1702, etc.). The RF circuitry may include a receive signal path which may include circuitry to down-convert RF signals received from front-end module (FEM) circuitry and provide baseband signals to the baseband processors discussed previously. The RF circuitry may also include a transmit signal path which may include circuitry to up-convert baseband signals provided by the baseband processors and provide RF output signals to the FEM circuitry for transmission. The RF circuitry may include the devices 707-1 and 707-2.

The device 707-1 (also referred to as a "mesh transceiver" and the like) may be used for communications with other mesh devices 712, which may be included in a fog as discussed previously. The mesh transceiver 707-1 may use any number of frequencies and protocols. For example, the mesh transceiver 707-1 may transmit/receive signals in the 2.4 gigahertz (GHz) range as specified by the IEEE 802.15.4 standard, or utilize other wireless communications protocols for communicating with mesh devices 712, such as the Bluetooth® low energy (BLE) standard, as defined by the Bluetooth® Special Interest Group, or the ZigBee® standard, among others. The communication circuitry 706 may be configured for any particular wireless communications protocol for the connections to the mesh devices 712. For example, mesh transceiver 707-1 may implement Wi-Fi™ communications in accordance with the Institute of Electrical and Electronics Engineers (IEEE) 802.11 standard. In addition, wireless wide area communications, for example, according to a cellular or other wireless wide area protocol, can occur via a wireless wide area network (WWAN) or via a specific cellular network.

The mesh transceiver 707-1 may include multiple radios (e.g., including hardware devices such as switches, filters, amplifiers, antenna elements, and the like to facilitate the communications over the air) to communicate using multiple standards for communications at different range. For example, the computer platform 700 may communicate with close devices (e.g., within about 10 meters) using a local transceiver based on BLE, or another low power radio, to save power. More distant mesh devices 712 (e.g., within about 50 meters) may be reached over ZigBee or other intermediate power radios. Both communications techniques may take place over a single radio at different power levels, or may take place over separate transceivers/radios, for example, a local transceiver/radio using BLE and a separate mesh transceiver/radio using ZigBee. Utilizing different wireless communications protocols may or may not include utilizing different radios within the mesh transceiver 707-1. The mesh transceiver 707-1 may be incorporated into an MCU as an address directly accessible by the chip, such as in the Curie® units available from Intel.

The device 707-2 (also referred to as a "cloud transceiver" and the like) may include one or more radios (e.g., including hardware devices such as switches, filters, amplifiers, antenna elements, and the like to facilitate the communications over the air) to communicate with devices in the cloud. For example, the cloud transceiver 707-2 may transmit/receive signals in the 2.4 GHz range as specified by the IEEE 802.15.4/g standards, and/or utilize other wireless communications protocols for communicating over the cloud, such as LoRaWAN™ (Long Range Wide Area Network) developed by Semtech and the LoRa Alliance, one or more WiFi protocols, and/or one or more cellular protocols discussed herein. Utilizing different wireless communications protocols may or may not include utilizing different radios within the cloud transceiver 707-2. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the devices 707-1 and 707-2, as described herein. For example, the communication circuitry 706 may include an LTE or other cellular transceiver that uses spread spectrum (SPA/SAS) communications for implementing high speed communications, such as for video transfers. Further, any number of other protocols may be used, such as Wi-Fi® networks for medium speed communications, such as still pictures, sensor readings, and provision of network communications.

The devices 707-1 and 707-2 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g., a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G)(Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11 ad, IEEE 802.11 ay, and the like. In addition to the standards listed above, any number of satellite uplink technologies may be used for the uplink transceiver 707-2, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

Network interface circuitry (NIC) 716 (also referred to as "network interface controller(s)" and the like) may be included to provide a wired communication to the cloud 1702 or to other devices, such as the mesh devices 712. To this end, the NIC 716 may include one or more dedicated processors and/or FPGAs to communicate using one or more wired communications protocol. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, a Time-Trigger Protocol (TTP) system, or a FlexRay system, among many others. An additional NIC 716 may be included to allow connect to a second network, for example, a NIC 716 providing communications to the cloud 1702 over Ethernet, and a second NIC 716 providing communications to other devices over another type of network, such as a personal area network (PAN) including a personal computer (PC) device.

The bus 706 may couple the processor 702 to an interface 718 that is used to connect external devices. The external devices may include sensors 721, such as accelerometers, level sensors, flow sensors, temperature sensors, pressure sensors, barometric pressure sensors, and the like. The interface 718 may be used to connect the computer platform 700 to electro-mechanical components (EMCs) 722, which may allow computer platform 700 to change its state, position, and/or orientation, or move or control a mechanism or system. The EMCs 722 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, computer platform 700 may be configured to operate one or more EMCs 722 based on one or more captured events and/or instructions or control signals received from a service provider and/or various clients. Additionally, the interface 718, sensors 721, and/or EMCs 722 may be collectively referred to as "event capture circuitry" and the like. In some embodiments, the event capture circuitry may also include battery monitor/charger 726, the processor 702, and/or other components in or coupled with platform 702. In some implementations, the interface 718 may connect the platform 700 with positioning circuitry 745, which may be the same or similar as the positioning circuitry 645 discussed with regard to FIG. 6.

Management engine (ME) circuitry 751 may be an isolated and tamper-resistant chipset, which is distinct from and generally operates independently of the processor 702. The ME circuitry 751 may be embodied as any number of hardware, firmware, and/or software modules configured to perform security, encryption, and/or authentication functions, as described herein. In some embodiments the ME circuitry 751 may be included in a graphics controller or graphics processing unit (GPU). In some embodiments, the ME circuitry 751 may be integrated into the application circuitry (e.g., a same circuit board or SoC as processor 702 and/or memory 704, etc.) or the communications circuitry 706 (e.g., a same circuit board or SoC as the modem circuitry 840, etc.). The ME circuitry 751 may additionally or alternatively include separate circuitry disposed on another circuit board or SoC that is communicatively coupled to the application circuitry and/or communications circuitry 706 via a signal path, such as bus 706. The ME circuitry 751 may be communicatively coupled to other components of the application circuitry via bus 706 and communicatively coupled to the communications circuitry 706 of the computer platform 700 via a separate bus, such as a private low pin count (LPC) serial bus the LPC serial bus that is not exposed to a host OS of the application circuitry.

ME circuitry 751 may include ME processor 751*a* and ME memory 751*b*. ME memory 751*b* may store crypto operations, which is a set of cryptographic algorithms or operations used for generating keys and encrypting/decrypting data. The keys may be used to encrypt/decrypt data being communicated through the ME circuitry 751. In some embodiments, the keys may be generated based on one or more measurements of the application circuitry. However, any suitable algorithm or operations may be used for key generation and/or encrypting/decrypting data. ME processor 751*a* may be any processing device capable of executing software modules or program code independently of the other processors of the application circuitry and may include tamper-resistant characteristics. ME processor 751*a* may include one or more microprocessors, DSPs, cryptoprocessors, secure cryptoprocessors, cryptographic accelerators, secure controllers, and/or any other suitable device. The ME memory 751*b* may be embodied as one or more volatile and/or non-volatile memory devices. The ME memory 751*b* may store various data, including software/firmware executable by the ME processor 751*a* and data used for the various cryptographic operations, program code for an ME OS (not shown), keys, and crypto operations, and/or the like.

ME processor 751*a* may implement an ME OS, which may be a framework that provides OS like functionality to trusted applications, and provides an API for client applications to access trusted applications. The ME OS may also include internal ME APIs or libraries, such as a cryptographic operations API to provide cryptographic capabilities (for example, the cryptographic algorithms/operations of crypto operations) to trusted applications, a trusted storage API to provide trusted storage for keys and other data, and a secure element API that provides mechanisms for an application to open a connection with a secure element. In some embodiments, the ME OS may also include firmware or drivers that provide override mechanisms for tamper-resistant hardware devices, and firmware or drivers for verifying digital certificates, etc. These firmware modules may ensure that various conditions are met before any new applications are provisioned within the ME circuitry 751. In some embodiments, the ME OS may include firmware modules for signing and verifying certificates using a certificate signing key pair. The firmware modules may verify a digital signature of certificates using a public key of the certificate signing key pair, and the private key of the certificate signing key pair is used by the security assist server to sign the certificates. The private key of this key pair may be stored in a secure data store associated with a remote provisioning service, and the public key of the key pair may be maintained in ME memory 751*b* as a firmware image that cannot be changed or altered (e.g., as one of the keys). In some embodiments, the ME OS may be any suitable OS or firmware, such as a real-time OS (RTOS) and the like.

In embodiments, the ME circuitry 751 may operate in accordance with the International Organization for Standardization (ISO) and International Electrotechnical Commission (IEC) specification ISO/IEC 11889:2009, which defines standards for trusted computing platforms. In embodiments, the ME circuitry may be a management engine provided by Intel®, a Converged Security Engine (CSE) or a Converged Security Management/Manageability Engine (CSME) provided by Intel®; Trusted Execution Technology (TXT) provided by Intel®; and/or the like. In some embodiments, the ME circuitry may operate in conjunction with Active Management Technology (AMT) provided by Intel® and/or Intel® vPro™ Technology (vPro). The Intel® AMT and/or Intel® vPr™ may allow for remote provisioning of the ME circuitry 751, and remote management of the ME circuitry once the ME circuitry has been successfully provisioned.

While not shown, various input/output (I/O) devices may be present within, or connected to, the computer platform 700. For example, a display may be included to show information, such as sensor readings or actuator position. An input device, such as a touch screen or keypad may be included to accept input. In another example, near-field communication (NFC) circuitry comprising an NFC controller coupled with an antenna element and a processing device may be included to read electronic tags and/or connect with another NFC-enabled device.

A battery 724 may power the computer platform 700, although in examples in which the computer platform 700 is mounted in a fixed location, it may have a power supply coupled to an electrical grid. The battery 724 may be a lithium ion battery, a metal-air battery, such as a zinc-air battery, an aluminum-air battery, a lithium-air battery, and the like.

A battery monitor/charger 726 may be included in the computer platform 700 to track the state of charge (SoCh) of the battery 724. The battery monitor/charger 726 may be used to monitor other parameters of the battery 724 to provide failure predictions, such as the state of health (SoH) and the state of function (SoF) of the battery 724. The battery monitor/charger 726 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 726 may communicate the information on the battery 724 to the processor 702 over the bus 706. The battery monitor/charger 726 may also include an analog-to-digital (ADC) convertor that allows the processor 702 to directly monitor the voltage of the battery 826 or the current flow from the battery 724. The battery parameters may be used to determine actions that the computer platform 700 may perform, such as transmission frequency, mesh network operation, sensing frequency, and the like.

A power block 728, or other power supply coupled to a grid, may be coupled with the battery monitor/charger 726 to charge the battery 724. In some examples, the power block 728 may be replaced with a wireless power receiver to obtain the power wirelessly, for example, through a loop antenna in the computer platform 700. A wireless battery charging circuit, such as an LTC4020 chip from Linear Technologies of Milpitas, Calif., among others, may be included in the battery monitor/charger 726. The specific charging circuits chosen depend on the size of the battery 724, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The mass storage 708 may include a number of modules 731, 732 to implement the various MEH 200 selection functions described herein, as well as functionality of other embodiments discussed herein. In some implementations, the modules may comprise software, a program, an application, an applet, an app, or other executable code for causing processor(s) 702 and/or processor(s) of the communication circuitry 706 to perform any one or more of the methodologies discussed herein. The modules 731, 732 may reside, completely or partially, within at least one of the aforementioned processors (e.g., within cache memory of the processor(s)), the memory/storage devices 704, 708, or any suitable combination thereof. Furthermore, any portion of the modules 731, 732 may be transferred to hardware resources from any combination of the peripheral devices or one or more databases. Although shown as code blocks in the mass storage 708, it may be understood that any of the modules may be replaced with hardwired circuits, for example, built into an ASIC, FPGA, and the like. For one embodiment, at least one of processors 702 may be packaged together with memory having one or more modules 731, 732 and/or any one or more of the other modules discussed herein, to form a System in Package (SiP) or System on Chip (SoC). For one embodiment, at least one of processors 702 may be integrated on the same die with memory having aspects of one or more modules 731, 732 and/or any one or more of the other modules/components (e.g., applications 305) discussed herein.

For example, the mass storage 708 may include code for one or more UE applications 305, which when executed by the processor(s) 702, may cause the platform 700 to perform various functions, such as interacting with the mobile edge system 400 via the user app LCM proxy 325.

In another example, the mass storage 708 may include code for a characteristics detector 731, which when executed by the processor(s) 702, may cause the platform 700 to perform various functions, such as controlling measurement of various channels (e.g., links 103, 105, 107, 125, S1-U/AP/MME, and/or any other link(s) shown by FIGS. 1-4) to measure, monitor, or otherwise obtain the network characteristics, performance measurements, etc. of each AN 111/112, AP 106, UEs 101, or other network element. In some embodiments, the characteristics detector 731 may obtain previously obtained measurements (e.g., as measured during an attachment or HO procedure) from the communications circuitry 706, or the communication circuitry 706 may store and execute the code of the characteristics detector 731.

In another example, the mass storage 708 may include code for an application offloader 732 (also referred to as "offloader 732" or the like), which when executed by the processor(s) 702, may cause the platform 700 to identify network characteristics of individual ANs 111/112, APs 106, UEs 101, etc.; identify MEH parameters of individual MEHs 200, which to indicate available resources of the individuals MEHs 200; identify application requirements of various application tasks of the one or more UE applications 305 for computational offloading at one or more MEHs 200; and select one or more MEHs 200 for computational offloading of the various application tasks based on the network characteristics, the MEH parameters, and the application requirements. The offloader 732, when executed, may also control transfer of the various application tasks to the selected MEH 200 for execution of the various application tasks during the computational offloading operations/procedures. In embodiments, the offloader 732 may obtain the network information and/or performance measurements from the characteristics detector 731, and may obtain the application requirements from the UE apps 305. In some embodiments, the communication circuitry 706 may store and execute the code of the offloader 732.

Decentralized Management of Computational Offloading

Figure 8:
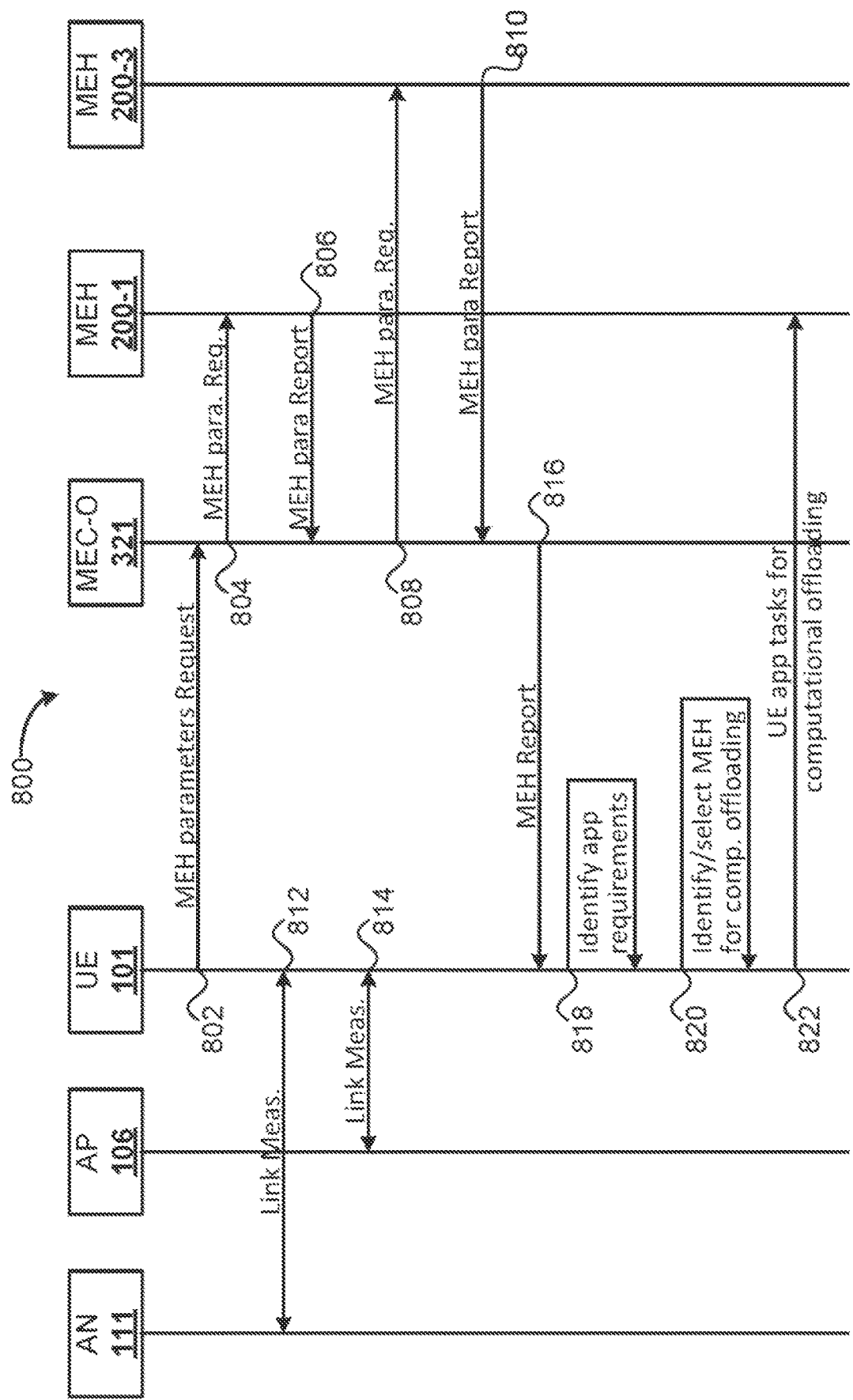
FIG. 8 depicts an example MEC decentralized management procedure in accordance with some embodiments.

FIG. 8 depicts an example MEC decentralized management procedure 800 in accordance with various embodiments. In these embodiments, a UE 101 may evaluate tradeoffs, determine an optimal offloading solution based on the collected inputs, and may request certain tasks to be offloaded to edge servers that are co-located with ANs/APs of different RATs. In the example of FIG. 8, the UE 101 may determine the tradeoffs for computational offloading between MEH 200-1 co-located with AN 111 and MEH 200-3 co-located with AP 106.

Referring to FIG. 8, the process 800 may begin at operation 802 where a UE 101 (e.g., operating the characteristic detector 731 or the offloader 732) may send a MEH parameters request to MEC-O 321 over an Mx2, Mm9, or Mm3 interface. In response to receipt of the MEH parameters request, at operations 804 and 808, the MEC-O 321 may send respective requests for MEH parameters to MEH 200-1 and MEH 200-3. Each of the MEHs 200-1 and 200-3 may generate and send respective MEH reports to the MEC-O 321 at operations 806 and 810, respectively. The MEHs 200 may identify their MEH parameters using a suitable API, trusted application, or the like to obtain or identify their MEH parameters. The request and report messages communicated between the MEC-O 321 and the MEHs 200 may be sent and received over respective Mm3 interfaces.

Meanwhile, at operations 812 and 814, the UE 101 (e.g., operating characteristic detector 731) may perform various RAT measurement procedures for signals from a first access node or RAT (e.g., AN 111 in FIG. 8) and a second access node or RAT (e.g., AP 106 in FIG. 8). At operation 816, the MEC-O 321 may generate and send an MEH report message including the MEH parameters of MEHs 200-1 and 200-3 to the UE 101 via the Mx2, Mm9, or Mm3 interface. As examples, the MEH parameters may include, inter alia, a computational capacity of each MEH 200, which may indicate a total CPU speed of one or more processors, a total number of VMs per MEH 200, and/or the like); currently available computational load, which may indicate unoccupied computational resources, such as available or unused memory, VMs, or the like; a security level of each MEH 200, which may indicate possible authentication and/or authorization required to access a MEH 200 and/or the like; a reuse degree of computational (MEC) resources, which may indicate whether a MEH 200 is only connected to an AP or, to multiple APs of the same RAT or different RATs; and/or other like parameters, such as those discussed herein.

In some embodiments, the MEH report may also include various identifiers and/or network addresses of the MEHs 200-1 and 200-3 in association with the MEH parameters, which may be used by the UE 101 to connect with and provide application tasks for offloading. In other embodiments, the UE 101 may provide the necessary MEH identifiers/addresses to the MEC-O 321 in the MEH parameters request (see operation 802), which may indicate particular MEHs 200 from which the MEC-O 321 is to request MEH parameters.

At operation 818, the UE 101 may identify application requirements of various application tasks of one or more UE apps 305 to be offloaded. In embodiments, the offloader 732 and/or the characteristic detector 731 may access application requirements of UE apps 305 using suitable APIs, middleware, drivers, configuration files, or other like mechanisms. At operation 820, the UE 101 may use the obtained MEH parameters, RAT measurements, and/or application requirements to evaluate offloading tradeoffs and select an appropriate MEH 200 for computational offloading.

In embodiments, the UE 101 may derive different metrics and tradeoffs based on the specific use cases (e.g., tasks) that the UE 101 wishes to offload. The different metrics/tradeoffs may be application parameters related to computational needs, input/output characteristics, and/or volume of exchanged data with the edge server(s). In embodiments, the application task of lower layer power hungry functions (e.g., PHY and MAC functions such as channel estimation, beamforming, etc.) may be offloaded, and application layer tasks (e.g., security keys generation, video processing/rendering, etc.) may be offloaded as well.

As mentioned previously, various characteristics and/or parameters (characteristics) may be considered during the tradeoff evaluation, such as network and radio link conditions, as well as application parameters and requirements. In embodiments, the various characteristics may be detected, identified, or obtained by the characteristic detector 732. The characteristic detector 732 may input or provide the characteristics to the offloader 732, which may perform the tradeoff evaluation. As an illustrative example, various tables are provided that describe example inputs to the offloader 732 and their usage for a tradeoff evaluation to determine an optimal offloading solution at operation 820 (e.g., selection of one or more MEHs 200).

Table 1 shows an example of radio link characteristics, including average data rate and latency from the UE 101 to (e.g., AN 111 and AP 106 in FIG. 8), for each RAT (e.g., AN 111 co-located with MEH 200-1 and AP 106 co-located with 200-3). Table 1 also shows the type of RAT associated with each MEH 200.

TABLE 1

Example input characteristics of the radio connection

| MEC Host candidates for task offloading | Type of RAT (WiFi, LTE, ...) | Average data rate [Megabits per second (Mbps)] | Average RTT [milliseconds (ms)] |
|---|---|---|---|
| MEH 200-1 | LTE | 10 Mbps | 60 ms |
| MEH 200-3 | WiFi | 15 Mbps | 80 ms |

Table 2 shows input application parameters of a particular UE app 305. The application parameters of table 2 include task frequency (e.g., how often the task should be offloaded over time), computation load in terms of Giga Floating Point Operations Per Second (GFLOPS) data volume to be transferred as input for offloading the task (e.g., data to be sent by UE 101 for offloading), and data volume to be transferred as an output for offloading the task (e.g., data to be sent back to the UE 101 after offloading).

TABLE 2

Example input application parameters

| Task frequency [runs/min] | Task Computational load [GFLOPS] | Data volume (input) [Mbyte/run] | Data volume (output) [Mbyte/run] |
|---|---|---|---|
| 60 | 1 | 2 | 0.5 |

Table 3 shows an input pre-assessment of latency and energy consumption for the different offloading opportunities, considering both input/output data transfer and computation.

TABLE 3

Example input pre-assessment

| Target device (hosting the task) | Latency (Input/ ouput) [ms] | Energy consumption (input/ output) [milliJoules (mJ)] | Latency (computation) [ms] | Energy consumption (computation) [mJ] |
|---|---|---|---|---|
| UE | n.a. | n.a. | 900 | 300 |
| MEH 200-1 | (30/30) | (20/20) | 50 | 50 |
| MEH 200-3 | (40/40) | (10/10) | 20 | 100 |

At least some of the values in table 3 may be partially based on the inputs of tables 1 and 2. For example, the offloader 732 and/or the characteristic detector 731 may determine the latency of the input/output data transfer based on the quality of the radio links in table 1. In another example, the offloader 732 and/or the characteristic detector 731 may determine the energy consumption based on the GFLOPS in table 2, which may be multiplied by the normalized energy consumption of the target device (in mJ/GFLOP).

Based on the inputs of tables 1, 2, and 3, the offloader 732 may evaluate tradeoffs and determine an optimal offloading candidate (e.g., a target MEH 200). In embodiments, the characteristic detector 731 and the offloader 732 of the UE 101 may collect measurements of MEH 200 candidates and related APs/ANs for each application task to be offloaded in order to build the above input tables 1, 2, and 3. The offloader 732 of the UE 101 may then generate an output table (e.g., table 4 infra) using the inputs of the tables 1, 2, and 3. In one example, the UE 101 may determine the optimal offloading target/candidate by means of comparing the latency/energy budget for every solution, including solutions that do not involve any external host and/or do not use task offloading. Table 4 shows an example output that was derived by the sum of all budget components in the input table 3.

TABLE 4

Example outputs based on tables 1, 2, and 3

| Target device (hosting the task) | Latency budget [ms] | Energy consumption budget [mJ] |
|---|---|---|
| UE | 900 | 300 |
| MEH 200-1 | 110 | 90 |
| MEH 200-3 | 100 | 120 |

In the example of table 4, MEH 200-1 may provide better energy efficiency than MEH 200-3, and MEH 200-1 may have a slightly worse latency performance than MEH 200-3. Different policies or configurations may be used by the offloader 732 to select an optimal offloading target MEH 200 based on the output. The policies/configurations may emphasize or prioritize different outputs and/or for different applications. For example, a policy/configuration may indicate to select offloading hosts based on latency budget minimization (e.g., selecting based on latency performance over energy consumption); based on energy consumption minimization (e.g., selecting based on energy consumption over latency performance); based on a latency budget threshold; based on an energy consumption threshold; minimizing energy consumption and being within a latency threshold; minimizing latency and being within an energy consumption threshold; and/or the like. In some embodiments, a selection of targets may be compiled into a shortlist of target devices based on first conditions/criteria, and a target device may be selected from the shortlist based on second conditions/criteria. For example, a shortlist of candidate devices having a threshold energy consumption could be compiled, and a target device having a best latency performance among the candidates may be selected from the shortlist as the optimum offloading host. In some embodiments, a suitable weighting algorithm may be used to emphasize some criteria over other criteria. Other weighting, ranking, prioritization, and selection mechanisms or methods may be used in various embodiments.

Referring back to FIG. 8, after performing the tradeoff evaluation, the offloader 732 of the UE 101 has selected the MEH 200-1, and at operation 822, the offloader 732 of the UE 101 may control transfer of application tasks to the MEH 200-1 for execution. In some embodiments, in addition to, or alternative to sending application tasks, the UE 101 may provide inputs for various functions of the one or more UE applications, and the MEH 200-1 may access those functions from memory or a remote storage (e.g., cloud storage or an application server 130). In some such embodiments, the UE 101 may indicate an identifier of the UE app 305 and/or a memory/storage location where the application tasks/functions can be located.

Centralized Management of Computational Offloading

Figure 9:
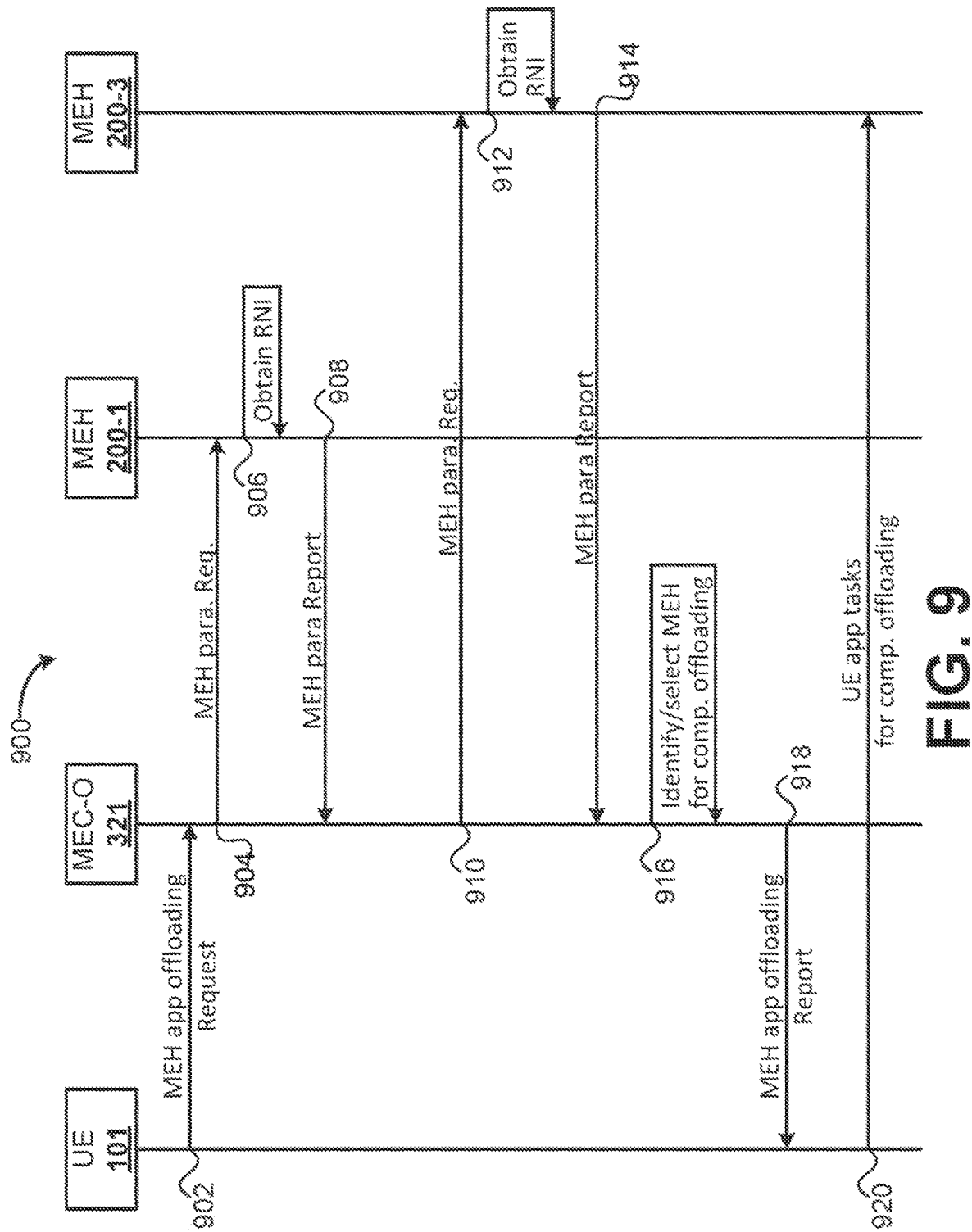
FIG. 9 depicts an example MEC centralized management procedure in accordance with some embodiments.

FIG. 9 depicts an example MEC centralized management procedure 900 in accordance with various embodiments. In these embodiments, a MEC system 400 may evaluate tradeoffs and determine an optimal offloading host/target based on collected inputs (e.g., the parameters discussed previously). The optimal offloading host/target may be indicated to the UE 101 for MEC offloading by sending a request to offload certain tasks to edge servers co-located with different RATs.

Referring to FIG. 9, process 900 may begin at operation 902 where a UE 101 may send a MEH application offloading request to an MEC-O 321 over an Mx2, Mm9, or Mm3 interface. The MEH application offloading request may indicate various tasks to be offloaded, such as whether the tasks are related to application layer or MAC/PHY layer functions. In some embodiments, the MEH application offloading request may include or indicate various application requirements of a UE app 305 to be offloaded. In some embodiments, the MEH application offloading request may indicate (e.g., using a policy/configuration index, key, identifier, etc.) or include a particular policy/configuration, such as the policy/configuration discussed previously, to use for the evaluating offloading tradeoffs. In some embodiments, the MEC-O 321 may determine the policy/configuration to be used for the offloading tradeoff evaluation based on UE capabilities, subscription information, congestion or overload criteria/parameters, and/or other like parameters/criteria.

In response to receipt of the MEH offloading request, at operations 904 and 910, the MEC-O 321 (e.g., the offloader 731 and/or characteristic detector 732 operated by the MEC-O 321) may send respective requests for MEH parameters to MEH 200-1 and MEH 200-3, respectively. These MEH parameter requests may be sent over respective Mm3 interfaces with the MEHs 200. At operations 906 and 912, the MEHs 200-1 and 200-3 may obtain respective RNI using, for example, the RNI API 340 discussed previously. At operations 908 and 914, the MEHs 200-1 and 200-3 may generate and send their respective MEH parameter reports to the MEC-O 321. In embodiments, the MEH parameter reports may include MEH parameters as well as network condition capabilities data/information indicated by the RNI.

In response to receipt of the MEH parameter reports from the respective MEHs 200-1 and 200-3, the MEC-O 321 (e.g., the offloader 732 implemented by the MEC-O 321) may identify/determine and select an optimal MEH 200 for the UE 101. In embodiments, the MEC-O 321 may operate an offloader 732 to perform offloading tradeoff evaluations in a same or similar manner as discussed previously with regards to FIG. 8.

At operation 918, the MEC-O 321 may then provide a MEC offloading response (also referred to as a "MEH application offloading response" or the like) to the UE 101 via the Mx2, Mm9, or Mm3 interface. The MEC offloading response may indicate an MEH 200 to which the UE 101 may offload the requested application tasks. In the example of FIG. 9, the MEC offloading response may indicate or instruct the UE 101 to offload the tasks to MEH 200-3. At operation 920, the UE 101 (e.g., the offloader 732 implemented by the UE 101) may perform application offloading to the MEH 200-3. In some embodiments, the application offloading may include sending various application tasks to the MEH 200-3, inputs to be used for execution of the tasks, and/or a location of application tasks stored in memory or remote storage. In some embodiments, before sending the applications tasks, etc., the offloader 732 of the UE 101 may control transmission of an offloading request to the indicated MEC host (e.g., MEH 200-3), and the MEH 200-3 may respond with an application offloading acknowledgement (ACK) or negative ACK (NACK) to indicate acceptance or non-acceptance of the application offloading request, respectively.

One advantage of the centralized mechanism is that the MEC-O 321 may already have a full knowledge of MEH parameters and/or current conditions at each MEH 200, which may be obtained/identified from local storage rather than performing operations 904-914 in some embodiments. In such embodiments, the offloading evaluation performed by the offloader 732 of the MEC-O 321 may help reduce computational resource consumption at least at the UE 101. However, from a UE 101 perspective, the MEC-O 321 may only have partial knowledge of current radio parameters, which are somewhat dependent on the availability of RNI through RNI APIs 340 for each MEH 200. Therefore, from a service perspective, using the decentralized mechanism (e.g., process 800 of FIG. 8) may be beneficial, since the channel measurements performed by the UE 101 may be more reliable and/or suitable for at least some offloading evaluations. In some embodiments, the MEC-O 321 may send a request to the UE 101 to perform and report various channel estimates or measurements for the offloading evaluation, or to provide measurements taken during a previous attach/reconfiguration procedure.

Example Use Cases for Computational Offloading

The following use cases discuss possible scenarios where tasks may be offloaded according to the various embodiments herein. The example use cases include inputs/calculations that may be used for determining optimal task offloading targets/candidates. The example use cases include channel estimation, beamforming and security key generation.

The following use cases are intended to be examples and should not be interpreted as limiting the scope of the present embodiments, which can be applicable to various tasks other than those described herein. Other examples of possible tasks to offload may include: image/object recognition, other application level tasks and new compute intensive services like auto-translation and recommendations synthesized from more than one mobile-edge application can be delivered in near real time, and to low complexity devices.

Offloading of Channel Estimation Tasks

A first example use case may involve downlink (DL) channel estimation, where a base station places/inserts various pilot signals (or cell-specific reference signals) in unique positions within a resource grid (e.g., subframe) such that the pilots do not interfere with one another. The populated resource grid represents several subframes containing data, which is then OFDM modulated and transmitted through a propagation channel. Channel noise and/or interference may affect or alter the signals or propagation channel before being received by a UE 101. Once received by the UE 101, the UE 101 demodulates and decodes the signal to obtain encoded data and uses the known location of the pilots to estimate the channel. The UE 101 may then generate and send a report to the base station to indicate the estimate channel quality, which may then be used by the base station for handover decisions, cell parameter (re)configuration, etc. Additionally, the UE 101 may estimate channel quality across a number of subframes through interpolation. Offloading channel estimation tasks may allow the UE 101 to save energy since channel estimation may involve performing complex computations.

In an example of the downlink channel estimation problem, the base station (BS) (e.g., AN 111 or 112) may be equipped with M antennas and the UE 101 may be equipped with N antennas. In some cases, the base station may send a pilot/training symbol x, and the received pilot/training symbol by the UE 101 may be $y=Hx+n$, where H is the downlink channel to be estimated and n is the additive noise at the UE 101. Based on the received training/pilot symbol y, the UE 101 estimates H using, e.g., the least-squares technique. This approach suffers from two drawbacks: 1) the UE 101 must perform a computationally demanding task, and 2) relatively high latency will be introduced in obtaining channel estimates at the BS. For example, in the least-squares approach, the computational complexity is (N2 (M+N)); 2) After the channel estimate is obtained, the UE 101 sends the estimate, denoted as R, back to the BS, where that R is a matrix of dimension M×N. This means that the incurred signaling/latency could be very large, especially when M and/or N is large, as may be the case in BS deployments with massive antenna arrays containing a large number or antennas.

In various embodiments, the UE 101 may send the received signal vector y that is of dimension of N back to the MEC host 200 that is selected for offloading so that the MEC host 200 may perform the channel estimation computations on behalf of the UE 101. In some embodiments, the BS may send the pilot signals to the target device performing the offloaded task, which may be the MEC host 200 co-located or implemented by the BS, the BS itself, or another BS in the system/network. In this way, the above mentioned drawbacks may be overcome. Namely, the UE 101 may have a longer battery life by not performing the channel estimation itself, and the BS may obtain channel estimates with better latency performance since the dimension of the received signal vector y is usually much smaller than the dimension of the channel. If in a multi-antenna setup. In some embodiments, the frequency that a task is offloaded to a nearby MEC host 200 (or BS) may be inversely proportional to the time interval the UE 101 performs the downlink channel estimation (e.g., 20 ms seconds, for a typical case of low mobility channels).

Offloading of Beamforming Tasks

In a second example use case, a UE 101 may offload beamforming tasks to another device. Typically, a BS may carry out beamforming, to transmit focused streams of data to individual UEs 101. The BS may receive multiple uplink (UL) signals from multiple UEs 101 and track the reception timings and the direction of arrival of the UL signals. The BS then uses signal processing algorithms and/or triangulation techniques to determine where each signal is being transmitted from, and determines a best transmission route for downlink signals. Beamforming mechanisms try to achieve a better signal-to-noise ratio by increasing the data stream signal at a specific location in space. With better link quality, the BS may transmit the focused data streams with a higher data rate. Each UE 101 in the system measures/estimates channel characteristics (e.g., channel quality information (CQI), channel state information (CSI), etc.) and feeds this information back to the BS. For each UE 101, the BS uses the channel characteristic estimations to adjust weights and phase shifts for each of its antenna elements and transmits signals that spatially focus the wave front in the direction of a UE 101, thereby providing a higher data rate. However, the UE 101 may be required to perform computationally intensive (and energy intensive) tasks to estimate the channel characteristics. Energy consumption may be reduced in cases where the UE 101 may transmit a demodulation reference signal (DMRS) or a sounding reference signal (SRS) to the BS, and the BS may use the DMRS or SRS to estimate the channel characteristics. However, using DMRS or SRS mechanisms may not be ideal for some systems, such as millimeter wave (mmWave) systems.

In a downlink mmWave scenario, in-phase and quadrature (IQ)-samples observed from multiple transmit beams at the UE 101 may be gathered using, for example, a reduced set of Tx and Rx beamforming configurations. The IQ-samples may be combined to estimate the best angle of departure at the BS. Based on the sequences detected with these sequences, compressed sensing may be used to find the optimal angle of arrival (AoA) at the UE 101 and angle of departure (AoD) at the BS. These mechanisms could be used, for example, in high frequency offset and phase noise of a non-synchronized mmWave system. This procedure does not need to be performed very often since it is typically used for initial setup of the mmWave system based on analog/hybrid beamforming and/or after mmWave link failure. However, this task is essential for the setup of the system and the mmWave link may not work properly without the beam alignment. Therefore, this procedure should be executed as fast as possible but does not have a real time constraint.

In an example, 32*200 IQ samples with a resolution of 8 bits for the I and Q component may need to be transferred. This sums up to 10.24 kbits. The compensation of the phase noise and the frequency offset before the actual estimation of the AoA and AoD has a complexity in the range of 100s of megaflops (Mflops). Afterwards, convex optimization problems may need to be solved to find the optimal AoA and AoD. In some implementations, algorithms for these types of problems may have a complexity in the range of 10 Gflops. Therefore, this example shows that the transferred data is relatively low, whereas the required computing resources are relatively heavy. Accordingly, in various embodiments, a UE 101 may offload the AoA and AoD-related tasks to nearby or proximate devices.

Offloading of Security Key Generation Tasks

The third example use case involves offloading security key generation tasks. Safety and security is a critical task (e.g., security key generation in general can take seconds). In embodiments, PHY and/or NAS security keys (e.g., encryption and/or integrity keys) may be offloaded to an MEH 200. In one example, the security domains packages may be provided or indicated to an MEH 200 to provide various security services that are typically performed by a universal integrated circuit card (UICC) or an embedded UICC (eUICC). Such security services may include, inter alia, key handling, encryption, decryption, digital signature generation and verification for associated applications. A detailed discussion of such services, and implementations of such services are discussed in commonly assigned International Application No. PCT/US2016/037634, titled INTEGRATED UNIVERSAL INTEGRATED CIRCUIT CARD ON MOBILE COMPUTING ENVIRONMENTS, filed on Jun. 15, 2016, which is hereby incorporated by reference in its entirety and for all purposes.

Offloading security related application tasks to an MEH 200 co-located or otherwise associated with a high-frequency RAT may enhance energy-efficient PHY/NAS privacy and security since such RATs are inherently more secure due to the fact that the communication is carried out by utilizing directional beams at both sides for pathloss mitigation.

Offloading of UE Location/Positioning Tasks

The fourth example use case involves offloading one or more location and/or position determination tasks to an MEH 200. The location/position related tasks may include real-time network measurement(s) based tracking an active UE 101 using geo-location algorithms. The network measurements may include network-based positioning mechanisms that are independent of GNSS/GPS positioning measurements, or may use partial/incomplete GPS/GNSS measurements. Services providing such location/positioning mechanisms may include mobile and/or location-based advertising; smart city applications; smart factory applications (e.g., for IoT, athletic performance analysis; campus/enterprise management; crowd/personnel management; network/traffic optimization/management; network planning, management and optimization (e.g., self-organizing network (SON) functionality) for a cellular network, etc.

The MEA(s) 336 may permanently run on the MEH 200, or based on demand from the operator, possibly in response to a request from a UE 101, or a third-party or service provider. Once running, the MEA(s) 336 may collect location-related information from the UEs 101 connected to the ANs 111/112 and/or APs 106 associated with the MEHs 200, and depending on the MEA(s) 336 requirements, etc., specific UEs 101, specific categories of UEs 101, or all UEs 101 may be tracked, possibly anonymously (based on authorization). The MEA(s) 336 may perform the required (application-specific) analysis and provide the analysis results to an external entity, such as the tracked UEs 101, service providers that operate application servers 130, a mobile network operator, or the like. To do so, the MEA(s) 336 may need to be able to connect to external applications.

Offloading location/positioning mechanisms may enable location based services for enterprises and consumers (e.g. on opt-in basis), for example in venues, retail locations, and traditional coverage areas where GPS coverage is not available. Furthermore, relaxing GPS measurements at the UE 101 by offloading execution of location/positioning applications to a MEH 200 associated with a high frequency RAT may allow for more precise information about the UE 101 location, thus relieving the UE from performing energy hungry GPS location tasks.

Figure 10:
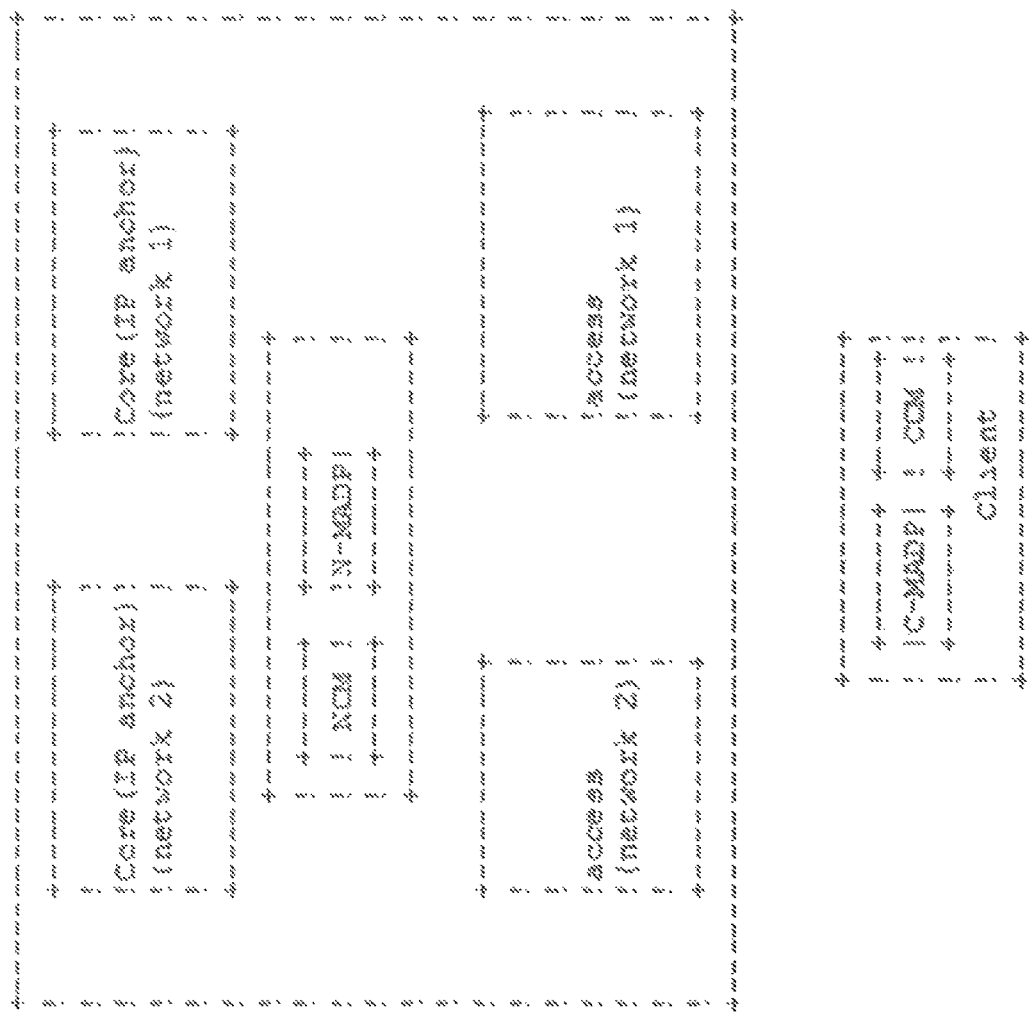
FIG. 10 depicts an example network reference architecture for Multiple Access Management Protocol (MAMP) in accordance with various embodiments.

Multipath Transport Control Protocol (MPTCP) Enhancements for Generic Multi-Access Protocols for Next Generation Multi-Access Networks Enhanced GMA (Generic Multi-Access) U-Plane Protocol FIG. 10 depicts an example network reference architecture for Multiple Access Management Protocol (MAMP), which is a new standardization effort has been initiated by the Internet Engineering Task Force (IETF), which is discussed by S. Kanugovi et al. "Multiple Access Management Protocol", IETF Apr. 24, 2017, accessed at https://tools.ietf.org/html/draft-kanugovi-intarea-mams-protocol-01.

As shown, FIG. 10 includes a "Client", which is the end-user device supporting connections with multiple access nodes, possibly over different access technologies; an "Access network element", which is a functional element in the network that delivers user data packets to the client via a point-to-point access link like WiFi airlink, LTE airlink, DSL; a "Core", which is the functional element that anchors the client's IP address used for communication with applications via the network; a "Network Connection manager" (NCM), which is a functional entity in the network that oversees distribution of data packets over the multiple available access and core network paths; a "Client Connection Manager" (CCM), which is a functional entity in the client that exchanges MAMP signaling with the Network Connection Manager and configures the multiple network paths for transport of user data; a "Network Multi Access Data Proxy" (N-MADP), which is a functional entity in the network handles the user data traffic forwarding across multiple network paths. N-MADP is responsible for MAMP-specific u-plane functionalities in the network; and a "Client Multi Access Data Proxy" (C-MADP), which is a functional entity in the client handles the user data traffic forwarding across multiple network paths. C-MADP is responsible for MAMP-specific u-plane functionalities in the client.

MAMP protocols have been discussed for integrating multiple access networks into a single IP connection. Embodiments herein may extend it to support Multipath Transport Control Protocol (MPTCP) integrating multiple access networks into a single MPTCP session. In embodiments, a Client Multi Access Data Proxy (C-MADP) may support MPTCP functionalities, and a Network Multi Access Data Proxy (N-MADP) may support MPTCP Proxy functionalities. Additionally, MAMP user plane (u-plane) protocols may be enhanced to detect MPTCP traffic and let them pass through without any additional operation. Further, MAMP control signaling may be enhanced to provide access to network specific MPTCP Proxy end-point information.

Figure 11:
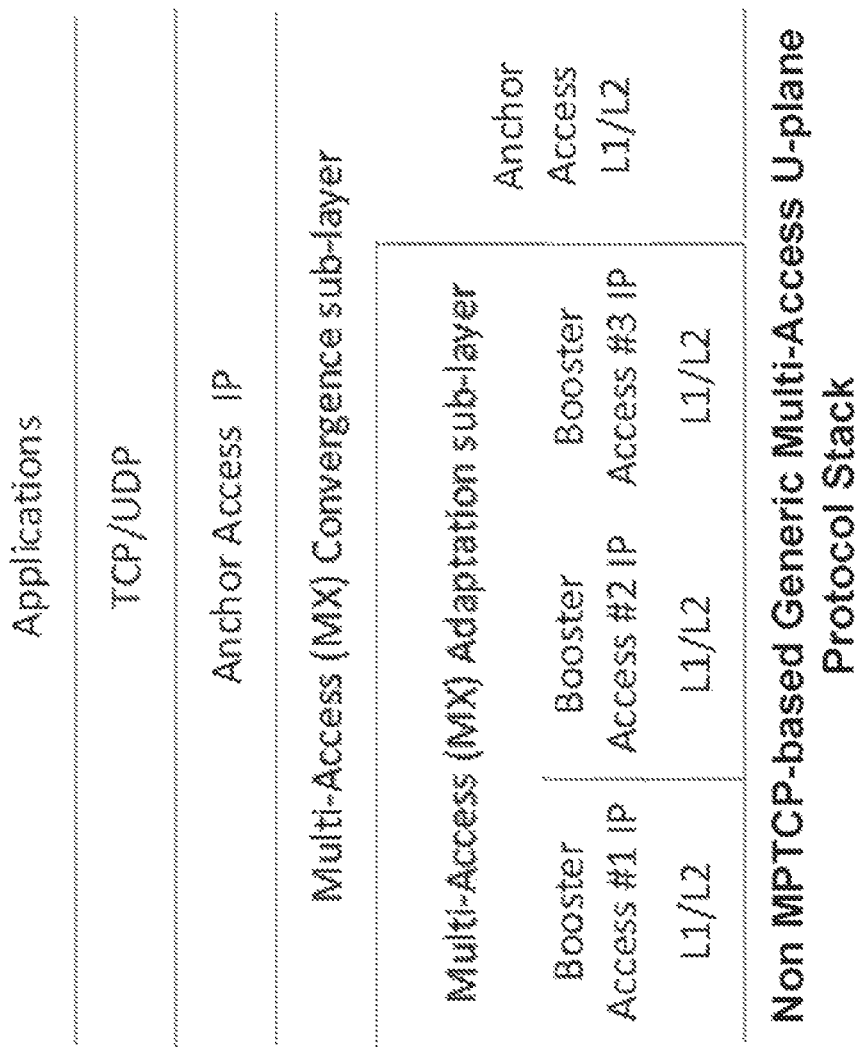
FIG. 11 depicts an example of a non-MPTCP generic multi-access protocol stack in accordance with various embodiments.

FIG. 11 depicts an example of a non-MPTCP generic multi-access protocol stack in accordance with various embodiments. The non-MPTCP generic multi-access protocol stack integrates multiple access networks into a single end-to-end (e2e) IP connection. Here, the e2e IP connection used for interfacing with higher layers (e.g., transport) is called "anchor" layers, and other IP connections used for delivering data traffic of the anchor IP connection are called "booster" layers. The non-MPTCP generic multi-access protocol stack comprises two sub-layers below the anchor IP layer, an Multi-Access (MX) Convergence layer and an MX Access & Adaptation Tunneling (AAT) layer.

The Multi-Access (MX) Convergence layer may encapsulate and encapsulate user's data traffic, e.g. IP packet, with additional control information, e.g. sequence number, DRB ID, etc., and support multi-access convergence functions, e.g. aggregation, splitting/reordering, fragmentation, concatenation, etc. Notice encapsulation my not be required in some scenario, for example when sending packet over the anchor connection.

MX Access & Adaptation Tunneling (AAT) may transport MA encapsulated packets over individual access, and the following techniques may be used for transport: (1) tunneling, which may include sending the GMA encapsulated IP packet (inner) in another IP packet (outer) through IP-in-IP, User Datagram Protocol (UDP), or IP Security (IPSec) tunneling; (2) client Net Address Translation (NAT), which may include changing the client IP address of the GMA encapsulated IP packet, and then sending it over an access network; and (3) no change, wherein the GMA encapsulated IP packet may be sent directly without any changes.

Figure 12:
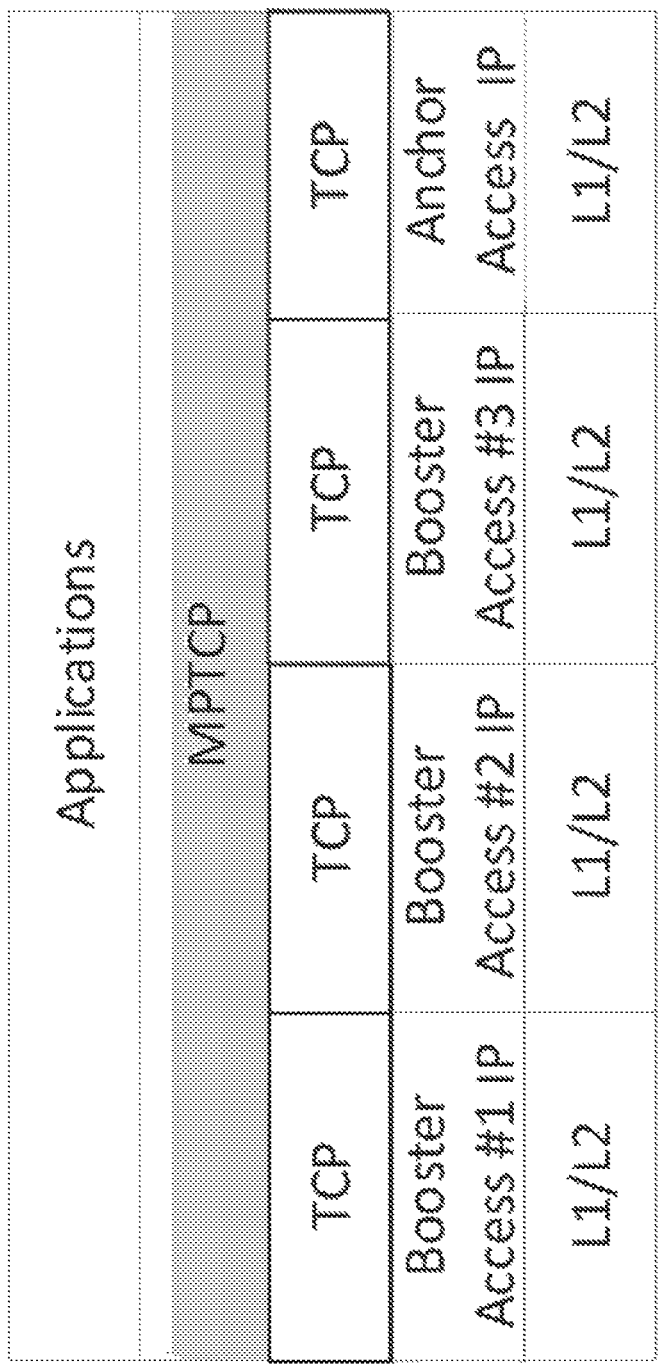
FIG. 12 depicts an example of an MX u-plane protocol stack for MPTCP traffic in accordance with various embodiments.

FIG. 12 depicts an example of an MX u-plane protocol stack for MPTCP traffic in accordance with various embodiments. In the MX u-plane protocol stack, the access network for initializing the MPTCP connection is the anchor, and other access networks for establishing additional transport control protocol (TCP) sub-flows are the booster. The MX u-plane protocol stack integrates multiple access networks into a single MPTCP session. In embodiments, MPTCP works as the "MX Convergence sub-layer" and TCP (for sub-flow) works as the "MIX Adaption sub-layer", both of which are above the anchor IP layer. Therefore, the (below IP) MX functionalities (shown in FIG. 11) should be disabled for MPTCP traffic. Embodiments may enhance the (below IP, Non MPTCP) MX u-plane protocols with a new function, the MTCP Traffic Pass-Through function. The MTCP Traffic Pass-Through function may allow an IP packet that carries MPTCP (e.g., by checking the TCP option field ("Kind=30", http://www.iana.org/assignments/tcp-parameters/tcp-parameters.xhtml) to pass through as-is without any MX operations (e.g., encapsulation, tunnelling, etc.).

MPTCP-Aware GMA (Generic Multi-Access) Control Plane (C-Plane) Protocols

Figure 13:
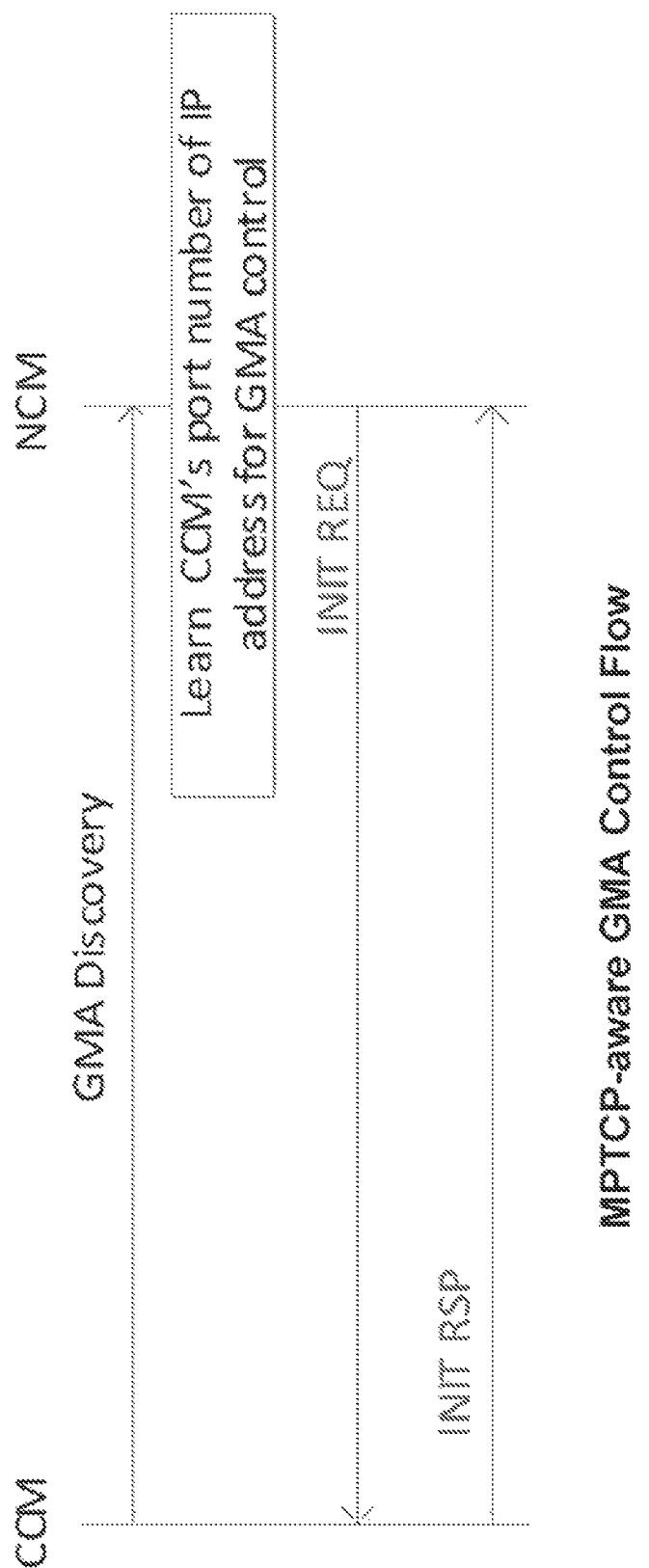
FIG. 13 depicts an example MPTCP-aware GMA control procedure in accordance with various embodiments.

FIG. 13 depicts an example MPTCP-aware GMA control procedure in accordance with various embodiments. In embodiments, element 2 (Capability Exchange) of the GMA control procedure for MPTCP may be enhanced. Once a GMA discovery message is received by the NCM, the NCM may learn the IP address and port number of the primary connection to communicate with CCM. The NCM may then send out an INIT-REQ message.

In embodiments, the INIT REQ message may include a capability bitmap, where each bit may indicate if the corresponding capability is supported by NCM/N-MADP or not (e.g., Bit #x: MPTCP).

In embodiments, for each secondary connection and the primary connection, the INIT REQ message may include an AAT Support Bitmap, where each bit may represent/indicate if the corresponding AAT technique is supported by N-MADP when the connection functions as booster, (e.g., bit #0: UDP; bit #1: IPSec; bit #2: NAT, bit #3: TCP (0: not supported, 1: supported)). In embodiments, for each secondary connection and the primary connection, the INIT REQ message may include an MPTCP end-point IPv4/v6 address and port number, for example, the IP v4/v6 address and port number of MPTCP Proxy for establishing a TCP sub-flow at N-MADP.

In response to the INIT REQ message, the CCM may send out an INIT-RSP message. In embodiments, the INIT-RSP message may include a capability bitmap (1B), where each bit indicates if the corresponding capability is supported by NCM/N-MADP or not (e.g., Bit #x: MPTCP).

Figure 14:
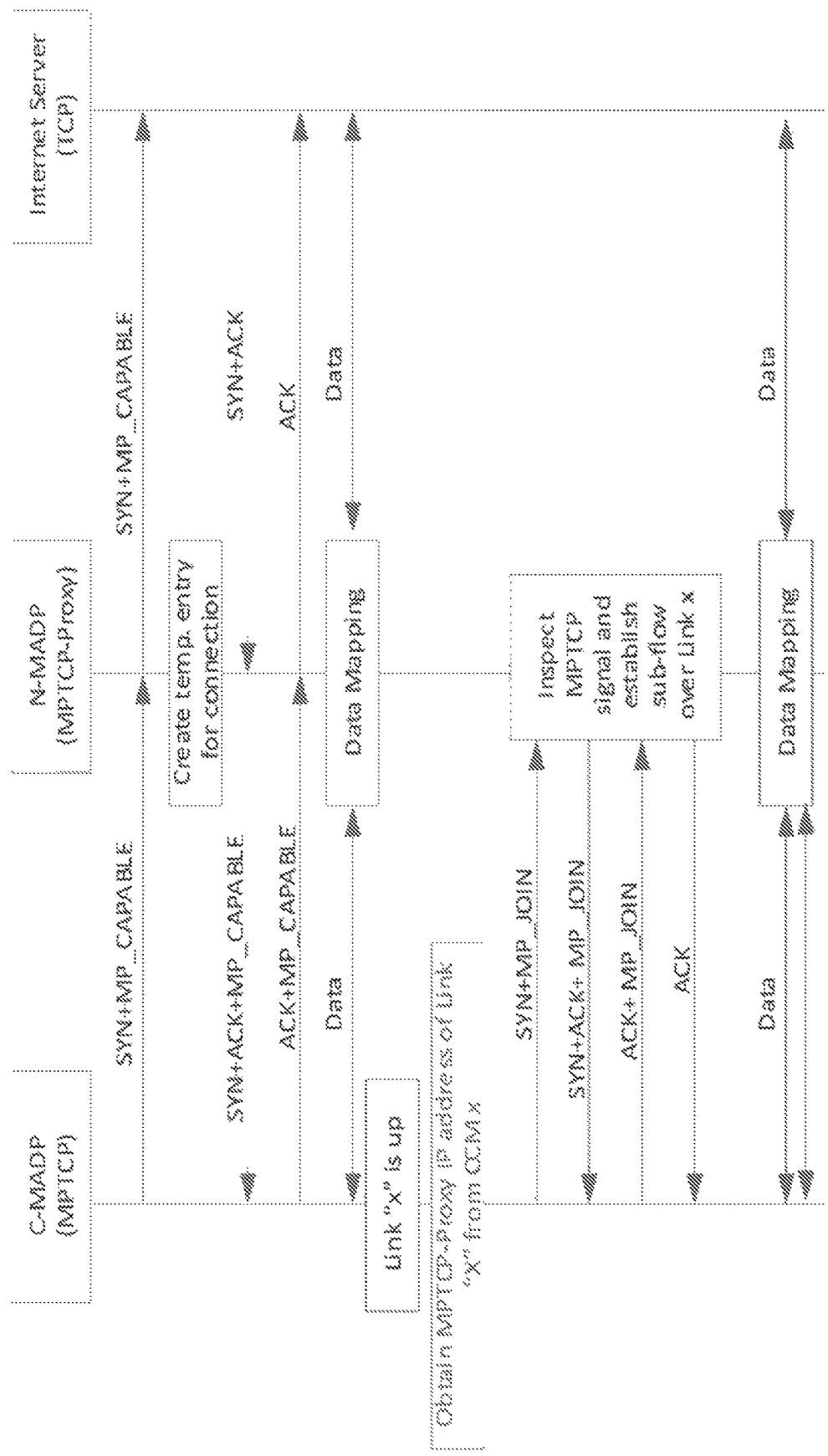
FIG. 14 shows an example procedure for establishing an MPTCP session in accordance with various embodiments.

Notice that the rest of GMA control procedures do not apply to MPTCP. Instead, the MPTCP protocol should be used for establishing a MPTCP session over multiple access networks. FIG. 14 shows an example procedure for establishing an MPTCP session over the anchor access network first, and then adding a TCP sub-flow over the booster access network (link "X"). Most elements are the same as the procedure for the off-path MPTCP proxy as discussed in X. Wei et al. "MPTCP proxy mechanisms", IETF Jan. 2, 2016, accessed at https://tools.ietf.org/html/draft-wei-mptcp-proxy-mechanism-02. One difference is that the C-MADP may obtain the IP address & port of MPTCP-Proxy for Link "x" locally from the CCM. Such assistance may be especially useful if there are multiple (2 or more) access networks for establishing additional TCP sub-flows, each of which may be terminated at N-MADP with a different IP address or/and port. The legacy MPTCP signaling does not allow for identifying or differentiating the MPTCP proxy IP address & port number among multiple access networks.

Examples of MPTCP Enhancements for Generic Multi-Access Protocols for Next Generation Multi-Access Networks Example 1 may include new MPTCP based GMA u-plane protocol stack (e.g., FIG. 12).

Example 2 may include new function in the Non-MPTCP GMA u-plane protocols to detect MPTCP traffic and let them pass through without any additional operation.

Example 3 may include MPTCP-aware Generic Multi-Access (GMA) control signaling for capability exchange with the following new information: a. capability bit for MPTCP support; b. AAT support bit for TCP/MPTCP support (per access network); and c. MPTCP proxy IP address and port number (per access network)

Example 4 may include a new MX-assisted MPTCP procedure for establishing TCP sub-flow using the access network specific MPTCP Proxy end-point info (IP address or/and port number).

Example 5 may include an apparatus comprising means to perform one or more elements of a method described in or related to any of examples 1-4, or any other method or process described herein.

Example 6 may include one or more non-transitory computer-readable media comprising instructions to cause an electronic device, upon execution of the instructions by one or more processors of the electronic device, to perform one or more elements of a method described in or related to any of examples 1-4, or any other method or process described herein.

Example 7 may include an apparatus comprising logic, modules, and/or circuitry to perform one or more elements of a method described in or related to any of examples 1-4, or any other method or process described herein.

Example 8 may include a method, technique, or process as described in or related to any of examples 1-4, or portions or parts thereof.

Example 9 may include an apparatus comprising: one or more processors and one or more computer readable media comprising instructions that, when executed by the one or more processors, cause the one or more processors to perform the method, techniques, or process as described in or related to any of examples 1-4, or portions thereof.

Example 10 may include a method of communicating in a wireless network as shown and described herein. Example 11 may include a system for providing wireless communication as shown and described herein. Example 12 may include a device for providing wireless communication as shown and described herein.

Example Fog Systems and Implementations

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 15 and 16.

Figure 15:
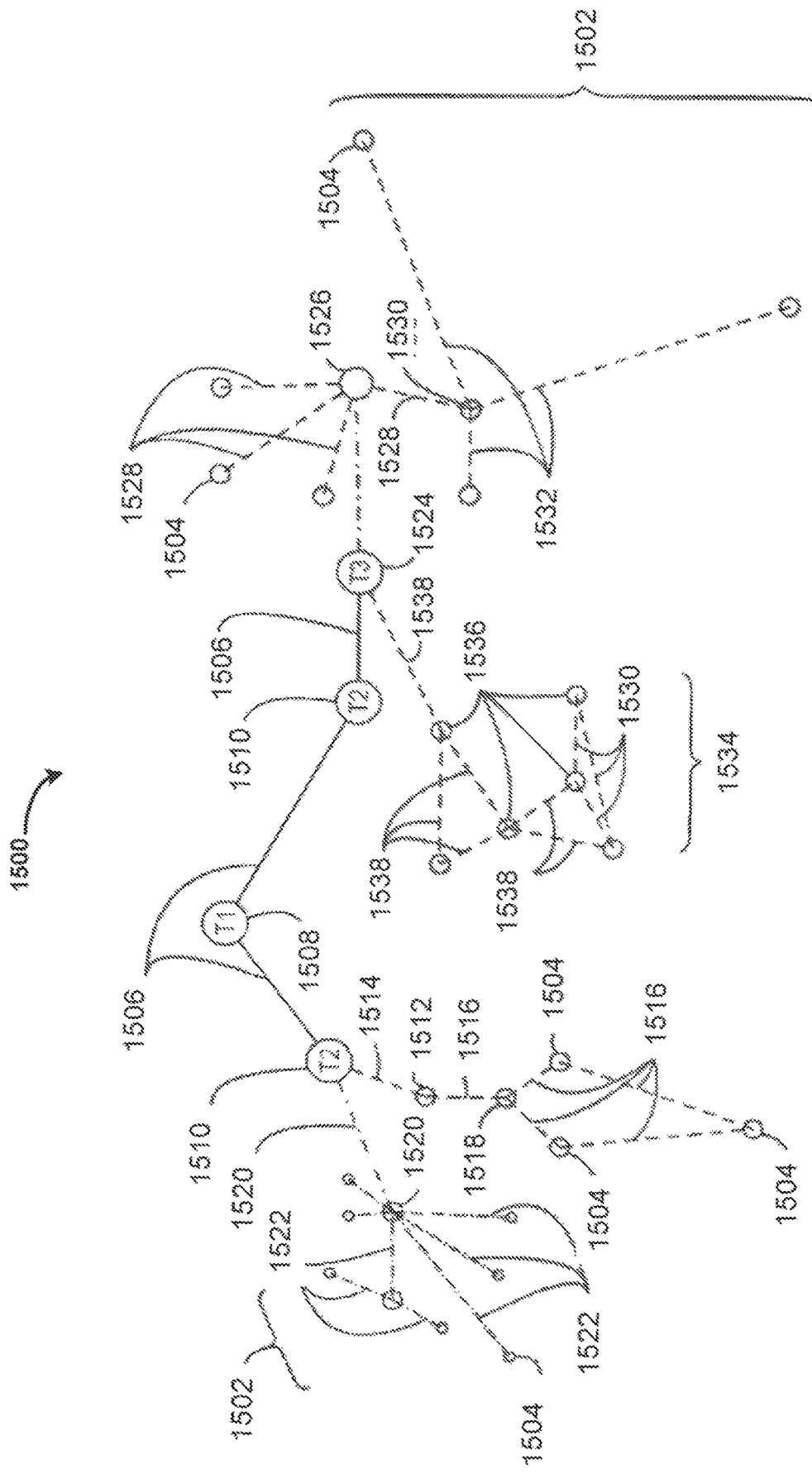
FIG. 15 illustrates an arrangement showing interconnections that may be present between a network and Internet of Things (IoT) networks, in accordance with various embodiments.
Figure 16:
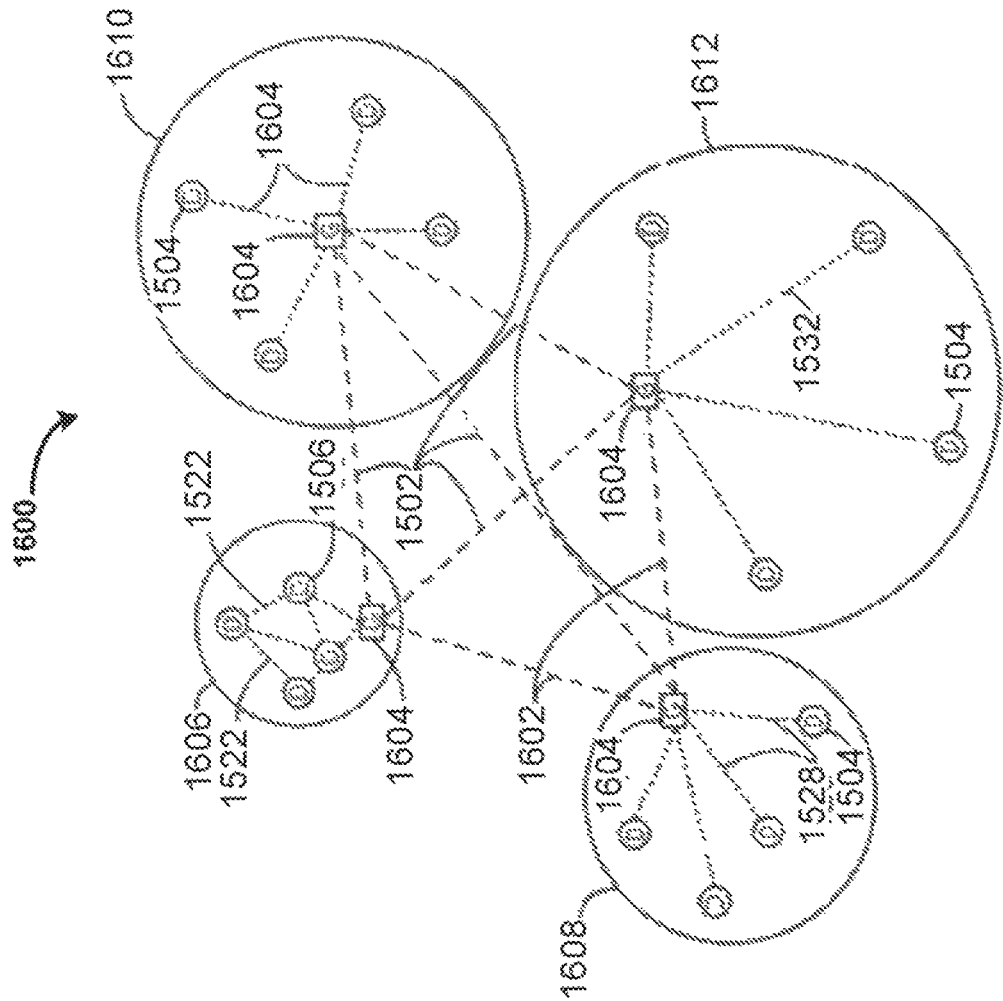
FIG. 16 illustrates an example domain topology, in accordance with various embodiments.

FIG. 15 illustrates an arrangement 10 showing interconnections that may be present between the Internet 1500 and IoT networks, in accordance with various embodiments. The interconnections may couple smaller networks 1502, down to the individual IoT device 1504, to the fiber backbone 1506 of the Internet 1500. To simplify the drawing, not every device 1504, or other object, is labeled.

In FIG. 15, top-level providers, which may be termed tier 1 providers 1508, are coupled by the fiber backbone of the Internet to other providers, such as secondary or tier 2 providers 1510. In one example, a tier 2 provider 1510 may couple to a tower 1512 of an LTE cellular network, for example, by further fiber links, by microwave communications 1514, or by other communications technologies. The tower 1512 may couple to a mesh network including IoT devices 1504 through an LTE communication link 1516, for example, through a central node 1518. The communications between the individual IoT devices 1504 may also be based on LTE communication links 1516. In another example, a high-speed uplink 1520 may couple a tier 2 provider 1510 to a gateway (GW) 1520. A number of IoT devices 1504 may communicate with the GW 1520, and with each other through the GW 1520, for example, over BLE links 1522.

The fiber backbone 1506 may couple lower levels of service providers to the Internet, such as tier 3 providers 1524. A tier 3 provider 1524 may be considered a general Internet service provider (ISP), for example, purchasing access to the fiber backbone 1510 from a tier 2 provider 1510 and providing access to a corporate GW 1526 and other customers. From the corporate GW 1526, a wireless local area network (WLAN) can be used to communicate with IoT devices 1504 through Wi-Fi® links 1528. A Wi-Fi link 1528 may also be used to couple to a low power wide area (LPWA) GW 1530, which can communicate with IoT devices 1504 over LPWA links 1532, for example, compatible with the LoRaWan specification promulgated by the LoRa alliance.

The tier 3 provider 1524 may also provide access to a mesh network 1534 through a coordinator device 1536 that communicates with the tier 3 provider 1524 using any number of communications links, such as an LTE cellular link, an LPWA link, or a link 1538 based on the IEEE 802.15.4 standard, such as Zigbee®. Other coordinator devices 1536 may provide a chain of links that forms cluster tree of linked devices.

IoT devices 1504 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 1504 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 1504 may be biotic devices such as monitoring implants, biosensors, biochips, and the like. In other embodiments, an IoT device 1504 may be a computer device that is embedded in a computer system and coupled with communications circuitry of the computer system. In such embodiments, the IoT device 1504 may be a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 1504 may include one or more memory devices and one or more processors to capture and store/record data. Each of the IoT devices 1504 may include appropriate communications circuitry (e.g., transceiver(s), modem, antenna elements, etc.) to communicate (e.g., transmit and receive) captured and stored/recorded data. Further, each IoT device 1504 may include other transceivers for communications using additional protocols and frequencies. According to various embodiments, the IoT devices 1504 may be equipped with information (e.g., referred to as "modem profiles" herein) to configure configurable communications circuitry to perform communications in a corresponding communications. This may allow the IoT devices 1504 to communicate using multiple wireless communications protocols without requiring an IoT device 1504 to include separate hardware communications modules for each wireless communications protocol. The wireless communications protocols may be any suitable set of standardized rules or instructions implemented by the IoT devices 1504 to communicate with other devices, including instructions for packetizing/depacketizing data, instructions for modulating/demodulating signals, instructions for implementation of protocols stacks, and the like. For example, IoT devices 1504 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of tower 1512, GW 1520, 1526, and 1530, coordinator device 1536, and so forth, may also be incorporated with the embodiments described herein, in particular, with references to FIGS. 5-13.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

FIG. 16 illustrates an example domain topology 1600 that may be used for a number of IoT networks coupled through backbone links 1602 to GWs 1604, in accordance with various embodiments. Like numbered items are as described with respect to FIG. 15. Further, to simplify the drawing, not every device 1504, or communications link 1516, 1522, 1528, or 1532 is labeled. The backbone links 1602 may include any number of wired or wireless technologies, and may be part of a local area network (LAN), a wide area network (WAN), or the Internet. Similar to FIG. 15, in embodiments, one or more of IoT devices 1504, GW 1604, and so forth, may be incorporated with embodiments described herein.

The network topology 200 may include any number of types of IoT networks, such as a mesh network 1606 using BLE links 1522. Other IoT networks that may be present include a WLAN network 1608, a cellular network 1610, and an LPWA network 1612. Each of these IoT networks may provide opportunities for new developments, as described herein. For example, communications between IoT devices 1504, such as over the backbone links 1602, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 1606 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1608 may use systems that perform standards conversion to provide multi-standard connectivity, enabling IoT devices 1504 using different protocols to communicate. Further systems may provide seamless interconnectivity across a multi-standard infrastructure comprising visible Internet resources and hidden Internet resources.

Communications in the cellular network 1610 may be enhanced by systems that offload data, extend communications to more remote devices, or both. The LPWA network 1612 may include systems that perform non-Internet protocol (IP) to IP interconnections, addressing, and routing.

Figure 17:
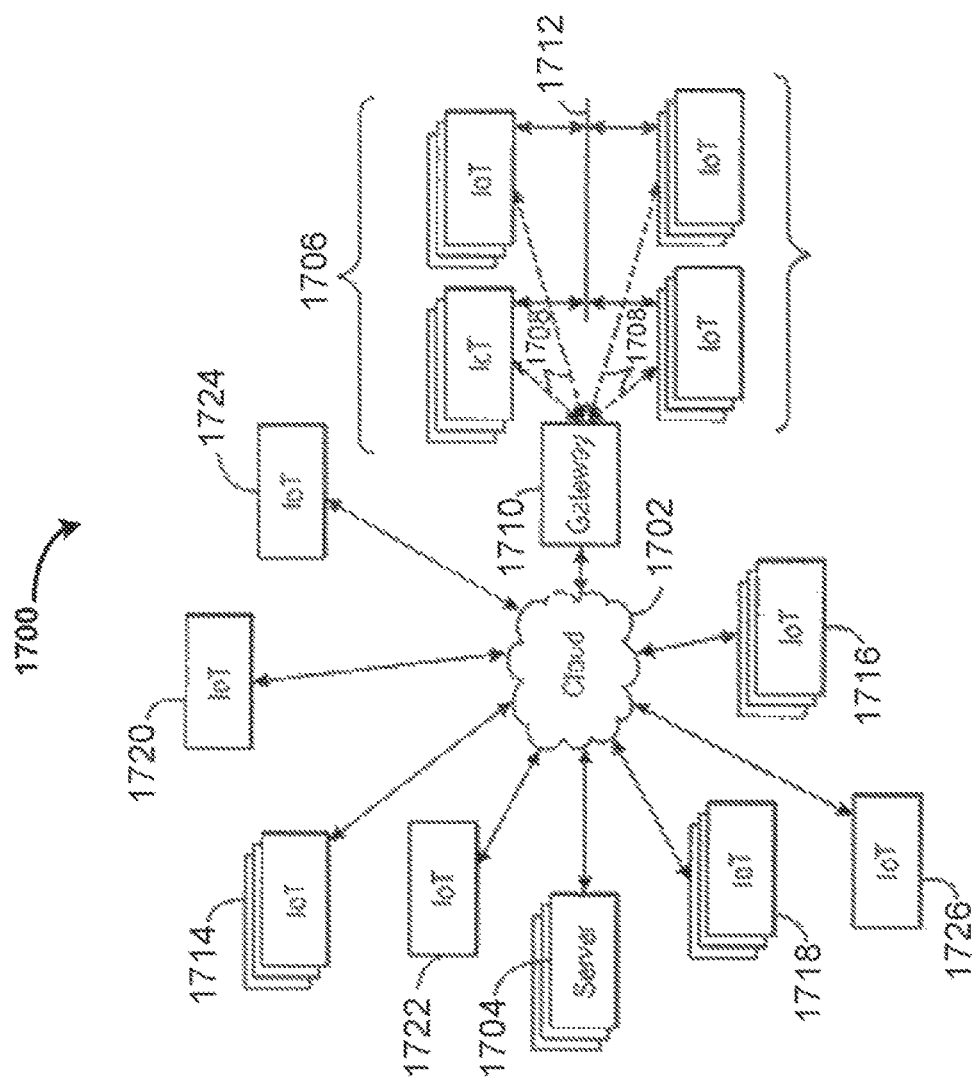
FIG. 17 illustrates an example cloud computing network or cloud in communication with a number of IoT devices, in accordance with various embodiments.

FIG. 17 illustrates an arrangement 300F of example cloud computing network, or cloud 1702, in communication with a number of Internet of Things (IoT) devices, in accordance with various embodiments. The cloud 1702 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected.

Protocols and components for communicating via such networks are well known and will not be discussed herein in detail. However, it should be appreciated that cloud 1702 may be associated with network operator who owns or controls equipment and other elements necessary to provide network-related services, such as one or more base stations or access points, and one or more servers for routing digital data or telephone calls (for example, a core network or backbone network).

The IoT devices in FIG. 17 may be the same or similar to the IoT devices 1504 discussed with regard to FIGS. 15-16. The IoT devices may include any number of different types of devices, grouped in various combinations, such as IoT group 1706 that may include IoT devices that provide one or more services for a particular user, customer, organizations, etc. A service provider may deploy the IoT devices in the IoT group 1706 to a particular area (e.g., a geolocation, building, etc.) in order to provide the one or more services. In one example, the IoT group 1706 may be a traffic control group where the IoT devices in the IoT group 1706 may include stoplights, traffic flow monitors, cameras, weather sensors, and the like, to provide traffic control and traffic analytics services for a particular municipality or other like entity. Similar to FIGS. 15-16, in embodiments, one or more of IoT devices 1714-1724, GW 1710, and so forth, may be incorporated with the various embodiments described herein, in particular, with references to FIGS. 1-16. For example, in some embodiments, the IoT group 1706, or any of the IoT groups discussed herein, may include the components, devices, systems discussed with regard to FIGS. 1-16.

The IoT group 1706, or other subgroups, may be in communication with the cloud 1702 through wireless links 1708, such as LPWA links, and the like. Further, a wired or wireless sub-network 1712 may allow the IoT devices to communicate with each other, such as through a local area network, a wireless local area network, and the like. The IoT devices may use another device, such as a GW 1710 to communicate with the cloud 1702. Other groups of IoT devices may include remote weather stations 1714, local information terminals 1716, alarm systems 1718, automated teller machines 1720, alarm panels 1722, or moving vehicles, such as emergency vehicles 1724 or other vehicles 1726, among many others. Each of these IoT devices may be in communication with other IoT devices, with servers 1704, or both.

As can be seen from FIG. 17, a large number of IoT devices may be communicating through the cloud 1702. This may allow different IoT devices to request or provide information to other devices autonomously. For example, the IoT group 1706 may request a current weather forecast from a group of remote weather stations 1714, which may provide the forecast without human intervention. Further, an emergency vehicle 1724 may be alerted by an automated teller machine 1720 that a burglary is in progress. As the emergency vehicle 1724 proceeds towards the automated teller machine 1720, it may access the traffic control group 1706 to request clearance to the location, for example, by lights turning red to block cross traffic at an intersection in sufficient time for the emergency vehicle 1724 to have unimpeded access to the intersection.

In another example, the IoT group 1706 may be an industrial control group (also referred to as a "connected factory", an "industry 4.0" group, and the like) where the IoT devices in the IoT group 1706 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1706 may communicate with the servers 1704 via GW 1710 and cloud 1702 to provide captured data, which may be used to provide performance monitoring and analytics to the manufacturer or factory operator. Additionally, the IoT devices in the IoT group 1706 may communicate among each other, and/or with other IoT devices of other IoT groups, to make decisions on their own and to perform their tasks as autonomously as possible.

Clusters of IoT devices, such as the IoT groups depicted by FIG. 17, may be equipped to communicate with other IoT devices as well as with the cloud 1702. This may allow the IoT devices to form an ad-hoc network between the devices, allowing them to function as a single device, which may be termed a fog device. This is discussed further with respect to FIG. 18.

Figure 18:
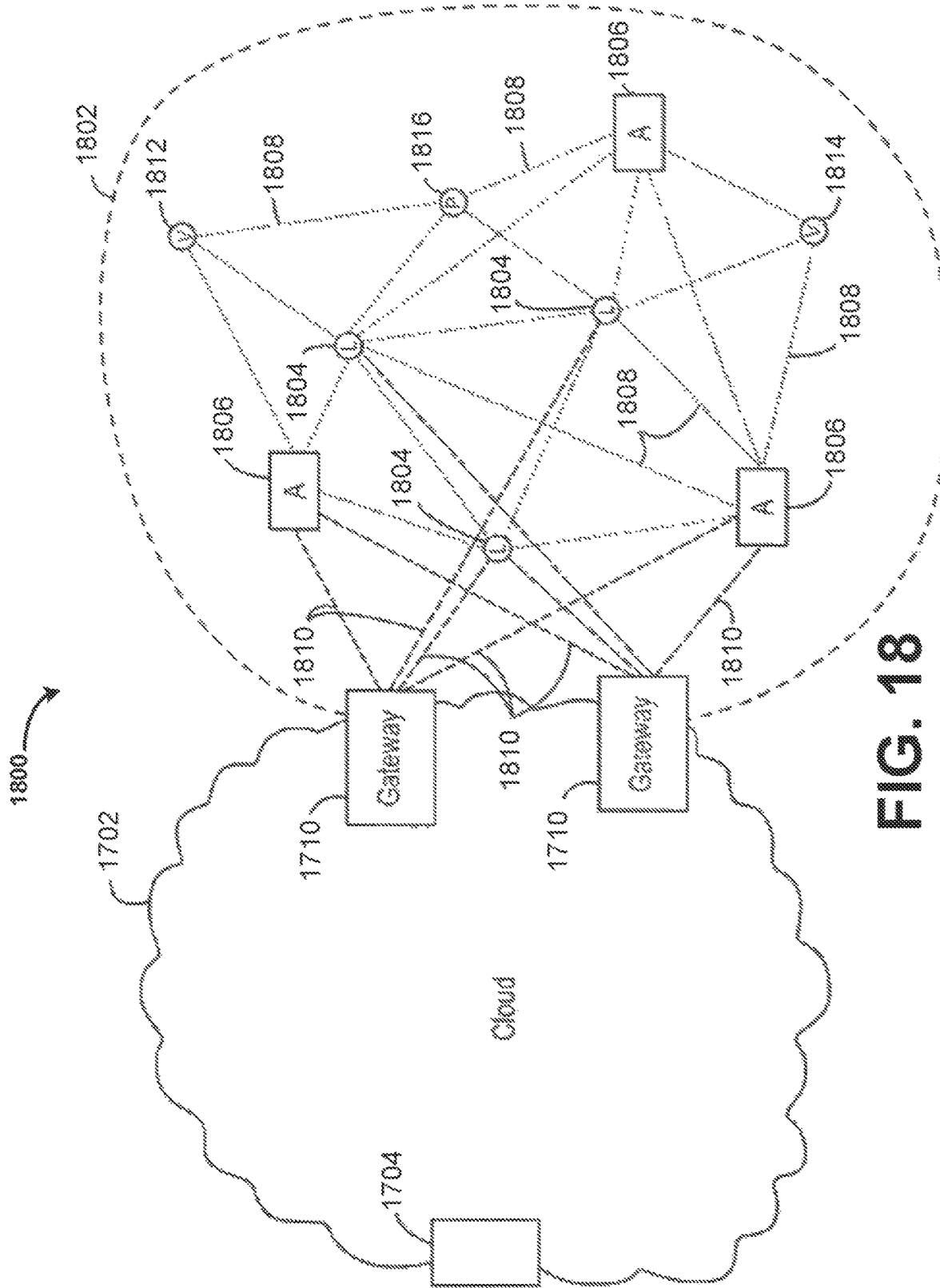
FIG. 18 illustrates an arrangement of a cloud computing network or cloud in communication with a mesh network of IoT devices or IoT fog, in accordance with various embodiments.

FIG. 18 illustrates an arrangement 400F of a cloud computing network, or cloud 1702, in communication with a mesh network of IoT devices, which may be termed a fog device 1802, operating at the edge of the cloud 1702, in accordance with various embodiments. Like numbered items are as described with respect to FIGS. 15-17. In this example, the fog device 1802 is a group of IoT devices at an intersection. The fog device 1802 may be established in accordance with specifications released by the OpenFog Consortium (OFC), the Open Connectivity Foundation™ (OCF), among others.

Data may be captured, stored/recorded, and communicated among the IoT devices 1804. Analysis of the traffic flow and control schemes may be implemented by aggregators 1806 that are in communication with the IoT devices 1804 and each other through a mesh network. Data may be uploaded to the cloud 1702, and commands received from the cloud 1702, through GWs 1710 that are in communication with the IoT devices 1804 and the aggregators 1806 through the mesh network. Similar to FIGS. 15-17, in embodiments, one or more of IoT devices 1804, aggregators 1806, and so forth, may be incorporated with the various embodiments described herein, in particular, with references to FIGS. 1-17. For example, in some embodiments, the fog device 1802, or any of grouping of devices discussed herein, may include the one or more components, devices systems, etc. discussed infra with regard to FIGS. 1-17.

Any number of communications links may be used in the fog device 1802. Shorter-range links 1808, for example, compatible with IEEE 802.15.4 may provide local communications between IoT devices that are proximate to one another or other devices. Longer-range links 1810, for example, compatible with LPWA standards, may provide communications between the IoT devices and the GWs 1710. To simplify the diagram, not every communications link 1808 or 1810 is labeled with a reference number.

The fog device 1802 may be considered to be a massively interconnected network wherein a number of IoT devices are in communications with each other, for example, by the communication links 1808 and 1810. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others. Communications from any IoT device may be passed along the most convenient path between any of the IoT devices to reach the GWs 1710. In these networks, the number of interconnections may provide substantial redundancy, allowing communications to be maintained, even with the loss of a number of IoT devices.

Not all of the IoT devices may be permanent members of the fog device 1802. In the example of FIG. 18, three transient IoT devices have joined the fog device 1802, a first mobile device 1812, a second mobile device 1814, and a third mobile device 1816. The fog device 1802 may be presented to clients in the cloud 1702, such as the server 1704, as a single device located at the edge of the cloud 1702. In this example, the control communications to specific resources in the fog device 1802 may occur without identifying any specific IoT device 1804 within the fog device 1802. Accordingly, if any IoT device 1804 fails, other IoT devices 1804 may be able to discover and control a resource. For example, the IoT devices 1804 may be wired so as to allow any one of the IoT devices 1804 to control measurements, inputs, outputs, etc., for the other IoT devices 1804. The aggregators 1806 may also provide redundancy in the control of the IoT devices 1804 and other functions of the fog device 1802.

In some examples, the IoT devices may be configured using an imperative programming style, e.g., with each IoT device having a specific function and communication partners. However, the IoT devices forming the fog device 1802 may be configured in a declarative programming style, allowing the IoT devices to reconfigure their operations and communications, such as to determine needed resources in response to conditions, queries, and device failures. This may be performed as transient IoT devices, such as the devices 1812, 1814, 1816, join the fog device 1802. As transient or mobile IoT devices enter or leave the fog 1802, the fog device 1802 may reconfigure itself to include those devices. This may be performed by forming a temporary group of the devices 1812 and 1814 and the third mobile device 1816 to control or otherwise communicate with the IoT devices 1804. If one or both of the devices 1812, 1814 are autonomous, the temporary group may provide instructions to the devices 1812, 1814. As the transient devices 1812, 1814, and 1816, leave the vicinity of the fog device 1802, it may reconfigure itself to eliminate those IoT devices from the network. The fog device 1802 may also divide itself into functional units, such as the IoT devices 1804 and other IoT devices proximate to a particular area or geographic feature, or other IoT devices that perform a particular function. This type of combination may enable the formation of larger IoT constructs using resources from the fog device 1802.

As illustrated by the fog device 1802, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

EXAMPLES

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 may include a computer system to be employed as a mobile edge computing orchestrator (MEC-O) in a mobile edge computing (MEC) system, the computer system comprising: network interface circuitry to communicate with a plurality of mobile edge hosts (MEHs) in the MEC system, wherein individual MEHs of the plurality of MEHs are located at or near a corresponding access node (AN) of a plurality of ANs; and processor circuitry coupled with the network interface circuitry, the processor circuitry to: identify network characteristics of the individual ANs; identify MEH parameters of the individual MEHs, wherein the HEM parameters are to indicate available resources of each MEH; identify application requirements of individual application tasks of one or more applications for computational offloading; and select an MEH of the plurality of MEHs for the computational offloading based on the network characteristics, the MEH parameters, and the application requirements, wherein the computational offloading includes transfer of the individual application tasks to the selected MEH for execution.

Example 2 may include the computer system of example 1 and/or some other examples herein, wherein: the network characteristics comprise channel state information of each AN, backhaul state information of each AN, a type of radio access technology (RAT) of each AN, an average data rate of each AN, and an average round trip time (RTT); the MEH parameters comprise a computational capacity of the respective MEHs, currently available computational load of the respective MEHs, a security level of the respective MEHs, and a reuse degree of computational MEH resources of the respective MEHs; and the application requirements comprise a frequency at which the one or more applications tasks are to be offloaded, computational load for executing the individual application tasks, an amount of data to be transferred for the computational offloading, and an amount of data to be obtained from an MEH after execution of the individual application tasks.

Example 3 may include the computer system of example 1 or 2 and/or some other examples herein, wherein at least one AN of the plurality of ANs is associated with a RAT that is different than other RATs of the other ANs of the plurality of ANs.

Example 4 may include the computer system of examples 1-3 and/or some other examples herein, wherein the processor circuitry is to: determine, for the individual MEHs, a computation latency, communication latency, a computation energy consumption, and a communication energy consumption based on the network characteristics and the application requirements.

Example 5 may include the computer system of example 4 and/or some other examples herein, wherein the processor circuitry is to: determine, for the individual MEHs, a latency budget based on the computation latency and the communication latency; and determine, for the individual MEHs, an energy consumption budget based on the computation energy consumption and the communication energy consumption.

Example 6 may include the computer system of example 5, wherein, to select the MEH for the computational offloading, the processor circuitry is to: select the MEH according to an offloading configuration, wherein the offloading configuration is to indicate that selection of the MEH is to be based on: a lowest latency budget among the plurality of MEC hosts, a lowest energy consumption budget among the plurality of MEC hosts, a lowest latency budget among a set of the plurality of MEC hosts having an energy consumption budget that is less than an energy consumption threshold, or a lowest energy consumption budget among a set of the plurality of MEC hosts having latency budget that is less than a latency threshold.

Example 7 may include the computer system of example 5 or 6 and/or some other examples herein, wherein the network interface circuitry is to: obtain, over a first reference point, an application offloading request message from a user equipment (UE), wherein the application offloading request message is to request an identity of an MEH on which to offload application tasks; and send, over the first reference point, an application offloading report message to the UE, wherein the application offloading report is to indicate the selected individual MEH.

Example 8 may include the computer system of example 7 and/or some other examples herein, wherein the network interface circuitry is to: send, in response to receipt of the application offloading request message, MEH parameter request messages to each of the plurality of MEHs over respective second reference points; obtain, over the respective second reference points, MEH parameter response messages from corresponding MEHs of the plurality of MEHs, wherein each second MEH parameter response message is to include MEH parameters of the corresponding MEHs.

Example 9 may include the computer system of example 8 and/or some other examples herein, wherein the second reference point comprises an Mm3 interface; and the first reference point comprises an Mx2 interface, an Mm9 interface, or the Mm3 interface.

Example 10 may include the computer system of example 9 and/or some other examples herein, further comprising: virtualization infrastructure including the processor circuitry, the network interface circuitry, and storage circuitry, and wherein the MEC-O is a virtual machine or a virtualized network function operated by the processor circuitry.

Example 11 may include a user equipment (UE) comprising: one or more UE applications to interact with a mobile edge computing (MEC) system comprising a plurality of mobile edge hosts (MEHs); and an application offloader to: identify network characteristics of individual access nodes (ANs) of a plurality of ANs, wherein the individual ANs are co-located with a corresponding MEH of the plurality of MEHs; identify MEH parameters of individual MEHs of the plurality of MEHs, wherein the HEM parameters are to indicate available resources of the individuals MEHs; identify application requirements of various application tasks of the one or more UE applications for computational offloading at one of the plurality of MEHs; select an MEH of the plurality of MEHs for computational offloading of the various application tasks based on the network characteristics, the MEH parameters, and the application requirements; and control transfer, during the computational offloading, of the various application tasks to the selected MEH for execution of the various application tasks.

Example 12 may include the UE of example 11 and/or some other examples herein, wherein: the network characteristics comprise channel state information of each AN, backhaul state information of each AN, a type of radio access technology (RAT) of each AN, an average data rate of each AN, and an average round trip time (RTT); the MEH parameters comprise a computational capacity of the respective MEHs, currently available computational load of the respective MEHs, a security level of the respective MEHs, and a reuse degree of computational MEH resources of the respective MEHs; and the application requirements comprise a frequency at which the one or more applications tasks are to be offloaded, computational load for executing the individual application tasks, an amount of data to be transferred for the computational offloading, and an amount of data to be obtained from an MEH after execution of the individual application tasks.

Example 13 may include the UE of example 11 or 12 and/or some other examples herein, wherein at least one AN of the plurality of ANs is associated with a RAT that is different than other RATs of the other ANs of the plurality of ANs.

Example 14 may include the UE of examples 11-13 and/or some other examples herein, wherein the application offloader is to: determine, for each MEH of the plurality of MEHs, a computation latency, communication latency, a computation energy consumption, and a communication energy consumption based on the network characteristics and the application requirements.

Example 15 may include the UE of example 14 and/or some other examples herein, wherein the application offloader is to: determine, for each MEH of the plurality of MEHs, a latency budget based on the computation latency and the communication latency; and determine, for each MEH of the plurality of MEHs, an energy consumption budget based on the computation energy consumption and the communication energy consumption.

Example 16 may include the UE of example 15 and/or some other examples herein, wherein, to select the MEH for computational offloading, the application offloader is to: select the MEH according to an offloading configuration, wherein the offloading configuration is to indicate that selection of the MEH is to be based on: a lowest latency budget among the plurality of MEC hosts, a lowest energy consumption budget among the plurality of MEC hosts, a lowest latency budget among a set of the plurality of MEC hosts having an energy consumption budget that is less than an energy consumption threshold, or a lowest energy consumption budget among a set of the plurality of MEC hosts having latency budget that is less than a latency threshold.

Example 17 may include the UE of example 15 or 16 and/or some other examples herein, wherein the MEC system comprises a MEC orchestrator (MEC-O) communicatively coupled with the plurality of MEHs, and wherein the application offloader is to: control transmission, over a first reference point to the MEC-O, of an MEH parameter request message, wherein the MEH parameters request message is to indicate MEH identifiers of one or more MEHs of the plurality of MEHs from which to request MEH parameters, wherein the MEC-O is to send parameter request messages to each of the plurality of MEHs over respective second reference points and obtain parameter response messages from corresponding MEHs of the plurality of MEHs over the respective second reference points, wherein each parameter response message is to include MEH parameters of the corresponding MEHs; and control receipt, over the first reference point, of a MEH report message from the MEC-O, wherein the MEH report is to include MEH parameters for MEHs of the indicated MEH identifiers.

Example 18 may include the UE of example 17 and/or some other examples herein, further comprising: application circuitry to operate the one or more UE applications, and the one or more UE applications are to interact with the MEC system via a user application lifecycle management proxy of the MEC system; and baseband circuitry coupled with the application circuitry, wherein the baseband circuitry is to operate the application offloader, and to control radiofrequency (RF) circuitry of the UE to transmit the MEH parameter request message and receive of the MEIH report message.

Example 19 may include the UE of example 18 and/or some other examples herein, wherein the baseband circuitry is to control measurement of channels provided by the individual ANs to obtain the network characteristics of each AN.

Example 20 may include the UE of example 19 and/or some other examples herein, wherein the second reference point comprises an Mm3 interface; and the first reference point comprises an Mx2 interface, an Mm9 interface, or the Mm3 interface.

Example 21 may include one or more non-transitory computer-readable media (NTCRM) comprising instructions, which when executed by one or more processors of a user equipment (UE), is to cause the UE to: identify network characteristics of individual access nodes (ANs) of a plurality of ANs, wherein the individual ANs are co-located with a corresponding mobile edge host (MEH) of a plurality of MEHs in a mobile edge computing (MEC) system; identify MEH parameters of individual MEHs of the plurality of MEHs, wherein the HEM parameters are to indicate available resources of the individuals MEHs; identify application requirements of various application tasks of one or more UE applications for computational offloading at one of the plurality of MEHs; select an MEH of the plurality of MEHs for computational offloading of the various application tasks based on the network characteristics, the MEH parameters, and the application requirements; and control transfer, during the computational offloading, of the various application tasks to the selected MEH for execution of the various application tasks.

Example 22 may include the one or more NTCRM of example 21 and/or some other examples herein, wherein: the network characteristics comprise channel state information of each AN, backhaul state information of each AN, a type of radio access technology (RAT) of each AN, an average data rate of each AN, and an average round trip time (RTT); the MEH parameters comprise a computational capacity of the respective MEHs, currently available computational load of the respective MEHs, a security level of the respective MEHs, and a reuse degree of computational MEH resources of the respective MEHs; and the application requirements comprise a frequency at which the one or more applications tasks are to be offloaded, computational load for executing the individual application tasks, an amount of data to be transferred for the computational offloading, and an amount of data to be obtained from an MEH after execution of the individual application tasks.

Example 23 may include the one or more NTCRM of example 21 or 22 and/or some other examples herein, wherein at least one AN of the plurality of ANs is associated with a RAT that is different than other RATs of the other ANs of the plurality of ANs.

Example 24 may include the one or more NTCRM of examples 23 and/or some other examples herein, wherein execution of the instructions is to cause the UE to: determine, for each MEH of the plurality of MEHs, a computation latency, communication latency, a computation energy consumption, and a communication energy consumption based on the network characteristics and the application requirements.

Example 25 may include the one or more NTCRM of example 24 and/or some other examples herein, wherein execution of the instructions is to cause the UE to: determine, for each MEH of the plurality of MEHs, a latency budget based on the computation latency and the communication latency; and determine, for each MEH of the plurality of MEHs, an energy consumption budget based on the computation energy consumption and the communication energy consumption.

Example 26 may include the one or more NTCRM of example 25 and/or some other examples herein, wherein, to select the MEH for computational offloading, execution of the instructions is to cause the UE to: select the MEH according to an offloading configuration, wherein the offloading configuration is to indicate that selection of the MEH is to be based on: a lowest latency budget among the plurality of MEC hosts, a lowest energy consumption budget among the plurality of MEC hosts, a lowest latency budget among a set of the plurality of MEC hosts having an energy consumption budget that is less than an energy consumption threshold, or a lowest energy consumption budget among a set of the plurality of MEC hosts having latency budget that is less than a latency threshold.

Example 27 may include the one or more NTCRM of example 25 or 26 and/or some other examples herein, wherein the MEC system comprises a mobile edge computing orchestrator (MEC-O) communicatively coupled with the plurality of MEHs, and wherein execution of the instructions is to cause the UE to: control transmission, over a first reference point to the MEC-O, of an MEH parameter request message, wherein the MEH parameters request message is to indicate MEH identifiers of one or more MEHs of the plurality of MEHs from which to request MEH parameters, wherein the MEC-O is to send parameter request messages to each of the plurality of MEHs over respective second reference points and obtain parameter response messages from corresponding MEHs of the plurality of MEHs over the respective second reference points, wherein each parameter response message is to include MEH parameters of the corresponding MEHs; and control receipt, over the first reference point, of a MEH report message from the MEC-0, wherein the MEH report is to include MEH parameters for MEHs of the indicated MEH identifiers.

Example 28 may include the one or more NTCRM of example 27 and/or some other examples herein, wherein: the one or more NTCRM and the one or more processors are included in a same system on chip (SoC), wherein execution of the instructions is to cause the UE to control radiofrequency (RF) circuitry of the UE to transmit the MEH parameter request message and receive of the MEH report message, and one or more other NTCRM and one or more other processors are included in a package separate from the SoC, and execution of other instructions stored by the one or more other NTCRM is to cause the UE to operate the one or more UE applications to interact with the MEC system via a user application lifecycle management proxy of the MEC system.

Example 29 may include the one or more NTCRM of example 28 and/or some other examples herein, wherein execution of the instructions is to cause the UE to control measurement of channels provided by the individual ANs to obtain the network characteristics of each AN.

Example 30 may include the one or more NTCRM of example 29 and/or some other examples herein, wherein the second reference point comprises an Mm3 interface; and the first reference point comprises an Mx2 interface, an Mm9 interface, or the Mm3 interface.

Example 31 may include one or more non-transitory computer-readable media (NTCRM) comprising instructions, which when executed by one or more processors of a computer system, is to cause the computer system to operate a mobile edge computing orchestrator (MEC-O) to: identify network characteristics of individual access nodes (ANs) of a plurality of ANs, wherein the individual ANs are co-located with a corresponding mobile edge host (MEH) of a plurality of MEHs in a mobile edge computing (MEC) system; identify MEH parameters of individual MEHs of the plurality of MEHs, wherein the HEM parameters are to indicate available resources of the individuals MEHs; identify application requirements of various application tasks of one or more UE applications for computational offloading at one of the plurality of MEHs; select an MEH of the plurality of MEHs for computational offloading of the various application tasks based on the network characteristics, the MEH parameters, and the application requirements; and control transmission of an indication to a user equipment (UE) to indicate the selected MEH.

Example 32 may include the one or more NTCRM of example 31 and/or some other examples herein, wherein: the network characteristics comprise channel state information of each AN, backhaul state information of each AN, a type of radio access technology (RAT) of each AN, an average data rate of each AN, and an average round trip time (RTT); the MEH parameters comprise a computational capacity of the respective MEHs, currently available computational load of the respective MEHs, a security level of the respective MEHs, and a reuse degree of computational MEH resources of the respective MEHs; and the application requirements comprise a frequency at which the one or more applications tasks are to be offloaded, computational load for executing the individual application tasks, an amount of data to be transferred for the computational offloading, and an amount of data to be obtained from an MEH after execution of the individual application tasks.

Example 33 may include the one or more NTCRM of example 31 or 32 and/or some other examples herein, wherein at least one AN of the plurality of ANs is associated with a RAT that is different than other RATs of the other ANs of the plurality of ANs.

Example 34 may include the one or more NTCRM examples 31-33 and/or some other examples herein, wherein execution of the instructions is to cause the computer system to operate the MEC-O to: determine, for the individual MEHs, a computation latency, communication latency, a computation energy consumption, and a communication energy consumption based on the network characteristics and the application requirements.

Example 35 may include the one or more NTCRM of example 34 and/or some other examples herein, wherein execution of the instructions is to cause the computer system to operate the MEC-O to: determine, for the individual MEHs, a latency budget based on the computation latency and the communication latency; and determine, for the individual MEHs, an energy consumption budget based on the computation energy consumption and the communication energy consumption.

Example 36 may include the one or more NTCRM of example 35 and/or some other examples herein, wherein, to select the MEH for the computational offloading, execution of the instructions is to cause the computer system to operate the MEC-O to: select the MEH according to an offloading configuration, wherein the offloading configuration is to indicate that selection of the MEH is to be based on: a lowest latency budget among the plurality of MEC hosts, a lowest energy consumption budget among the plurality of MEC hosts, a lowest latency budget among a set of the plurality of MEC hosts having an energy consumption budget that is less than an energy consumption threshold, or a lowest energy consumption budget among a set of the plurality of MEC hosts having latency budget that is less than a latency threshold.

Example 37 may include the one or more NTCRM of example 35 or 36 and/or some other examples herein, wherein execution of the instructions is to cause the computer system to operate the MEC-O to: control receipt, over a first reference point, of an application offloading request message from a user equipment (UE), wherein the application offloading request message is to request an identity of an MEH on which to offload application tasks; and control transmission, over the first reference point, of an application offloading report message to the UE, wherein the application offloading report is to indicate the selected individual MEH.

Example 38 may include the one or more NTCRM of example 37 and/or some other examples herein, wherein execution of the instructions is to cause the computer system to operate the MEC-O to: control transmission, in response to receipt of the application offloading request message, of MEH parameter request messages to each of the plurality of MEHs over respective second reference points; control receipt, over the respective second reference points, of MEH parameter response messages from corresponding MEHs of the plurality of MEHs, wherein each second MEH parameter response message is to include MEH parameters of the corresponding MEHs.

Example 39 may include the one or more NTCRM of example 38 and/or some other examples herein, wherein the second reference point comprises an Mm3 interface; and the first reference point comprises an Mx2 interface, an Mm9 interface, or the Mm3 interface.

Example 40 may include the one or more NTCRM of example 39 and/or some other examples herein, wherein the MEC-O is a virtual machine or a virtualized network function operated by the one or more processors.

Example 41 may include an apparatus to be employed as a mobile edge computing orchestrator (MEC-O) in a mobile edge computing (MEC) system, the apparatus comprising: communication means for communicating with a plurality of mobile edge hosting means (MEHs) in the MEC system, wherein individual MEHs of the plurality of MEHs are located at or near a corresponding access node (AN) of a plurality of ANs; and offloading means for: identifying network characteristics of the individual ANs; identifying MEH parameters of the individual MEHs, wherein the HEM parameters are to indicate available resources of each MEH; identifying application requirements of individual application tasks of one or more applications for computational offloading; and selecting an MEH of the plurality of MEHs for the computational offloading based on the network characteristics, the MEH parameters, and the application requirements, wherein the computational offloading includes transfer of the individual application tasks to the selected MEH for execution.

Example 42 may include the apparatus of example 41 and/or some other examples herein, wherein: the network characteristics comprise channel state information of each AN, backhaul state information of each AN, a type of radio access technology (RAT) of each AN, an average data rate of each AN, and an average round trip time (RTT); the MEH parameters comprise a computational capacity of the respective MEHs, currently available computational load of the respective MEHs, a security level of the respective MEHs, and a reuse degree of computational MEH resources of the respective MEHs; and the application requirements comprise a frequency at which the one or more applications tasks are to be offloaded, computational load for executing the individual application tasks, an amount of data to be transferred for the computational offloading, and an amount of data to be obtained from an MEH after execution of the individual application tasks.

Example 43 may include the apparatus of example 41 or 42 and/or some other examples herein, wherein at least one AN of the plurality of ANs is associated with a RAT that is different than other RATs of the other ANs of the plurality of ANs.

Example 44 may include the apparatus of examples 41-43 and/or some other examples herein, wherein the offloading means is for: determining, for the individual MEHs, a computation latency, communication latency, a computation energy consumption, and a communication energy consumption based on the network characteristics and the application requirements.

Example 45 may include the apparatus of example 44 and/or some other examples herein, wherein the offloading means is for: determining, for the individual MEHs, a latency budget based on the computation latency and the communication latency; and determining, for the individual MEHs, an energy consumption budget based on the computation energy consumption and the communication energy consumption.

Example 46 may include the apparatus of example 45 and/or some other examples herein, wherein, when selecting the MEH for the computational offloading, the offloading means is for: selecting the MEH according to an offloading configuration, wherein the offloading configuration is to indicate that selection of the MEH is to be based on: a lowest latency budget among the plurality of MEC hosts, a lowest energy consumption budget among the plurality of MEC hosts, a lowest latency budget among a set of the plurality of MEC hosts having an energy consumption budget that is less than an energy consumption threshold, or a lowest energy consumption budget among a set of the plurality of MEC hosts having latency budget that is less than a latency threshold.

Example 47 may include the apparatus of example 45 or 46 and/or some other examples herein, wherein the communication means is for: obtaining, over a first reference point, an application offloading request message from a user equipment (UE), wherein the application offloading request message is to request an identity of an MEH on which to offload application tasks; and sending, over the first reference point, an application offloading report message to the UE, wherein the application offloading report is to indicate the selected individual MEH.

Example 48 may include the apparatus of example 47 and/or some other examples herein, wherein the communication means is for: sending, in response to receipt of the application offloading request message, MEH parameter request messages to each of the plurality of MEHs over respective second reference points; and obtaining, over the respective second reference points, MEH parameter response messages from corresponding MEHs of the plurality of MEHs, wherein each second MEH parameter response message is to include MEH parameters of the corresponding MEHs.

Example 49 may include the apparatus of example 48 and/or some other examples herein, wherein the second reference point comprises an Mm3 interface; and the first reference point comprises an Mx2 interface, an Mm9 interface, or the Mm3 interface.

Example 50 may include the apparatus of example 49 and/or some other examples herein, further comprising: virtualization means for operating the MEC-O, wherein the MEC-O is a virtual machine or a virtualized network function.

Example 51 may include an apparatus to be employed as a user equipment (UE), the apparatus comprising: means for operating one or more UE applications to interact with a mobile edge computing (MEC) system comprising a plurality of mobile edge hosting means (MEHs); and offloading means for: identifying network characteristics of individual access nodes (ANs) of a plurality of ANs, wherein the individual ANs are co-located with a corresponding MEH of the plurality of MEHs; identifying MEH parameters of individual MEHs of the plurality of MEHs, wherein the HEM parameters are to indicate available resources of the individuals MEHs; identifying application requirements of various application tasks of the one or more UE applications for computational offloading at one of the plurality of MEHs; select an MEH of the plurality of MEHs for computational offloading of the various application tasks based on the network characteristics, the MEH parameters, and the application requirements; and controlling transfer, during the computational offloading, of the various application tasks to the selected MEH for execution of the various application tasks.

Example 52 may include the apparatus of example 51 and/or some other examples herein, wherein: the network characteristics comprise channel state information of each AN, backhaul state information of each AN, a type of radio access technology (RAT) of each AN, an average data rate of each AN, and an average round trip time (RTT); the MEH parameters comprise a computational capacity of the respective MEHs, currently available computational load of the respective MEHs, a security level of the respective MEHs, and a reuse degree of computational MEH resources of the respective MEHs; and the application requirements comprise a frequency at which the one or more applications tasks are to be offloaded, computational load for executing the individual application tasks, an amount of data to be transferred for the computational offloading, and an amount of data to be obtained from an MEH after execution of the individual application tasks.

Example 53 may include the apparatus of example 51 or 52 and/or some other examples herein, wherein at least one AN of the plurality of ANs is associated with a RAT that is different than other RATs of the other ANs of the plurality of ANs.

Example 54 may include the apparatus of example 53 and/or some other examples herein, wherein the offloading means is for: determining, for each MEH of the plurality of MEHs, a computation latency, communication latency, a computation energy consumption, and a communication energy consumption based on the network characteristics and the application requirements.

Example 55 may include the apparatus of example 54 and/or some other examples herein, wherein the offloading means is for: determining, for each MEH of the plurality of MEHs, a latency budget based on the computation latency and the communication latency; and determining, for each MEH of the plurality of MEHs, an energy consumption budget based on the computation energy consumption and the communication energy consumption.

Example 56 may include the apparatus of example 55 and/or some other examples herein, wherein when selecting the MEH for computational offloading, the offloading means is for: selecting the MEH according to an offloading configuration, wherein the offloading configuration is to indicate that selection of the MEH is to be based on: a lowest latency budget among the plurality of MEC hosts, a lowest energy consumption budget among the plurality of MEC hosts, a lowest latency budget among a set of the plurality of MEC hosts having an energy consumption budget that is less than an energy consumption threshold, or a lowest energy consumption budget among a set of the plurality of MEC hosts having latency budget that is less than a latency threshold.

Example 57 may include the apparatus of example 55 or 56 and/or some other examples herein, wherein the MEC system comprises MEC orchestration means (MEC-O) communicatively coupled with the plurality of MEHs, and wherein the offloading means is for: controlling transmission, over a first reference point to the MEC-O, of an MEH parameter request message, wherein the MEH parameters request message is to indicate MEH identifiers of one or more MEHs of the plurality of MEHs from which to request MEH parameters, wherein the MEC-O is to send parameter request messages to each of the plurality of MEHs over respective second reference points and obtain parameter response messages from corresponding MEHs of the plurality of MEHs over the respective second reference points, wherein each parameter response message is to include MEH parameters of the corresponding MEHs; and for controlling receipt, over the first reference point, of a MEH report message from the MEC-O, wherein the MEH report is to include MEH parameters for MEHs of the indicated MEH identifiers.

Example 58 may include the apparatus of example 57 and/or some other examples herein, wherein: wherein the means for operating the one or more UE applications is for operating the one or more UE applications to interact with the MEC system via user application lifecycle management proxy means of the MEC system; and the offloading means is for controlling radiofrequency (RF) communication means, the RF communication means is for transmitting the MEH parameter request message and for receiving the MEH report message.

Example 59 may include the apparatus of example 58 and/or some other examples herein, further comprising: measurement means for measuring one or more channels provided by the individual ANs to obtain the network characteristics of each AN.

Example 60 may include the apparatus of example 59 and/or some other examples herein, wherein the second reference point comprises an Mm3 interface; and the first reference point comprises an Mx2 interface, an Mm9 interface, or the Mm3 interface.

Example 61 may include a method to be performed by a user equipment (UE), the method comprising: identifying or causing to identify, by the UE, network characteristics of individual access nodes (ANs) of a plurality of ANs, wherein the individual ANs are co-located with a corresponding mobile edge host (MEH) of a plurality of MEHs in a mobile edge computing (MEC) system; identifying or causing to identify, by the UE, MEH parameters of individual MEHs of the plurality of MEHs, wherein the HEM parameters are to indicate available resources of the individuals MEHs; identifying or causing to identify, by the UE, application requirements of various application tasks of one or more UE applications for computational offloading at one of the plurality of MEHs; selecting or causing to select, by the UE, an MEH of the plurality of MEHs for computational offloading of the various application tasks based on the network characteristics, the MEH parameters, and the application requirements; and transferring or causing to transfer, by the UE during the computational offloading, of the various application tasks to the selected MEH for execution of the various application tasks.

Example 62 may include the method of example 61 and/or some other examples herein, wherein: the network characteristics comprise channel state information of each AN, backhaul state information of each AN, a type of radio access technology (RAT) of each AN, an average data rate of each AN, and an average round trip time (RTT); the MEH parameters comprise a computational capacity of the respective MEHs, currently available computational load of the respective MEHs, a security level of the respective MEHs, and a reuse degree of computational MEH resources of the respective MEHs; and the application requirements comprise a frequency at which the one or more applications tasks are to be offloaded, computational load for executing the individual application tasks, an amount of data to be transferred for the computational offloading, and an amount of data to be obtained from an MEH after execution of the individual application tasks.

Example 63 may include the method of example 61 or 62 and/or some other examples herein, wherein at least one AN of the plurality of ANs is associated with a RAT that is different than other RATs of the other ANs of the plurality of ANs.

Example 64 may include the method of example 63 and/or some other examples herein, further comprising: determining or causing to determine, by the UE for each MEH of the plurality of MEHs, a computation latency, communication latency, a computation energy consumption, and a communication energy consumption based on the network characteristics and the application requirements.

Example 65 may include the method of example 64 and/or some other examples herein, further comprising: determining or causing to determine, by the UE for each MEH of the plurality of MEHs, a latency budget based on the computation latency and the communication latency; and determining or causing to determine, by the UE for each MEH of the plurality of MEHs, an energy consumption budget based on the computation energy consumption and the communication energy consumption.

Example 66 may include the method of example 65 and/or some other examples herein, wherein selecting the MEH for computational offloading comprising: selecting or causing to selecting, by the UE, the MEH according to an offloading configuration, wherein the offloading configuration is to indicate that selection of the MEH is to be based on: a lowest latency budget among the plurality of MEC hosts, a lowest energy consumption budget among the plurality of MEC hosts, a lowest latency budget among a set of the plurality of MEC hosts having an energy consumption budget that is less than an energy consumption threshold, or a lowest energy consumption budget among a set of the plurality of MEC hosts having latency budget that is less than a latency threshold.

Example 67 may include the method of example 65 or 66 and/or some other examples herein, wherein the MEC system comprises a mobile edge computing orchestrator (MEC-O) communicatively coupled with the plurality of MEHs, and the method comprising: transmitting or causing to transmit, by the UE over a first reference point to the MEC-O, of an MEH parameter request message, wherein the MEH parameters request message is to indicate MEH identifiers of one or more MEHs of the plurality of MEHs from which to request MEH parameters, wherein the MEC-O is to send parameter request messages to each of the plurality of MEHs over respective second reference points and obtain parameter response messages from corresponding MEHs of the plurality of MEHs over the respective second reference points, wherein each parameter response message is to include MEH parameters of the corresponding MEHs; and receiving or causing to receive, by the UE over the first reference point, of a MEH report message from the MEC-O, wherein the MEH report is to include MEH parameters for MEHs of the indicated MEH identifiers.

Example 68 may include the method of example 67 and/or some other examples herein, further comprising: operating or causing to operate one or more UE applications to interact with the MEC system via a user application lifecycle management proxy of the MEC system.

Example 69 may include the method of example 68 and/or some other examples herein, further comprising: measuring or causing to measure, by the UE, one or more channels provided by the individual ANs to obtain the network characteristics of each AN.

Example 70 may include the method of example 69 and/or some other examples herein, wherein the second reference point comprises an Mm3 interface; and the first reference point comprises an Mx2 interface, an Mm9 interface, or the Mm3 interface.

Example 71 may include a method to be performed by a mobile edge computing orchestrator (MEC-O), the method comprising: identifying or causing to identify, by the MEC-O, network characteristics of individual access nodes (ANs) of a plurality of ANs, wherein the individual ANs are co-located with a corresponding mobile edge host (MEH) of a plurality of MEHs in a mobile edge computing (MEC) system; identifying or causing to identify, by the MEC-O, MEH parameters of individual MEHs of the plurality of MEHs, wherein the HEM parameters are to indicate available resources of the individuals MEHs; identifying or causing to identify, by the MEC-O, application requirements of various application tasks of one or more UE applications for computational offloading at one of the plurality of MEHs; selecting or causing to select, by the MEC-O, an MEH of the plurality of MEHs for computational offloading of the various application tasks based on the network characteristics, the MEH parameters, and the application requirements; and transmitting or causing to transmit, by the MEC-O, an indication to a user equipment (UE) to indicate the selected MEH.

Example 72 may include the method of example 71 and/or some other examples herein, wherein: the network characteristics comprise channel state information of each AN, backhaul state information of each AN, a type of radio access technology (RAT) of each AN, an average data rate of each AN, and an average round trip time (RTT); the MEH parameters comprise a computational capacity of the respective MEHs, currently available computational load of the respective MEHs, a security level of the respective MEHs, and a reuse degree of computational MEH resources of the respective MEHs; and the application requirements comprise a frequency at which the one or more applications tasks are to be offloaded, computational load for executing the individual application tasks, an amount of data to be transferred for the computational offloading, and an amount of data to be obtained from an MEH after execution of the individual application tasks.

Example 73 may include the method of example 71 or 72 and/or some other examples herein, wherein at least one AN of the plurality of ANs is associated with a RAT that is different than other RATs of the other ANs of the plurality of ANs.

Example 74 may include the method of examples 71-73 and/or some other examples herein, further comprising: determining or causing to determine, by the MEC-O for the individual MEHs, a computation latency, communication latency, a computation energy consumption, and a communication energy consumption based on the network characteristics and the application requirements.

Example 75 may include the method of example 74 and/or some other examples herein, further comprising. determining or causing to determine, by the MEC-O the individual MEHs, a latency budget based on the computation latency and the communication latency; and determining or causing to determine, by the MEC-O for the individual MEHs, an energy consumption budget based on the computation energy consumption and the communication energy consumption.

Example 76 may include the method of example 75 and/or some other examples herein, wherein selecting the MEH for the computational offloading comprising: selecting or causing to select, by the MEC-O, the MEH according to an offloading configuration, wherein the offloading configuration is to indicate that selection of the MEH is to be based on: a lowest latency budget among the plurality of MEC hosts, a lowest energy consumption budget among the plurality of MEC hosts, a lowest latency budget among a set of the plurality of MEC hosts having an energy consumption budget that is less than an energy consumption threshold, or a lowest energy consumption budget among a set of the plurality of MEC hosts having latency budget that is less than a latency threshold.

Example 77 may include the method of example 75 of 76 and/or some other examples herein, further comprising: receiving or causing to receive, by the MEC-O, over a first reference point, of an application offloading request message from a user equipment (UE), wherein the application offloading request message is to request an identity of an MEH on which to offload application tasks; and transmitting or causing to transmit, by the MEC-O, over the first reference point, of an application offloading report message to the UE, wherein the application offloading report is to indicate the selected individual MEH.

Example 78 may include the method of example 77 and/or some other examples herein, wherein execution of the instructions is to cause the computer system to operate the MEC-O to: transmitting or causing to transmit, by the MEC-O, in response to receipt of the application offloading request message, of MEH parameter request messages to each of the plurality of MEHs over respective second reference points; receiving or causing to receive, by the MEC-O, over the respective second reference points, of MEH parameter response messages from corresponding MEHs of the plurality of MEHs, wherein each second MEH parameter response message is to include MEH parameters of the corresponding MEHs.

Example 79 may include the method of example 78 and/or some other examples herein, wherein the second reference point comprises an Mm3 interface; and the first reference point comprises an Mx2 interface, an Mm9 interface, or the Mm3 interface.

Example 80 may include the method of example 79 and/or some other examples herein, wherein the MEC-O is a virtual machine or a virtualized network function operated by virtualization infrastructure.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An edge computing device operable in an edge computing system, comprising:
    processor circuitry configured to:
        identify a set of available radio access technologies that provide the edge computing device with connectivity to a network of the edge computing system;
        determine power consumption parameters for respective radio access technologies of the set of available radio access technologies;
        identify application requirements of at least one application task of at least one application, the application requirements configured to indicate requirements to perform computational offloading of the at least one application to respective nodes available using respective radio access technologies of the set of available radio access technologies;
        select a radio access technology from the set of available radio access technologies based on the power consumption parameters of the selected radio access technology; and
        select a node of the respective nodes for computational offloading based on the application requirements, wherein the computational offloading causes transfer of the at least one application task to the selected node for execution using the selected radio access technology.

2. The edge computing device of claim 1, further comprising processor circuitry configured to:
    determine network characteristics for the network that indicate at least one of:
        channel state information of the network at the respective nodes, backhaul state information for the respective nodes, an average data rate at the respective nodes, or an average round trip time (RTT) at the respective nodes;
    determine resource parameters for the network that indicate at least one of:
        a computational capacity at the respective nodes, currently available computational load at the respective nodes, a security level at the respective nodes, or a re-use degree of computational resources at the respective nodes; and
    wherein the application requirements indicate at least one of:
        a frequency at which the at least one application task is to be offloaded, a computational load for executing the at least one application task, an amount of data to be transferred for the computational offloading, or an amount of data to be obtained from a node after execution of the at least one application task.

3. The edge computing device of claim 2, wherein the processor circuitry is to:
    determine, for the respective nodes, a computation latency, communication latency, a computation energy consumption, and a communication energy consumption based on the network characteristics and the application requirements.

4. The edge computing device of claim 3, wherein the processor circuitry is further configured to:
    determine, for the respective nodes, a latency budget based on the computation latency and the communication latency; and
    determine, for the respective nodes, an energy consumption budget based on the computation energy consumption and the communication energy consumption.

5. The edge computing device of claim 1, wherein operations to select the node for the computational offloading, includes operations to:
    select the node according to an offloading configuration, wherein the offloading configuration indicates that a selection of the node is to be based on:
        a lowest latency budget among the respective nodes,
        a lowest energy consumption budget among the respective nodes,
        a lowest latency budget among a set of the respective nodes having an energy consumption budget that is less than an energy consumption threshold, or
        a lowest energy consumption budget among a set of the respective nodes having s latency budget that is less than a latency threshold.

6. The edge computing device of claim 1, wherein the respective nodes comprise a plurality of mobile edge hosts (MEHs) in the edge computing system, the edge computing device further comprising:
    network interface circuitry to communicate with the respective nodes, wherein individual MEHs of the plurality of MEHs are located at or near a corresponding access node of a plurality of access nodes, and wherein the edge computing system is adapted to operate according to an European Telecommunications Standards Institute (ETSI) Multi-Access Edge Computing (MEC) specification.

7. The edge computing device of claim 6, wherein the processor circuitry is further configured to:
    obtain, over a first reference point, an application offloading request message from a user equipment (UE), wherein the application offloading request message is to request an identity of an individual node on which to offload application tasks; and
    send, over the first reference point, an application offloading report message to the UE, wherein the application offloading report message is to indicate the selected node.

8. At least one non-transitory machine-readable medium comprising instructions that, when executed by at least one processor, cause the at least one processor to perform operations to:
    identify a set of available radio access technologies that provide an edge computing device with connectivity to a network of an edge computing system;
    determine power consumption parameters for respective radio access technologies of the set of available radio access technologies;
    identify application requirements of at least one application task of at least one application, the application requirements configured to indicate requirements to perform computational offloading of the at least one application to respective nodes available using respective radio access technologies of the set of available radio access technologies;
    select a radio access technology from the set of available radio access technologies based on the power consumption parameters of the selected radio access technology; and
    select a node of the respective nodes for computational offloading based on the application requirements, wherein the computational offloading causes transfer of the at least one application task to the selected node for execution using the selected radio access technology.

9. The at least one non-transitory machine-readable medium of claim 8, further comprising instructions that, when executed by the at least one processor, cause the at least one processor to perform operations to:
determine network characteristics for the network that indicate at least one of:
channel state information of the network at the respective nodes, backhaul state information for the respective nodes, an average data rate at the respective nodes, or an average round trip time (RTT) at the respective nodes;
determine resource parameters for the network that indicate at least one of:
a computational capacity at the respective nodes, currently available computational load at the respective nodes, a security level at the respective nodes, or a re-use degree of computational resources at the respective nodes; and
wherein the application requirements indicate at least one of:
a frequency at which the at least one application task is to be offloaded, a computational load for executing the at least one application task, an amount of data to be transferred for the computational offloading, or an amount of data to be obtained from a node after execution of the at least one application task.

10. The at least one non-transitory machine-readable medium of claim 9, further comprising instructions that, when executed by at least one processor, cause the at least one processor to perform operations to:
determine, for the respective nodes, a computation latency, communication latency, a computation energy consumption, and a communication energy consumption based on the network characteristics and the application requirements.

11. The at least one non-transitory machine-readable medium of claim 10, further comprising instructions that, when executed by at least one processor, cause the at least one processor to perform operations to:
determine, for the respective nodes, a latency budget based on the computation latency and the communication latency; and
determine, for the respective nodes, an energy consumption budget based on the computation energy consumption and the communication energy consumption.

12. The at least one non-transitory machine-readable medium of claim 8, wherein the instructions to select the node for the computational offloading, includes instructions to:
select the node according to an offloading configuration, wherein the offloading configuration indicates that a selection of the node is to be based on:
a lowest latency budget among the respective nodes,
a lowest energy consumption budget among the respective nodes,
a lowest latency budget among a set of the respective nodes having an energy consumption budget that is less than an energy consumption threshold, or
a lowest energy consumption budget among a set of the respective nodes having s latency budget that is less than a latency threshold.

13. The at least one non-transitory machine-readable medium of claim 8, wherein the respective nodes comprise a plurality of mobile edge hosts (MEHs) in the edge computing system, the at least one non-transitory machine-readable medium further comprising instructions that, when executed by at least one processor, cause the at least one processor to perform operations to:
communicate with the respective nodes, wherein individual MEHs of the plurality of MEHs are located at or near a corresponding access node of a plurality of access nodes, and wherein the edge computing system is adapted to operate according to an European Telecommunications Standards Institute (ETSI) Multi-Access Edge Computing (MEC) specification.

14. A method, executable by an edge computing device, comprising:
identifying a set of available radio access technologies that provide the edge computing device with connectivity to a network of an edge computing system;
determining power consumption parameters for respective radio access technologies of the set of available radio access technologies;
identifying application requirements of at least one application task of at least one application, the application requirements configured to indicate requirements to perform computational offloading of the at least one application to respective nodes available using respective radio access technologies of the set of available radio access technologies;
selecting a radio access technology from the set of available radio access technologies based on the power consumption parameters of the selected radio access technology; and
select a node of the respective nodes for computational offloading based on the application requirements, wherein the computational offloading causes transfer of the at least one application task to the selected node for execution using the selected radio access technology.

15. The method of claim 14, further comprising:
determining network characteristics for the network that indicate at least one of:
channel state information of the network at the respective nodes, backhaul state information for the respective nodes, an average data rate at the respective nodes, or an average round trip time (RTT) at the respective nodes;
determining resource parameters for the network that indicate at least one of:
a computational capacity at the respective nodes, currently available computational load at the respective nodes, a security level at the respective nodes, or a re-use degree of computational resources at the respective nodes; and
wherein the application requirements indicate at least one of:
a frequency at which the at least one application task is to be offloaded, a computational load for executing the at least one application task, an amount of data to be transferred for the computational offloading, or an amount of data to be obtained from a node after execution of the at least one application task.

16. The method of claim 15, further comprising:
determining, for the respective nodes, a computation latency, communication latency, a computation energy consumption, and a communication energy consumption based on the network characteristics and the application requirements.

17. The method of claim 16, further comprising:
- determining, for the respective nodes, a latency budget based on the computation latency and the communication latency; and
- determining, for the respective nodes, an energy consumption budget based on the computation energy consumption and the communication energy consumption.

18. The method of claim 14, wherein selecting the node for the computational offloading, further comprises:
- selecting the node according to an offloading configuration, wherein the offloading configuration indicates that a selection of the node is to be based on:
  - a lowest latency budget among the respective nodes,
  - a lowest energy consumption budget among the respective nodes,
  - a lowest latency budget among a set of the respective nodes having an energy consumption budget that is less than an energy consumption threshold, or
  - a lowest energy consumption budget among a set of the respective nodes having s latency budget that is less than a latency threshold.

19. The method of claim 14, wherein the respective nodes comprise a plurality of mobile edge hosts (MEHs) in the edge computing system, and further comprising:
- communicating with the respective nodes, wherein individual MEHs of the plurality of MEHs are located at or near a corresponding access node of a plurality of access nodes, and wherein the edge computing system is adapted to operate according to an European Telecommunications Standards Institute (ETSI) Multi-Access Edge Computing (MEC) specification.

20. The method of claim 19, further comprising:
- obtaining, over a first reference point, an application offloading request message from a user equipment (UE), wherein the application offloading request message is to request an identity of an individual node on which to offload application tasks; and
- sending, over the first reference point, an application offloading report message to the UE, wherein the application offloading report message is to indicate the selected node.

* * * * *